· US005920664A

United States Patent [19]
Hirabayashi et al.

[11] Patent Number: 5,920,664
[45] Date of Patent: Jul. 6, 1999

[54] BOARD-TO-BOARD AND UNIT-TO-UNIT OPTICAL INTERCONNECTION SYSTEM

[75] Inventors: Katsuhiko Hirabayashi, Tokyo; Tsuyoshi Yamamoto, Saitamaken; Shigeki Hino, Tokyo, all of Japan

[73] Assignee: Nippon Telegraph and Telephone Corporation, Japan

[21] Appl. No.: 08/868,177

[22] Filed: Jun. 3, 1997

[30]     Foreign Application Priority Data

Jun. 3, 1996  [JP]  Japan .................................... 8-140243
  Jan. 29, 1997  [JP]  Japan .................................... 9-015640
  Mar. 18, 1997  [JP]  Japan .................................... 9-064830

[51] Int. Cl.$^6$ ...................................................... H01J 3/14
[52] U.S. Cl. .............................. 385/16; 349/196; 385/18; 385/36; 385/20; 385/147
[58] Field of Search ............................ 359/139; 349/196, 349/197, 1, 5, 8, 9, 10; 250/208.4, 578.1; 385/16, 17, 18, 20, 24, 147

[56]               References Cited

U.S. PATENT DOCUMENTS 5,182,780  1/1993  Robertson .................................. 385/14
  5,500,523  3/1996  Hamanaka ............................... 250/216

FOREIGN PATENT DOCUMENTS 2 253 317  2/1992  United Kingdom .

OTHER PUBLICATIONS

A reprint article from *Applied Optics*, entitled "Free–Space Optical Interconnections with Liquid–Crystal Microprism Arrays" by Hirabayashi, et al., dated May 10, 1995, Vole. 34, No. 14, pp. 2571 to 2580.
Article from *Journal of Lightwave Technology*, entitled Optical Interconnection for Advanced Processor Systems: A Review of the Esprit II Olives Program, by James W. Parker, vol. 9, No. 12, dated Dec. 1991, pp. 1764–1773.
Article from *Journal of Lightwave Technology*, entitled "Optical Beam Direction Compensating System for Board–to–Board Free Space Optical Interconnection in High–Capacity ATM Switch", by Hirabayashi, et al., vol. 15, No. 5, dated May 1997, pp. 1 to 9.

(List continued on next page.)

*Primary Examiner*—Hung N. Ngo
*Attorney, Agent, or Firm*—Banner & Witcoff, Ltd.

[57]              ABSTRACT

The optical beam emitted from the transmitter array is input into the polarization beam splitter, and then turned by a right angle to input the opening portion of the neighboring board. Then, polarization of the optical beam is controlled by the polarization control array device provided on the opening portion to thereby rotate a plane of polarization by 90°, then the optical beam is turned by the polarization beam splitter by a right angle to input into the first light deflection control array device which then controls the propagation direction of the optical beam to input into the desired photodetector. On the other hand, the optical beam whose plane of polarization is not rotated by the polarization control array device by 90° passes through the polarization beam splitter along the propagation direction to input into the opening portion of the neighboring board, and is then controlled similarly. The optical beam array emitted from the transmitter array with the lens array which is attached to the lower end portion of the board is received by the light deflection control array device, then the propagation direction of the optical beam array is variably controlled every optical beam to be input into the mirror with a gradient, and then the optical beam array reflected by the mirror is received by the photodetector with the lens array. Therefore, the optical beams from the desired boards can be connected to the photodetector mounted on another desired board. Similarly, the board-to-board free-space optical interconnection system between the boards in a certain unit and a different unit arbitrarily can be provided by introducing the light deflection control array device.

92 Claims, 38 Drawing Sheets

OTHER PUBLICATIONS

Article from *Journal of Lightwave Technology*, entitled "Multigigabit Multichannel Optical Interconnection Module for Broadband Switching System", by Nishikido, et al., vol. 13, No. 6, dated Jun. 1995, pp. 1104 to 1110.

Article from *Journal of Lightwave Technology*, entitled "An Optical Holographic Backplane Interconnect System", by Kim, et al, vol. 9, No. 12, dated Dec. 1991, pp. 1650 to 1656.

Article from *IEEE Photonics Technology Letters*, entitled, "Design and Construction of an Active Alignment Demonstrator for a Free–Space Optical Interconnect", vol. 7, No. 6, dated Jun. 1995, pp. 676 to 678; and.

Article from *Electronics Letters*, entitled "Liquid–Crystal Light Deflector", by Sasaki et al., dated May 10, 1979, vol. 15, No. 10, pp. 293 and 294.

FIG.7
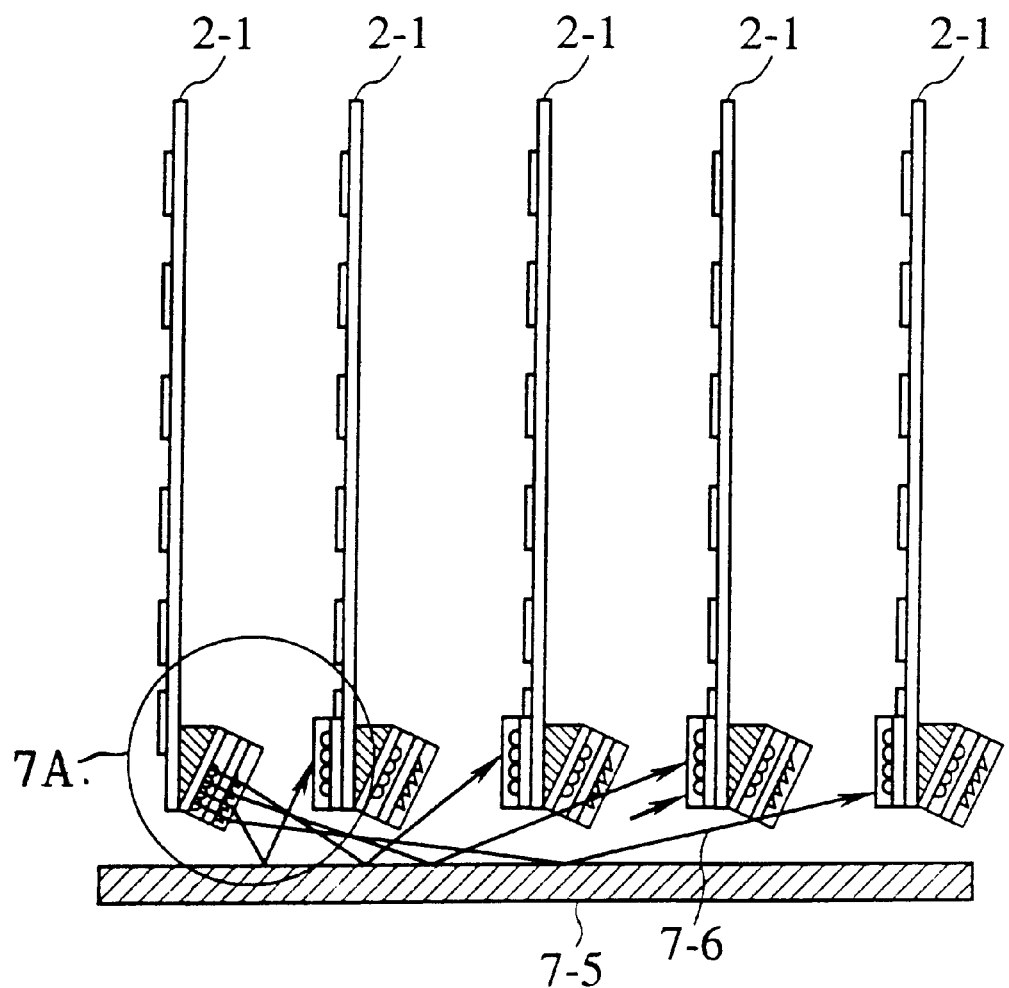
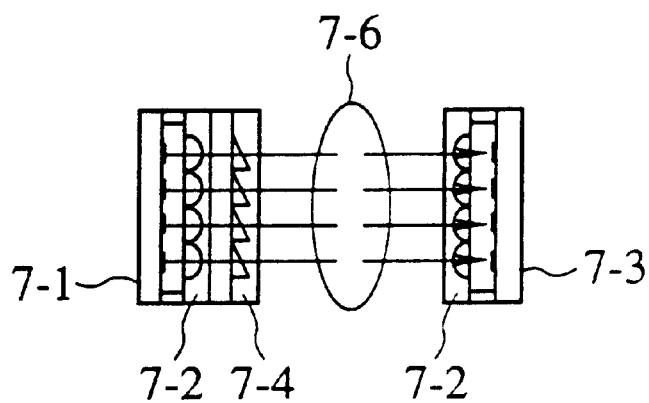
FIG.7A

FIG.15
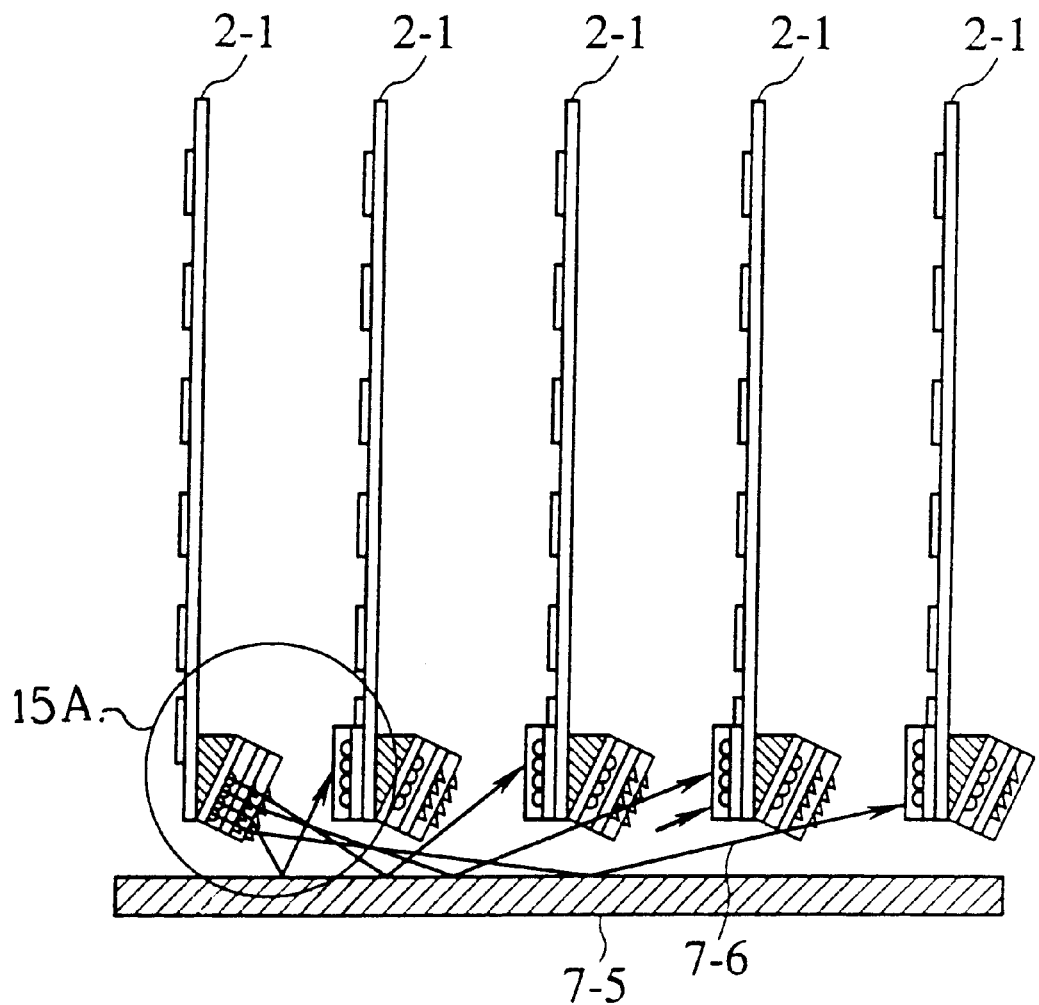
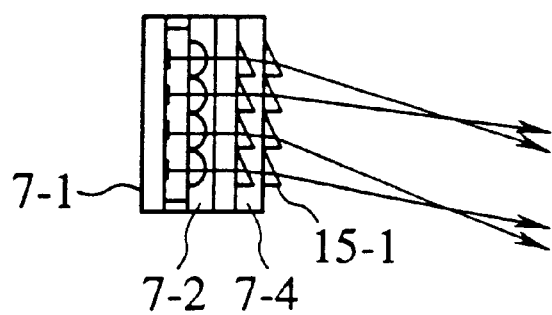
FIG.15A (DEFLECTION ANGLE : 5 DEGREES)

(DEFLECTION ANGLE :7.5DEGREES)

(DEFLECTION ANGLE :10DEGREES)

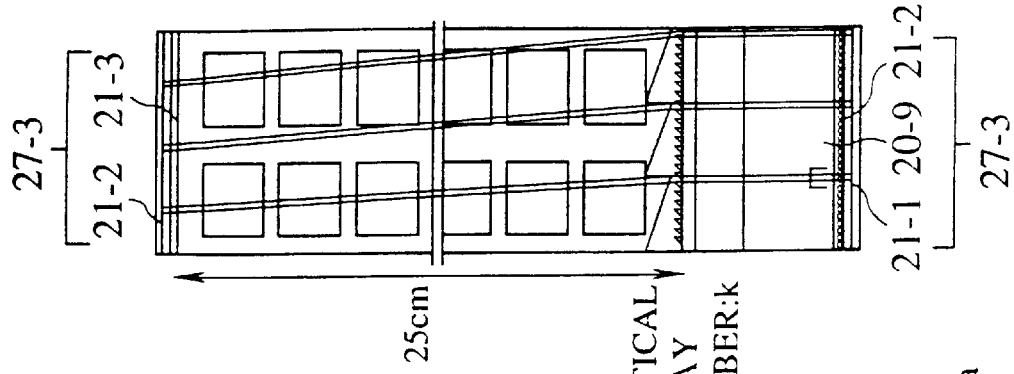
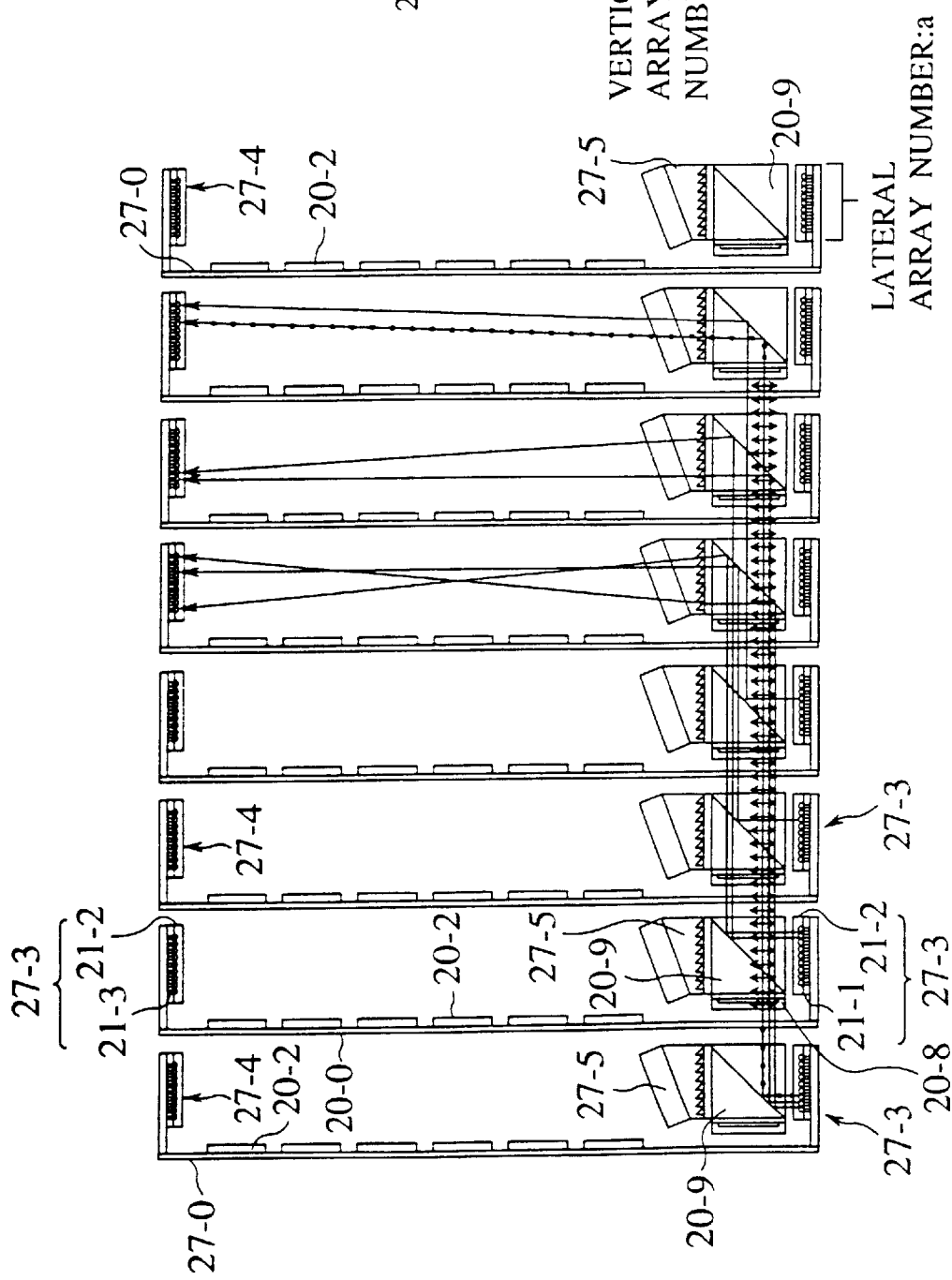

BOARD-TO-BOARD AND UNIT-TO-UNIT OPTICAL INTERCONNECTION SYSTEM

BACKGROUND OF THE INVENTION

1. Field of the Invention

The present invention relates to a board-to-board optical interconnection system for connecting respective boards by virtue of very high speed, super high density and huge capacity optical signals in such a system that a plurality of boards on which electronic parts such as very high speed, super high density and large capacity ATM (Asynchronous Transfer Mode) switch LSIs are mounted are assembled like a book shelf.

In addition, the present invention relates to a unit-to-unit (shelf-to-shelf) optical interconnection system for connecting respective boards in different units by virtue of the optical signals in such a system that a plurality of boards on which electronic parts such as very high speed, super high density and large capacity ATM switch LSIs are mounted are assembled like a book shelf respectively to be packaged in a plurality of units which are then arranged in a cabinet in a matrix fashion.

2. Description of the Prior Art

As shown in FIG. 1, N×N switches are arranged in L rows and M columns to construct a large capacity switching system. 1-1 is an N×N switch, and 1-2 is a wiring for connecting the N×N switches 1-1. In order to reduce cell loss probability, the N×N switches are also arranged in a multistage fashion. More particularly, as shown in FIGS. 2A and 2B, a plurality of boards 2-1 are assembled like a book shelf and then the boards 2-1 are mutually connected via board-to-board optical interconnections 2-2. In addition, in order to realize the large capacity switching system by virtue of book shelf type assembling, an arrangement as shown in FIG. 3 is needed. In other words, a plurality of units(shelves) 3-2, in each of which the boards 2-1 are assembled like the book shelf and then the boards 2-1 can be connected via board-to-board optical interconnections 2-2, are arranged in the multistage fashion. At this time, respective boards 2-1 between different units 3-2 can also be optically connected via unit-to-unit optical interconnections 3-3. 3-1 is a cabinet in which all the units 3-2 are housed. Schematic appearances of the cabinet and the units are shown in FIG. 4. 4-1 is a door, 4-2 are beams emitted from the unit 3-2 and input into the unit 3-2, and 4-3 is an electrical connector connected to an electric backplane.

Meanwhile, ATM switching board interconnection which have been practically used at present are made in principle of electric wirings. Performance of the interconnection is determined according to a pin density of the electrical connector and a transmission rate of the signal. Currently the pin density of the electrical connector is about $1/mm^2$. A power of about 1W is at present needed to transmit the electric signal over several centimeters at a transmission rate of 100 Mbit/s, and therefore heat radiation must be taken account. Besides, there has been the problem that EMC (ElectroMagnetic Compatibility) noises are generated when high speed signals travels through the boards. For this reason, it has been said that, if the boards are connected via the electric signals, the critical transmission rate is several 100 Mbit/s and the critical connector density is $1/Mm^2$. However, the transmission rate of the signal and the pin density of the connector tend to increase year by year, thereby approaching their critical values. In order to overcome such critical values, board-to-board optical interconnection has been given much attention in the art. As the optical interconnection between ATM switch boards or between the units, an optical interconnection module, in which a semiconductor laser array and a detector array are connected via an optical fiber array, has been developed and has already reached a commercially available stage (see J. Nishikido, S. Hino, S. Urushidani and K. Yamasaki; "Demonstration of Optically Interconnected Switching Network", GLOBECOM '93, pp. 1187–1191).

However, throughput of the optical interconnection module of fiber type is about several tens Gbit/s at most. Such throughput of the optical interconnection module is not sufficient for optical interconnection between future huge capacity ATM switch boards whose throughput is in the range from 1 Tbit/s to 10 Tbit/s. Therefore, a free-space optical interconnection, in which the transmitter and the detector can be directly connected without the optical fiber by rendering optical beams to travel in a free-space, has been studied as a promising candidate. The free-space optical interconnection has such various excellent advantages that no mutual interference exists between optical signals, super high density optical interconnection can be established, low skew can be achieved between optical signals, no electric noise is caused, lower optical coupling loss can be achieved, etc.

Various approaches have been proposed to implement the huge capacity ATM switch. An example of such approaches will be explained with reference to FIG. 5. As shown in an upper detailed view in FIG. 5, N×N subnetworks LSI 5-2 (including MCM packaging) are first prepared with the use of 2×2 switches 5-1 as basic unit switches and then mounted on the board. Then, these boards are arranged like a book shelf of M stage and L column and then connected via optical paths. An advantage of this packaging approach resides in that, once the basic N×N subnetwork switch boards are prepared, it is feasible to freely expand and reduce the capacity of the switch by arbitrarily changing the numbers of M stage and L column of the book shelf. If these boards are arranged like the book shelf, parallel and cross interconnections extending over plural boards are needed, as shown in FIG. 6A.

For contrast, there has been another approach wherein 2×2 basic unit switches 5-1 are cut out as vertical regions, as shown by a broken line a in FIG. 5, and then assembled on one sheet of the board. In this case, parallel and cross interconnections between neighboring boards are applied as interconnections, as shown in FIG. 6B. As one example of this configuration, there has been the digital regenerative optical switch (SEED) system 5 proposed by the Bell Laboratories or the EARS switch (16×16 switch, four stage arrangement) proposed by the NTT, both having been studied for the purpose of large capacity ATM switch. An advantage of these configurations is that they are suited for super high density optical interconnection since the chip-to-chip interconnection and the board-to-board interconnection are required only between neighboring chips and neighboring boards.

A number of reports on the free-space optical interconnection for connecting the neighboring boards have been delivered.

For instance, Hinton et al. with the Magill University have proposed the optical backplane in which free-space super-parallel optical interconnection and the optical digital regenerative switch (SEED) are employed as the backplane (T. Szymanski and H. S. Hilton, "An Architecture of a Terabit Free-Space Photonic Backplane", The International Conference on Optical Computing Technical Digest, OC'94, Edinburgh, Scotland, Aug. 22–25, (1944) WD2/221).

Further, in order to optically connect parallel processors, Sakano et al. with the NTT have accomplished the 20 Mbit/s neighboring board free-space optical interconnection system, though low density and low speed, in which four sheets of the boards on which 4×4 LEDs and detectors are mounted are arranged (T. Sakano, T. Matsumoto, and K. Noguchi; "Three-Dimensional Board-to-Board Free-Space Interconnections and Their Application to the Prototype Multiprocessor System: COSINE-III", Applied Optics, vol. 34, pp. 1815–1822, 1995).

Still further, as the high speed neighboring board free-space optical interconnection, D. Z. Tsang with the MIT has finished the optical interconnection with 20 channel at a transmission rate of 1 Gbit/s per channel by transmitting collimated optical beams from the semiconductor laser over a 24 cm distance with the use of micro positioner (D. Z. Tsang; "One-Gigabit per Second Free-Space Optical Interconnection", Applied Optics, vol. 29, pp. 2034–2037, 1990).

In the meanwhile, as the board-to-board optical interconnection, there have been the optical interconnection in which board-to-board bus connection can be realized by means of D-fibers (P. Healey; "Chapter 7 Multidimensional Switching Systems in Photonics in Switching, Vol. II", Edited by J. E. Midwinter, Pressed by Academic Press (London)), the optical interconnection in which holograms are employed on the backplane (P. C. Kim; "An Optical Holographic Backplane Interconnect System", J. Lightwave. Tech. Vol. 9, pp. 1650–1656, 1991). In addition to the above, Mikazuki et al. with the NTT has connected the boards by optical fibers via optical couplers and distributed the clock of 1 Gbit/s for the purpose of board-to-board optical bus interconnection (K. Itoh, R. Konno, Y. Katagiri, and T. Mikazuki; "Data Transmission Performance of an Optical Backboard Bus", Proc. of Japan IEMT, pp. 268–271, 1995).

However, in the optical interconnection above described in the prior art, there has arisen the problem that intermediate amplifiers have to be provided in the optical interconnection using the D-fibers since considerable loss is caused therein.

Besides, in the board-to-board optical interconnection using the stationary holographic backplane, there have been such problems that unnecessary higher order lights such as zero order, –first order, ±second order, etc. lights other than the desired light are generated to thereby increase crosstalk, and it entails too enormous cost to fabricate a large hologram covering the overall backplane, and further it is difficult to achieve the optical beam alignment such that the wavelength of the transmitter can be controlled precisely so as to establish desired optical interconnection.

In the board-to-board optical interconnection in which the optical fibers are placed via the optical couplers, there has been such a problem that its throughput has been restricted to several tens Gbit/s at most.

Moreover, in the prior art, there has been such a problem that merely the electric interconnection using the electric backplane is presented as the unit-to-unit interconnection and its throughput is very low. In addition, the optical interconnection in which the units are connected by the optical fibers has been studied, but its throughput is low, e.g., 10 Gbit/s at most in the existing state.

SUMMARY OF THE INVENTION

The present invention has been made in view of the above circumstances, and it is an object of the present invention to provide a board-to-board free-space optical interconnection system passing through boards which is capable of setting up super high density, large capacity optical interconnection between respective boards precisely at low cost, without exactly controlling a wavelength of a light emitted from a light source.

It is another object of the present invention to provide a board-to-board optical interconnection system which does not need intermediate amplifiers because of its small loss and is capable of establishing an optical beam alignment precisely at low cost with less free-space crosstalk.

It is still another object of the present invention to provide a unit-to-unit optical interconnection system which is capable of transmitting board-to-board optical signals between different units via free-space optical interconnection.

In order to achieve the above objects, according to an aspect of the present invention, there is provided an optical interconnection system comprising: a plurality of boards on each of which electronic circuits are mounted and in each of which an opening portion is formed; supporting members for supporting the plurality of boards like a book shelf; transmitter arrays provided on respective one end portions of the plurality of boards, for outputting an optical beam array; polarization control array devices provided in opening portions of the plurality of boards, for controlling polarization direction of respective optical beams in the optical beam array passing through the opening portions; polarization beam splitters provided close to the polarization control array devices, for receiving the optical beam array output from the transmitter arrays to turn by a right angle so as to direct to the opening portions of the board in a succeeding stage, and for directing the optical beam array, which is input from the board in a preceding stage via the polarization control array devices, straight to the opening portions of the board in a succeeding stage or for turning the optical beam array by a right angle in a first direction, in response to control of the polarization control array devices; first light deflection control array devices provided closed to one sides corresponding to the first direction of the polarization beam splitters, for controlling individually propagation directions of respective optical beams which are turned by the polarization beam splitters by a right angle; and detector arrays provided on the one sides of the plurality of boards, for receiving respective optical beams whose propagation directions are controlled by the first light deflection control array devices.

The optical beam emitted from the transmitter array is input into the polarization beam splitter, and then turned by a right angle to input the opening portion of the board in succeeding stage. Then, polarization of the optical beam is controlled by the polarization control array device provided on the opening portion to thereby rotate a plane of polarization by 90°, then the optical beam is turned by the polarization beam splitter by a right angle to input into the light deflection control array device which then controls the propagation direction of the optical beam to input into the desired photodetector. On the other hand, the optical beam whose plane of polarization is not rotated by the polarization control array device by 90° passes through the polarization beam splitter along the propagation direction to input into the opening portion of the board in succeeding stage, and is then controlled similarly.

In the preferred embodiment of the present invention, the transmitter arrays and the detector arrays are provided vertically with the board.

According to this embodiment, higher package density can be accomplished on the boards.

In the preferred embodiment of the present invention, the transmitter arrays and the detector arrays are provided parallel with the board, and the present invention further comprises, first prism mirrors for turning the optical beam array output from the transmitter arrays by a right angle to direct to the polarization beam splitters; and second prism mirrors for turning the optical beam array, which is output from the polarization beam splitters in the first direction, by a right angle to input into the detector arrays.

In the preferred embodiment of the present invention, the transmitter arrays include second light deflection control array devices which control individually propagation directions of respective optical beams in the optical beam array output.

In the preferred embodiment of the present invention, the transmitter arrays include fixed-angle light deflection devices which deflect fixedly and individually propagation directions of respective optical beams in the optical beam array output.

According to this embodiment, after the optical beam group is roughly deflected by the fixed-angle light deflection devices, the light deflection control devices can be used for fine control.

In the preferred embodiment of the present invention, the transmitter arrays include beam array batch deflection control devices which deflect collectively the optical beam array output.

According to this embodiment, even if the optical beam array is deviated as a whole due to mechanical factor, etc., there is such an advantage that it can be collectively corrected.

In the preferred embodiment of the present invention, the first light deflection control array devices and the second light deflection control array devices are composed respectively of a liquid crystal microprism array in which a liquid crystal is sandwiched by a planar substrate and a microprism array plate having transparent electrodes and alignment layer thereon.

In the preferred embodiment of the present invention, the first light deflection control array devices and the second light deflection control array devices are composed respectively of a liquid crystal prism array in which two sheets of liquid crystal prism arrays are stuck orthogonally.

In the preferred embodiment of the present invention, the first light deflection control array devices and the second light deflection control array devices are composed respectively of a liquid crystal deflection control array device in which a liquid crystal layer is sandwiched by array split electrodes having a window therein.

In the preferred embodiment of the present invention, the first light deflection control array devices and the second light deflection control array devices are composed respectively of an electrostatic control micro mirror array in which beam propagation directions can be controlled by an electrostatic force.

In the preferred embodiment of the present invention, the first light deflection control array devices and the second light deflection control array devices are composed respectively of a hologram in which a diffraction grating can be written.

In the preferred embodiment of the present invention, the first light deflection control array devices and the second light deflection control array devices are composed respectively of a rotation mirror array in which beam propagation directions can be controlled mechanically.

In the preferred embodiment of the present invention, the first light deflection control array devices and the second light deflection control array devices are composed respectively of a rotation prism array in which beam propagation directions can be controlled mechanically.

In the preferred embodiment of the present invention, the fixed-angle deflection device is formed of a hologram, a prism array, or a mirror array.

In the preferred embodiment of the present invention, the beam array batch deflection control device is formed of a variable apex angle prism.

In the preferred embodiment of the present invention, the beam array batch deflection control device is formed of a liquid crystal prism array in which two liquid crystal prism arrays are orthogonally stuck.

In the preferred embodiment of the present invention, the polarization control array devices are formed of a twisted nematic liquid crystal which is sandwiched by array-shaped transparent electrodes.

In the preferred embodiment of the present invention, the transmitter arrays include vertical cavity surface emitting laser diode (VCSEL) arrays for emitting the optical beam array respectively.

The preferred embodiment of the present invention further comprises: a monitor beam VCSEL included in the transmitter arrays, for emitting a monitor beam; a position sensor included in the receiver arrays, for receiving the monitor beam via the polarization control array devices, the polarization beam splitters, and the first light deflection control array devices to detect its position; and a feedback circuit for controlling the beam array batch deflection control devices in response to the position of the monitor beam detected by the position sensor.

According to this embodiment, even if the optical beam array is deviated as a whole due to mechanical factor, etc., there is such an advantage that it can be collectively corrected.

According to another aspect of the present invention, there is provided an optical interconnection system applied to a cabinet in which a plurality of boards on each of which electronic circuits are mounted are assembled like a book shelf by supporting members to constitute units and then plural units are stuck in a direction parallel with the boards, the optical interconnection system comprising: transmitter arrays provided on boards in at least preselected stages in respective units, for outputting an optical beam array; light deflection control array devices for controlling individually propagation directions of respective optical beams of the optical beam array emitted from the transmitter arrays; output prism mirrors for turning the optical beam array emitted from the light deflection control array devices by a right angle; input prism mirrors provided on respective boards in succeeding stage to the boards on which the transmitter arrays are provided, for turning the optical beam array, which is emitted from the output prism mirrors in other units, by a right angle to direct to corresponding boards; and detector arrays composed of a plurality of detectors to receive the optical beam array emitted from the input prism mirrors; and wherein the light deflection control array devices control individually propagation directions of the optical beams of the optical beam array to input the optical beam into desired detectors of the board in succeeding stage in desired units.

According to the present invention, the board-to-board free-space optical interconnection system between the boards in a certain unit and a different unit arbitrarily can be established freely by introducing the light deflection control array device which is capable of controlling the propagation direction of the optical beam.

The preferred embodiment of the present invention further comprises macro lenses for receiving the optical beam array emitted from the output prism mirrors and forming images of the transmitter arrays on the detector arrays.

According to this embodiment, the units can be connected by images in place of the optical beam.

According to still another aspect of the present invention, there is provided an optical interconnection system applied to a cabinet in which a plurality of boards on each of which electronic circuits are mounted are assembled like a book shelf by supporting members to constitute units and then plural units are stuck in a direction parallel with the boards, the optical interconnection system comprising: transmitter arrays provided on boards in at least preselected stages in respective units, for outputting an optical beam array; light deflection control array devices for controlling individually propagation directions of respective optical beams of the optical beam array emitted from the transmitter arrays; polarization control array devices provided to correspond to respective boards in at least preselected stages, for controlling polarization directions of respective optical beams in the optical beam array emitted from remaining units; polarization beam splitters provided close to the propagation control array devices, for receiving the optical beam array emitted from corresponding light deflection control array devices and then turning by a right angle to direct to remaining units, and directing the optical beam array, which is input from the other units via the polarization control array devices, straight to the other units or turning the optical beam array by a right angle to the boards in succeeding stage in response to control of the polarization control array devices; and detector arrays composed of a plurality of detectors provided on the boards in succeeding stages to receive the optical beam array emitted from corresponding polarization beam splitters.

The preferred embodiment of the present invention further comprises fixed-angle light deflection devices which deflect fixedly and individually propagation directions of respective optical beams in the optical beam array emitted from the transmitter arrays.

The preferred embodiment of the present invention further comprises beam array batch deflection control devices which deflect collectively the optical beam array emitted from the transmitter arrays.

In the preferred embodiment of the present invention, the light deflection control array devices are composed of a liquid crystal microprism array in which a liquid crystal is sandwiched by a planar substrate and a microprism array plate having transparent electrodes and alignment layer thereon.

In the preferred embodiment of the present invention, the light deflection control array devices are composed of a liquid crystal prism array in which two sheets of liquid crystal prism arrays are stuck orthogonally.

In the preferred embodiment of the present invention, the light deflection control array devices are composed of a liquid crystal deflection control array device in which a liquid crystal layer is sandwiched by array split electrodes having a window therein.

In the preferred embodiment of the present invention, the light deflection control array devices are composed of an electrostatic control micro mirror array in which beam propagation directions can be controlled by an electrostatic force.

In the preferred embodiment of the present invention, the light deflection control array devices are composed of a hologram in which a diffraction grating can be written.

In the preferred embodiment of the present invention, the light deflection control array devices are composed of a rotation mirror array in which beam propagation directions can be controlled mechanically.

In the preferred embodiment of the present invention, the light deflection control array devices are composed of a rotation prism array in which beam propagation directions can be controlled mechanically.

In the preferred embodiment of the present invention, the fixed-angle deflection device is formed of a hologram, a prism array, or a mirror array.

In the preferred embodiment of the present invention, the beam array batch deflection control device is formed of a variable apex angle prism.

In the preferred embodiment of the present invention, the beam array batch deflection control device is formed of a liquid crystal prism array in which two liquid crystal prism arrays are orthogonally stuck.

In the preferred embodiment of the present invention, the polarization control array devices are formed of a twisted nematic liquid crystal which is sandwiched by array-shaped transparent electrodes.

The preferred embodiment of the present invention further comprises: a monitor beam VCSEL included in the transmitter arrays, for emitting a monitor beam; a position sensor included in the receiver arrays, for receiving the monitor beam via the light deflection control array devices, the beam array batch deflection control device, the output prism mirror, and the input prism mirror to detect its position; and a feedback circuit for controlling the beam array batch deflection control devices in response to the position of the monitor beam detected by the position sensor.

The preferred embodiment of the present invention further comprises: a monitor beam VCSEL included in the transmitter arrays, for emitting a monitor beam; a position sensor included in the receiver arrays, for receiving the monitor beam via the light deflection control array devices, the beam array batch deflection control device, the output prism mirror, the macro lens, and the input prism mirror to detect its position; and a feedback circuit for controlling the beam array batch deflection control devices in response to the position of the monitor beam detected by the position sensor.

The preferred embodiment of the present invention further comprises: a monitor beam VCSEL included in the transmitter arrays, for emitting a monitor beam; a position sensor included in the receiver arrays, for receiving the monitor beam via the light deflection control array devices, the beam array batch deflection control device, the polarization control array devices, and the polarization beam splitters to detect its position; and a feedback circuit for controlling the beam array batch deflection control devices in response to the position of the monitor beam detected by the position sensor.

According to yet still another aspect of the present invention, there is provided an optical interconnection system comprising: a plurality of boards on each of which electronic circuits are mounted; supporting members for supporting the plurality of boards like a book shelf; a mirror arranged perpendicular to the plurality of boards at predetermined distances from respective ends of the plurality of boards; transmitter arrays provided on respective end portions of the plurality of boards, for outputting an optical beam array; light deflection control array devices for receiving the optical beam array from the transmitter arrays, controlling propagation directions of respective optical beams of the optical beam array individually and variably, and inputting the optical beam array into the mirror with a gradient; and detector arrays provided on respective end portions of the plurality of boards, for receiving the optical beam array reflected by the mirror.

The preferred embodiment of the present invention further comprises fixed-angle light deflection devices which deflect fixedly and individually propagation directions of respective optical beams in the optical beam array emitted from the transmitter arrays.

The preferred embodiment of the present invention further comprises beam array batch deflection control devices which deflect collectively the optical beam array emitted from the transmitter arrays.

In the preferred embodiment of the present invention, the light deflection control array devices are composed of a liquid crystal microprism array in which a liquid crystal is sandwiched by a planar substrate and a microprism array plate having transparent electrodes and alignment layer thereon.

In the preferred embodiment of the present invention, the light deflection control array devices are composed of a liquid crystal prism array in which two sheets of liquid crystal prism arrays are stuck orthogonally.

In the preferred embodiment of the present invention, the light deflection control array devices are composed of a liquid crystal deflection control array device in which a liquid crystal layer is sandwiched by array split electrodes having a window therein.

In the preferred embodiment of the present invention, the light deflection control array devices are composed of an electrostatic control micro mirror array in which beam propagation directions can be controlled by an electrostatic force.

In the preferred embodiment of the present invention, the light deflection control array devices are composed of a hologram in which a diffraction grating can be written.

In the preferred embodiment of the present invention, the light deflection control array devices are composed of a rotation mirror array in which beam propagation directions can be controlled mechanically.

In the preferred embodiment of the present invention, the light deflection control array devices are composed of a rotation prism array in which beam propagation directions can be controlled mechanically.

In the preferred embodiment of the present invention, the fixed-angle deflection device is formed of a hologram, a prism array, or a mirror array.

In the preferred embodiment of the present invention, the beam array batch deflection control device is formed of a variable apex angle prism.

In the preferred embodiment of the present invention, the beam array batch deflection control device is formed of a liquid crystal prism array in which two liquid crystal prism arrays are orthogonally stuck.

The preferred embodiment of the present invention further comprises: a monitor beam VCSEL included in the transmitter arrays, for emitting a monitor beam; a position sensor included in the receiver arrays, for receiving the monitor beam via the light deflection control array devices and the mirror to detect its position; and a feedback circuit for controlling the beam array batch deflection control devices in response to the position of the monitor beam detected by the position sensor.

In the preferred embodiment of the present invention, second mirrors are placed on an outside of one outermost board of the first board group being boards assembled like a book shelf along an optical beam propagation direction at an angle non-parallel with first mirrors serving as the mirrors, and a spatial alignment of the second mirrors is determined such that the optical beams reaching the second mirrors are reflected to re-input into the first mirror and then the optical beams are input into the detector arrays mounted on second board groups inserted between the boards of the first board group like the book shelf.

In the preferred embodiment of the present invention, third mirrors are placed on an outside of other outermost board opposite to one outermost board of the first and second board groups being boards assembled like a book shelf at an angle non-parallel with first mirrors, and a spatial alignment of the third mirrors is determined such that the optical beams reaching the third mirrors after reflected by the second mirrors are reflected to re-input into the first mirror and then the optical beams are input into the detector arrays mounted on third board group inserted between the boards of the first and second board groups like the book shelf.

The nature, principle and utility of the invention will become more apparent from the following detailed description when read in conjunction with the accompanying drawings.

BRIEF DESCRIPTION OF THE DRAWINGS

In the accompanying drawings:

FIG. 7 is a side sectional view showing a configuration of a board-to-board optical interconnection system according to a first embodiment of the present invention;

FIG. 15 is a side view showing a configuration of a board-to-board optical interconnection system according to a third embodiment of the present invention;

FIGS. 28A and 28B are a side sectional view and a front view showing respectively the configuration of the board-to-board optical interconnection system according to the eighth embodiment of the present invention;

DESCRIPTION OF THE PREFERRED EMBODIMENTS

Embodiments of the present invention will be explained with reference to accompanying drawings hereinafter.

FIG. 7 is a sectional view showing a configuration of a board-to-board optical interconnection system according to a first embodiment of the present invention. In the board-to-board optical interconnection system shown in FIG. 7, a plurality of boards are arranged like a book shelf and board-to-board optical interconnection means are then provided to respective lowermost portions of the plurality of boards arranged like the above.

Figure 1:
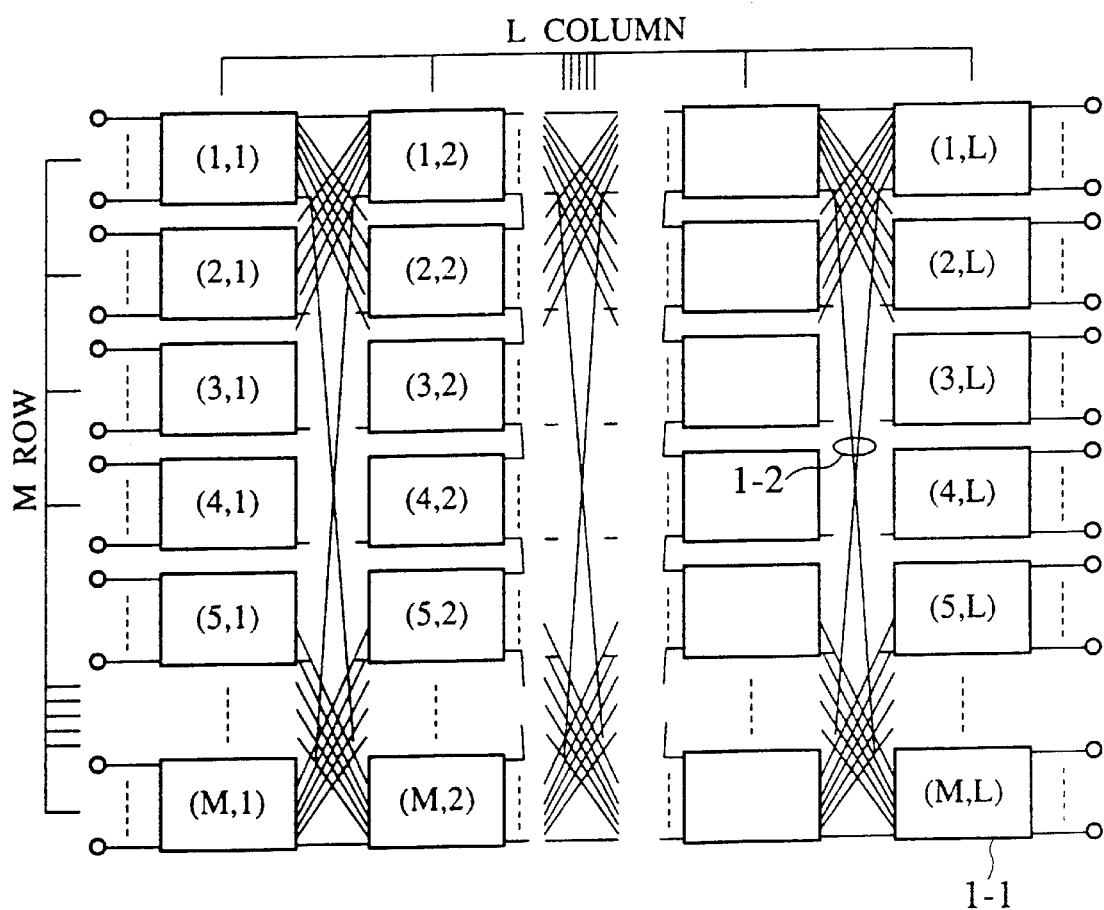
FIG. 1 is a schematic view showing N×N switches in the prior art which are arranged in L row and M column.
Figure 2A:
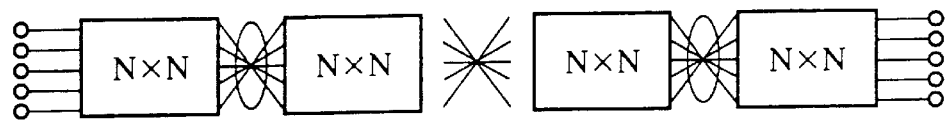
FIGS. 2A and 2B are schematic views showing N×N switch boards in the prior art which are assembled like a book shelf to be connected in a multistage fashion.
Figure 2B:
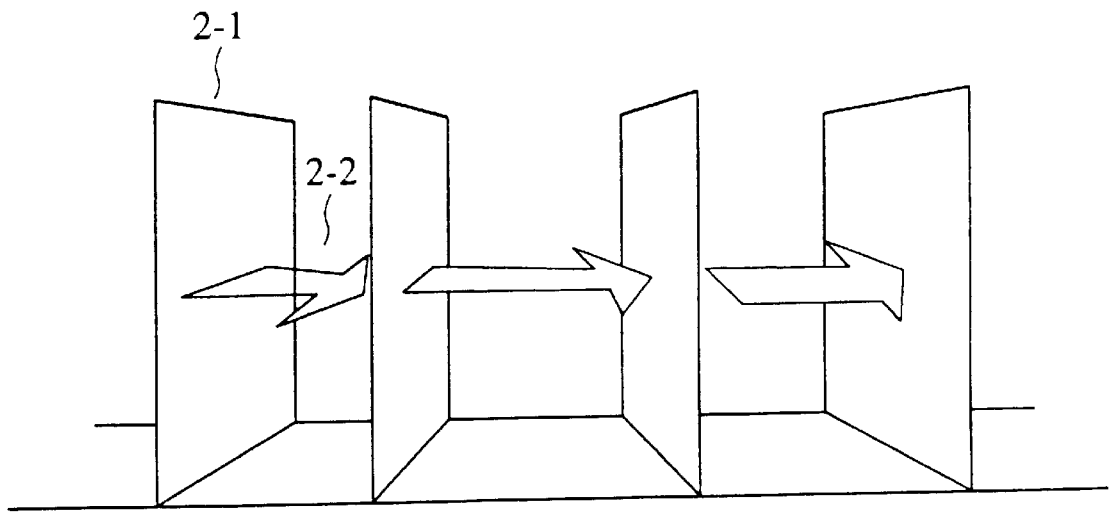
Figure 3:
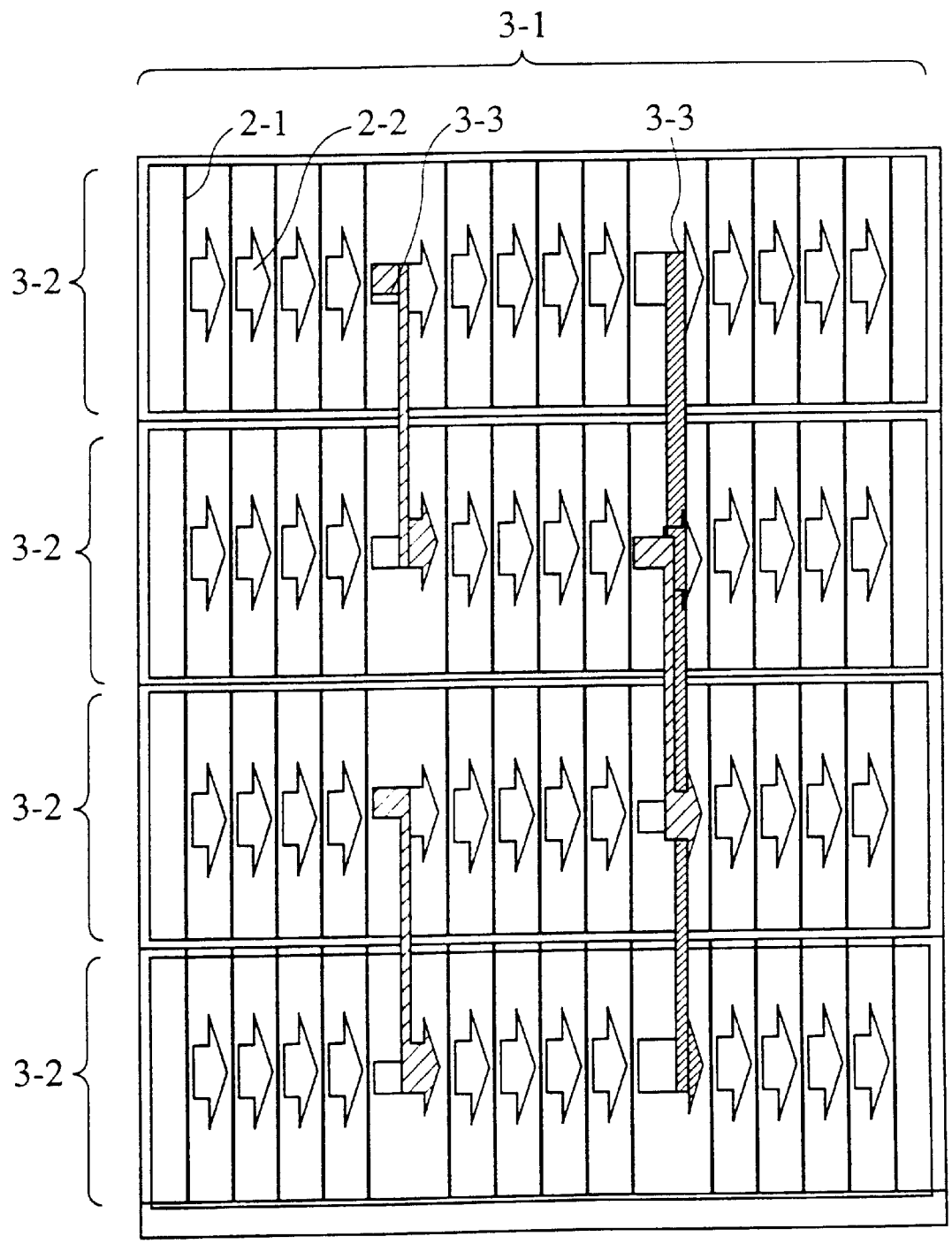
FIG. 3 is a schematic view showing a configuration of a cabinet.
Figure 4:
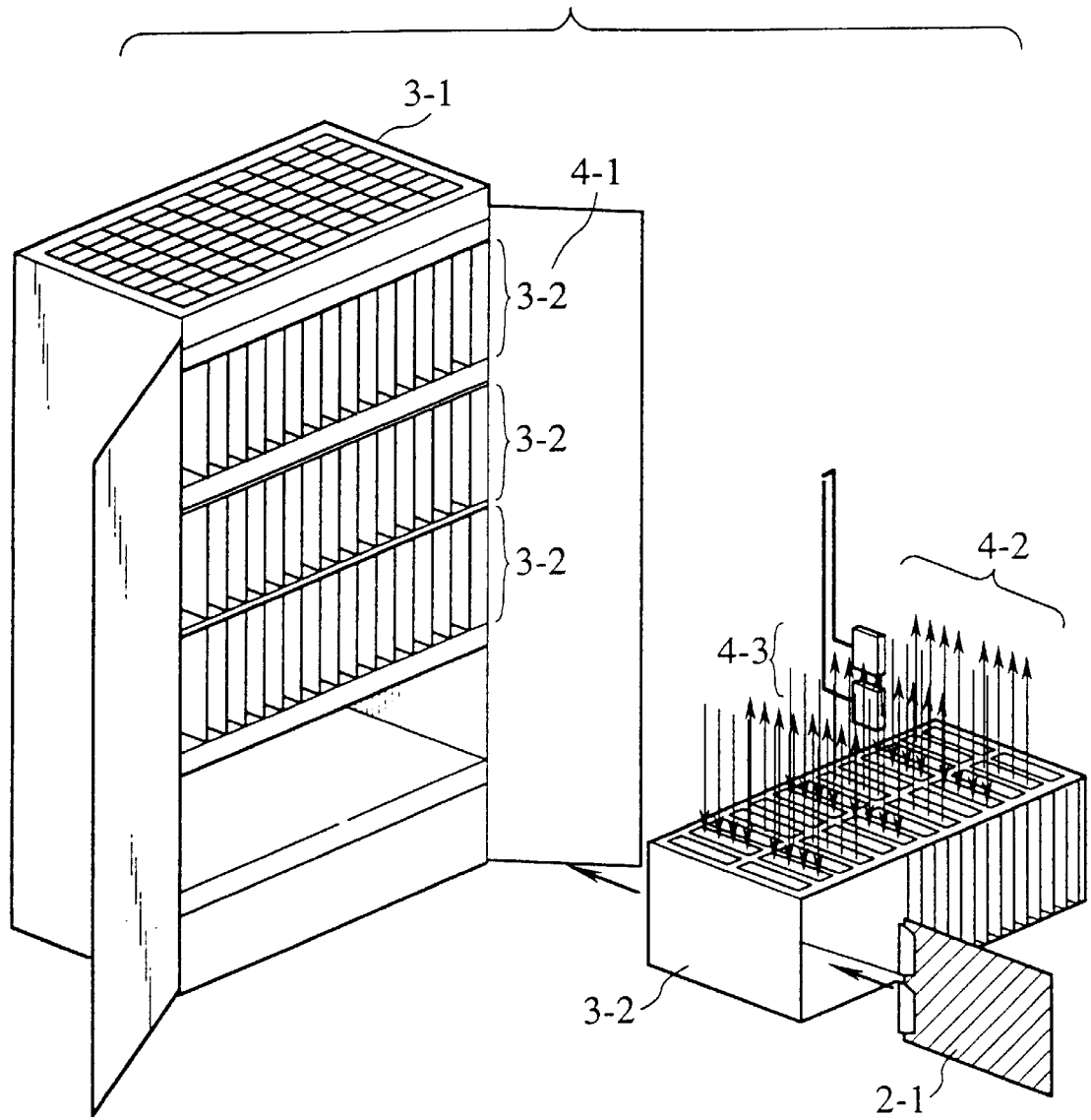
FIG. 4 is a schematic view showing appearances of the cabinet and units(selves) which are housed in the cabinet.
Figure 5:
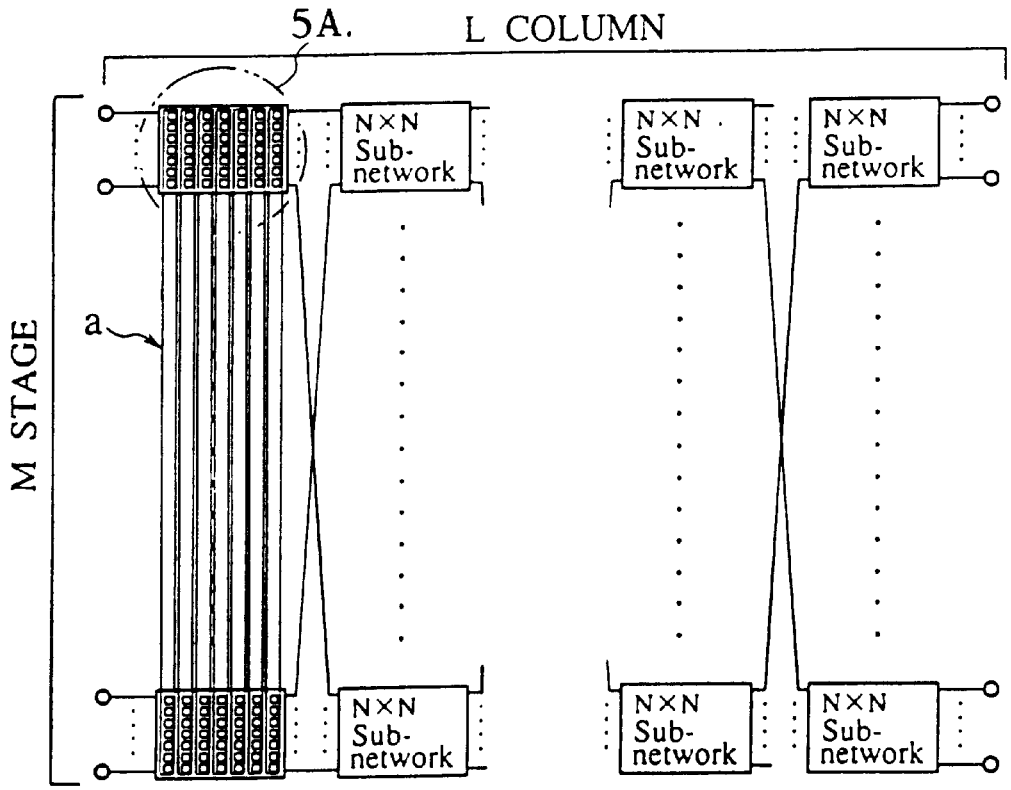
FIG. 5 is a schematic view showing a configuration of the ATM switches in the prior art.
Figure 5A:
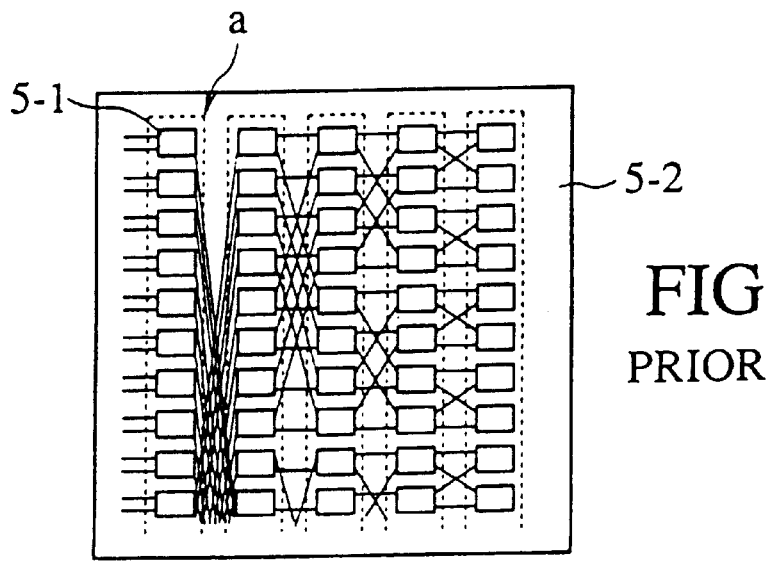
Figure 6A:
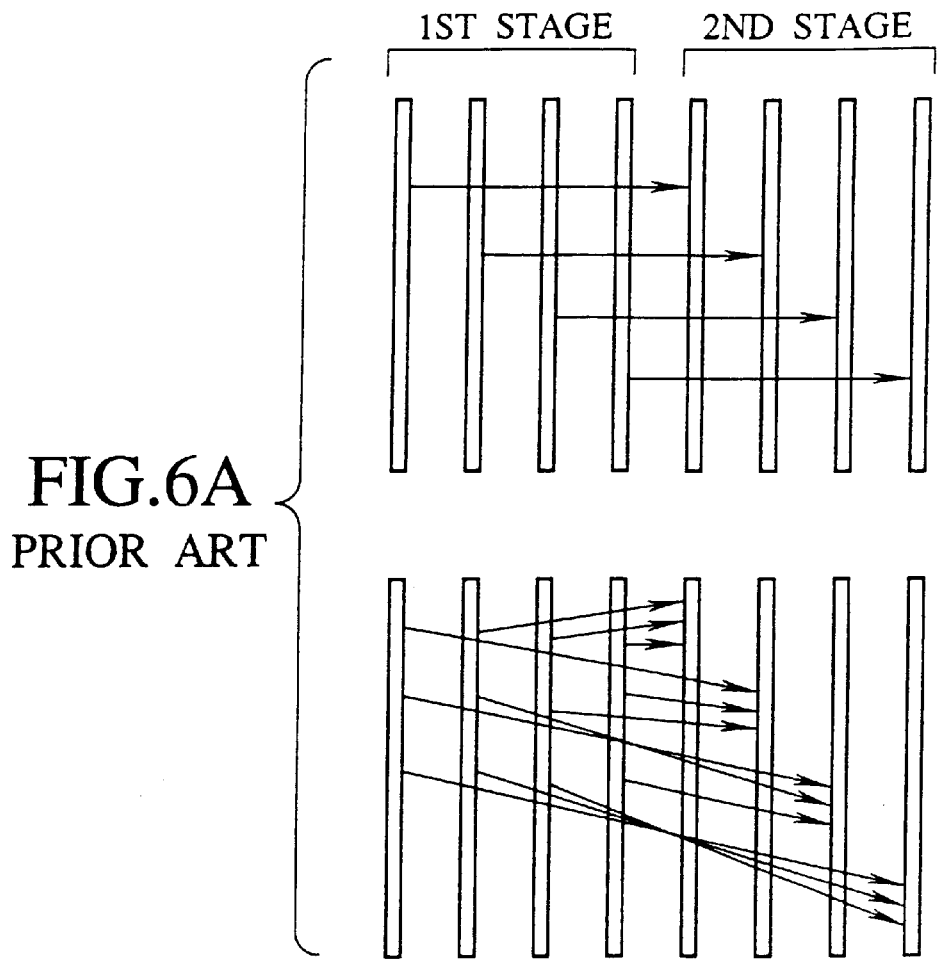
FIG. 6A is schematic view showing board-to-board optical interconnection passing through some boards to constitute very large scale ATM switches.
Figure 6B:
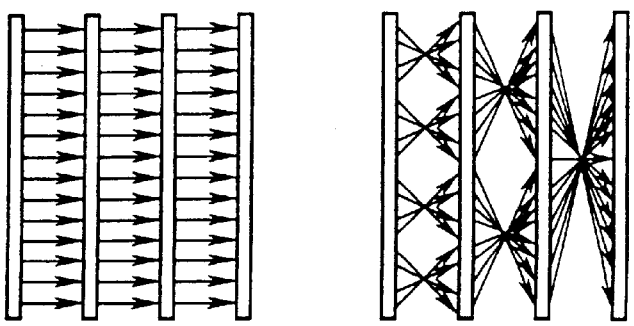
FIG. 6B is schematic view showing optical interconnection between neighboring boards to constitute small scale ATM switches.

In FIG. 7, 2-1 denotes a board on which electric circuits are mounted; 7-1, a vertical cavity surface emitting laser diode(VCSEL) array; 7-2, a lens array for converting the light transmitted from the VCSEL array 7-1 into a collimated beam and condensing the collimated beam; 7-3, a photodetector array for receiving this beam array; and 7-4, a light deflection control array device for controlling a direction of optical beam independently. The light deflection control array device is made of a liquid crystal (LC) microprism array described later herein.

An array pitch is set to 1 mm throughout the VCSEL array 7-1, the lens array 7-2, the photodetector array 7-3, and the LC microprism array 7-4. A focal length of the lens array 7-2 is set to approximately 5 mm. The VCSEL array 7-1, the lens array 7-2, and the LC microprism array 7-4 which are constituted together are assembled to be inclined at an angle from about 5 to 20 degree with respect to the board 2-1. Then, 7-5 denotes a planar mirror for reflecting the optical beam, and 7-6 denotes an optical beam.

The optical beam emitted from the VCSEL array 7-1 is input into the lens array 7-2 with a spreading angle of about 10 degree and then converted into collimated optical beam by the lens array 7-2. But a diameter of the optical beam spreads gradually as the light propagates, and therefore the optical beam has the diameter of about 1 mm when the light propagates over a distance of about 50 cm. The optical beam is emitted from the VCSEL array 7-1 obliquely with the board 2-1 via the lens array 7-2 and the LC microprism array 7-4. The deflected direction of the optical beam passed through the lens array 7-2 is controlled by the LC microprism array 7-4 serving as the light deflection control array device, then is reflected by the planar mirror 7-5 to be coupled to the photodetector array 7-3 having the lens array 7-2 secured to the desired board 2-1.

In FIG. 7, although only the optical beams emitted from the leftmost board are illustrated on account of limited space, actually the optical beams are similarly emitted from all of the boards 2-1. Also, in FIG. 7, although only the foremost optical beam is illustrated on account of space consideration, actually plural optical beams must be depicted along the inside direction perpendicular to the sheet. The optical beams are emitted from all the boards obliquely in the right downward direction. The directions of the optical beams are then controlled by the light deflection control array device to thus make it possible to achieve complicated cross optical interconnections.

Figure 8:
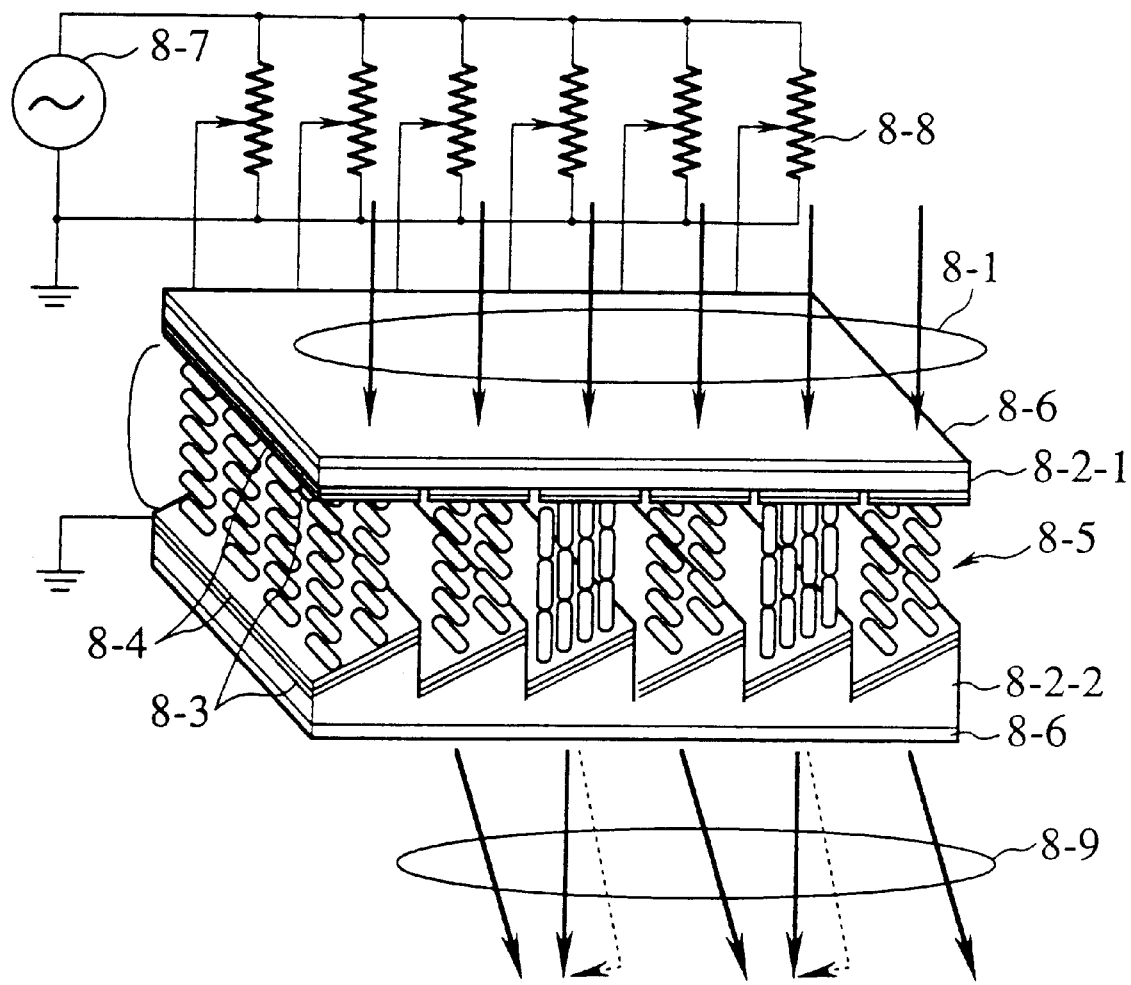
FIG. 8 is a perspective view showing a detailed configuration of a liquid crystal microprism array.

FIG. 8 is a view showing a detailed configuration of the LC microprism array 7-4 serving as the light deflection control array device which is used in the board-to-board optical interconnection system shown in FIG. 7. This LC microprism array is set forth in a literature, for example, K. Hirabayashi, T. Yamamoto, and M. Yamaguchi; "Free-Space Optical Interconnections with Liquid Crystal Microprism Arrays", Applied Optics, vol. 34, pp. 2571–2580, (1995).

In FIG. 8, 8-1 denotes a group of input optical beams; 8-2-1, a transparent planar substrate; 8-2-2, a transparent substrate (e.g., a glass substrate in this embodiment) on one surface of which a sawtooth microprism is formed; 8-3, a transparent electrode; 8-4, an alignment layer; 8-5, an LC layer; 8-6, a anti-reflection coating; 8-7, a power supply for driving the LC layer 8-5; 8-8, a valiable resistance for adjusting a voltage applied to individual prisms; and 8-9, a group of output optical beams. LC molecules are parallel aligned (homogeneously aligned). The transparent electrodes 8-3 formed on the transparent planar substrate 8-2-1 are split correspondingly to respective incident optical beams. The optical beams are input on inclined surfaces of the sawtooth profile of the glass substrate 8-2-2.

If the optical beam having a polarization which is parallel to the LC molecules is input, a refractive index n of the LC element is varied according to the applied voltage. If the applied voltage is increased, the refractive index is varied from $n_e$ to $n_o$. Since usually $\Delta n$ (=$n_e$-$n_o$) is in the range of about 0.2 to 0.25, the deflection direction of the output optical beam can be varied to an extent of about 25% of an apex angle of the prism according to voltage application. In the event that the E-8 liquid crystal manufactured by Merck Corporation having a large difference between ne and no is used as the light deflection control array device which can control the propagation direction of the beam array every optical beam, the deflection direction of the output optical beam can be varied to an extent of about 1.2°, 2.5°, 5°, and 8° in response to the apex angle of 5°, 10°, 20°, and 30° respectively. The deflection direction of the output optical beam can be controlled individually by patterning the transparent electrodes 8-3.

Figure 9:
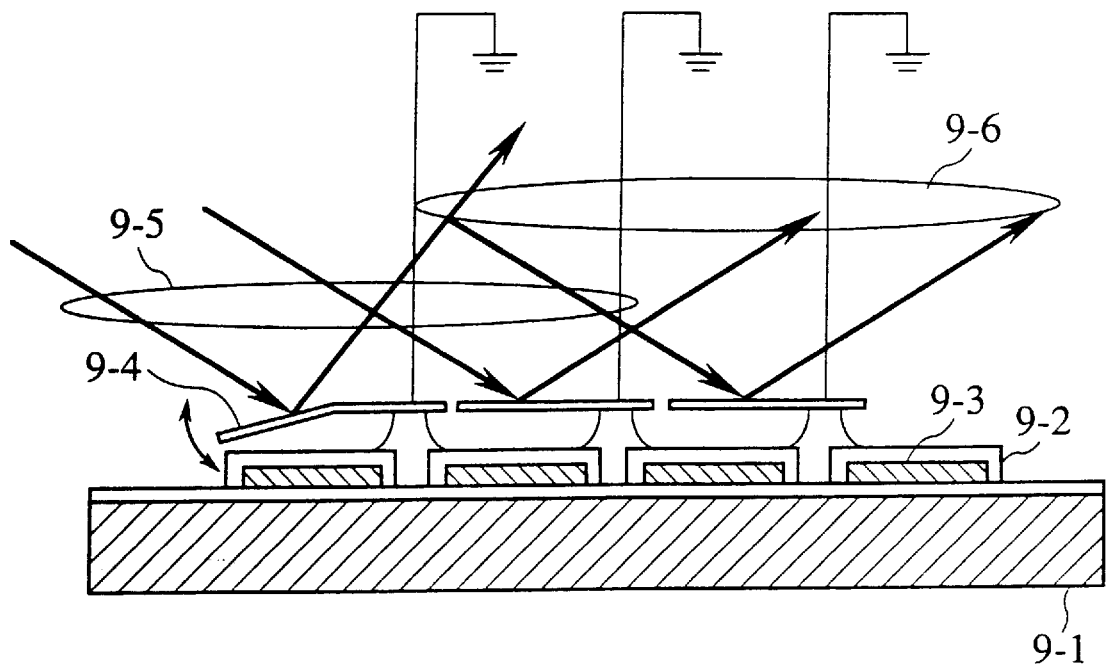
FIG. 9 is a side view showing a sectional view showing a configuration of a micro mirror array.

As another optical beam deflection control array device, there is a micro mirror array. A configuration of the array device is shown in FIG. 9. The micro mirror array is formed on an Si substrate in terms of plasma etching technique. 9-1 denotes an Si substrate; 9-2, an oxide film; 9-3, a mirror direction control electrode; 9-4, an Al mirror; 9-5, a group of incident optical beams; and 9-6, a group of optical beams reflected by the Al mirror 9-4. The Al mirrors 9-4 are grounded. Directions of the Al mirrors 9-4 can be adjusted by controlling the voltage applied to the mirror direction control electrodes 9-3. It has been known that an angle of the Al mirror 9-4 can be continuously varied up to four degrees. According to this array device, the deflection direction of the optical beam array can be adjusted respectively by controlling the voltage applied to individual micro mirrors. As to the details of this array device, see a literature, D. R. Collines, J. B. Sampsell, L. J. Hornbeck, J. M. Florence, P. Andrew Penza, and M. T. Gately; "Deformable Mirror Device Spatial Light Modulators and their Applicability Neural Networks", Applied Optics, Vol. 28 (1989), pp. 4900–4907.

Figure 10A:
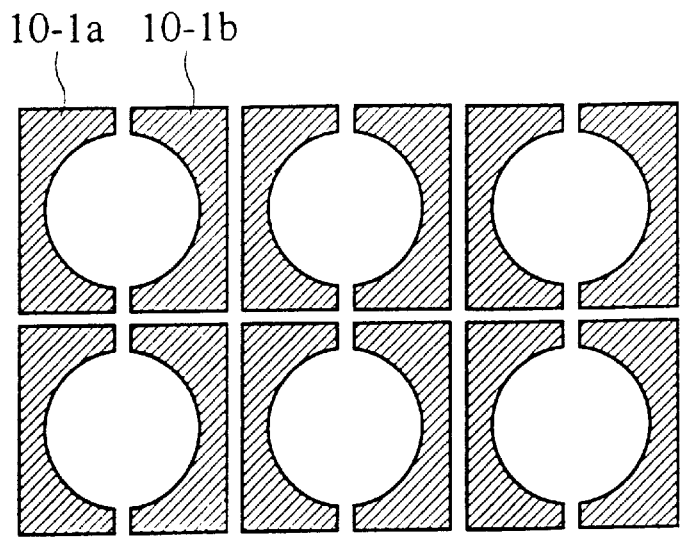
FIGS. 10A to 10E are views showing a configuration of a liquid crystal deflection array device.
Figure 10B:
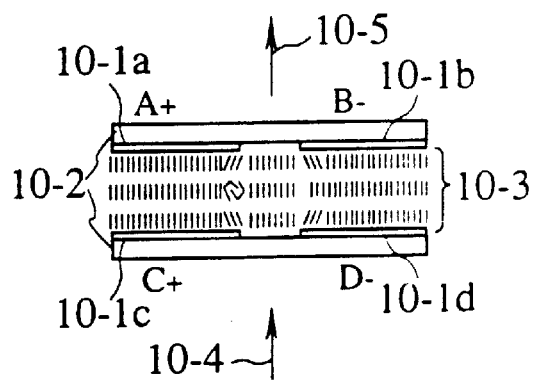
Figure 10C:
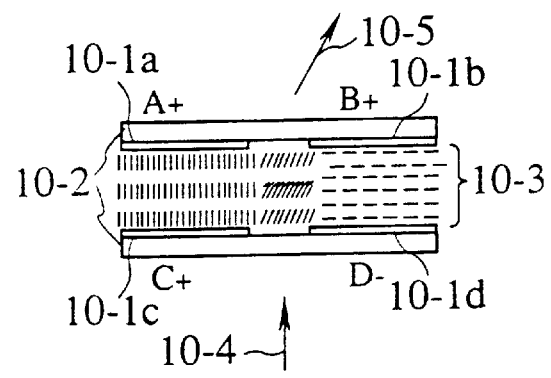
Figure 10D:
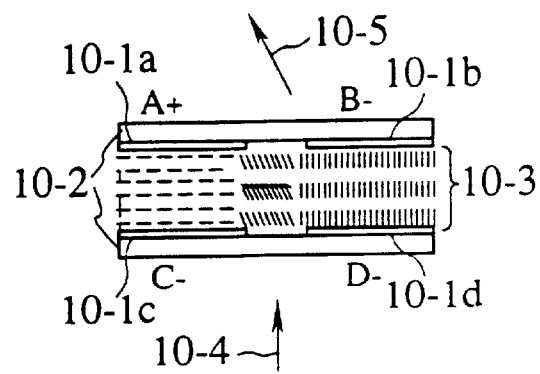
Figure 10E:
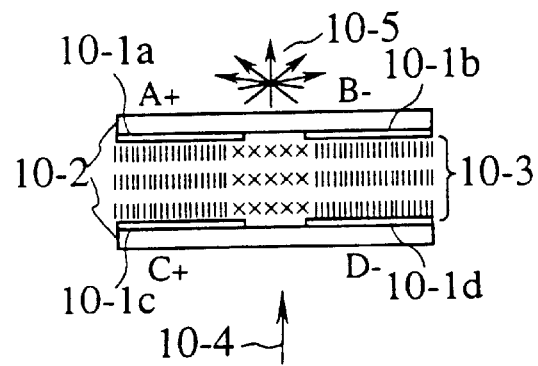

As still another optical beam deflection control array device, there is an LC deflection device. The array device has such a configuration that an LC layer is sandwiched by split electrodes having a window therein. A refractive index distribution is provided to the LC layer by controlling the voltage applied to the split electrodes to thus deflect the optical beam up to about 10 degrees. In the case of this array device, deflection directions of individual optical beams can be controlled. A configuration of the LC deflection array device is shown in FIGS. 10A to 10E. FIG. 10A is a top view of the LC deflection device, and FIGS. 10B to 10E are sectional views of the LC deflection device. 10-1*a*, 10-1*b*, 10-1*c*, 10-1*d* are Al electrodes; 10-2, a glass substrate; 10-3, an LC layer; 10-4, an incident light; and 10-5, an output light. Unless the voltage is applied, the LC assumes homeotropic alignment which is directed perpendicular to the substrate. A polarity of the voltage applied to the Al electrodes 10-1*a* to 10-1*d* is changed to + and −, an alignment distribution of liquid crystal molecules is changed. Thus, the refractive index distribution is changed to thereby deflect the incident optical beam. FIGS. 10B to 10E illustrate behaviors of the optical beam deflection if the voltage applied to the Al electrodes 10-1*a* to 10-1*d* is changed to + and −. The propagation direction of the optical beam can be controlled by varying polarity and magnitude of the voltage applied to respective electrodes. In more detail, see a literature, A. Sasaki and T. Ishibashi; "Liquid-Crystal Light Deflector", Electronics Lett., vol. 10 (1979), pp. 293–294.

Figure 11:
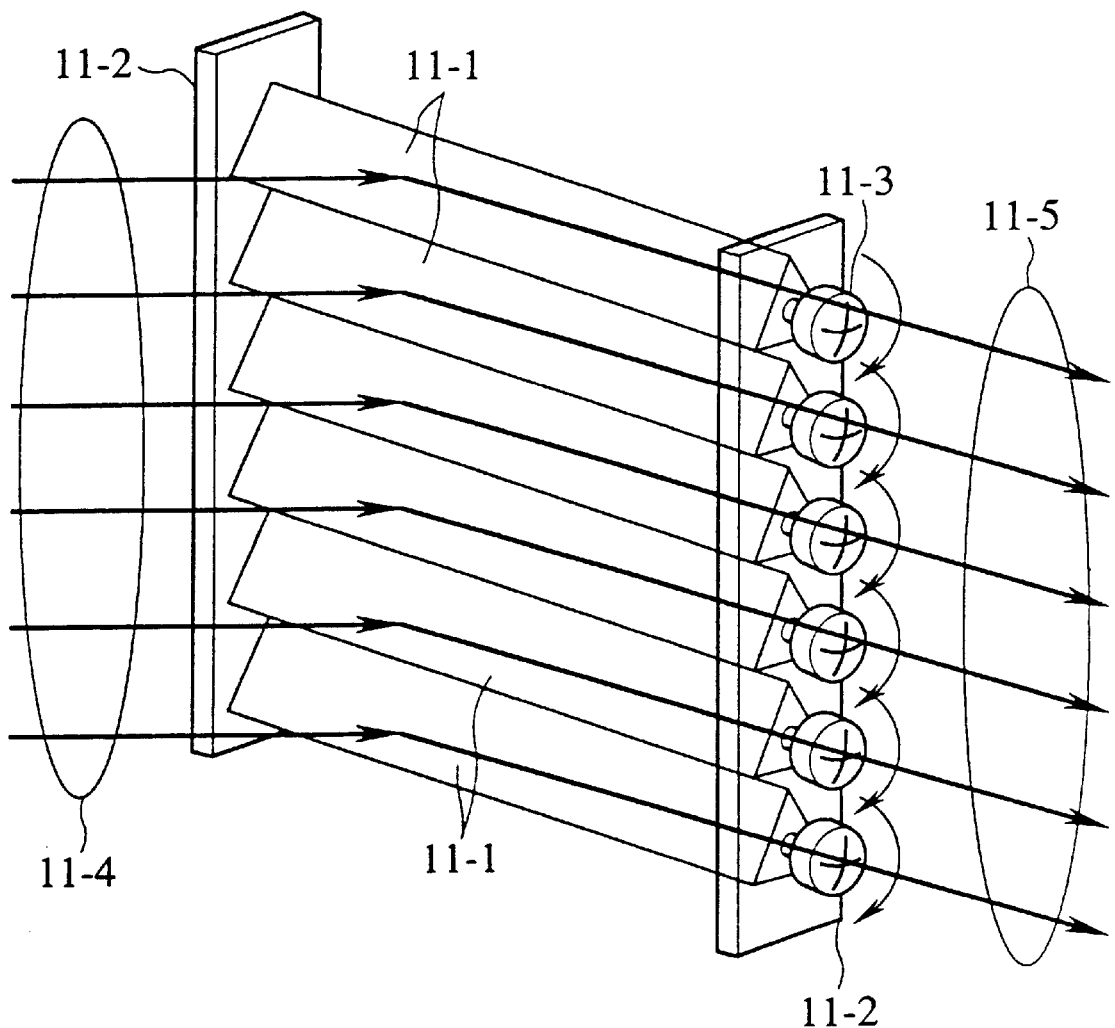
FIG. 11 is a schematic view showing a configuration of a rotation prism array.
Figure 12:
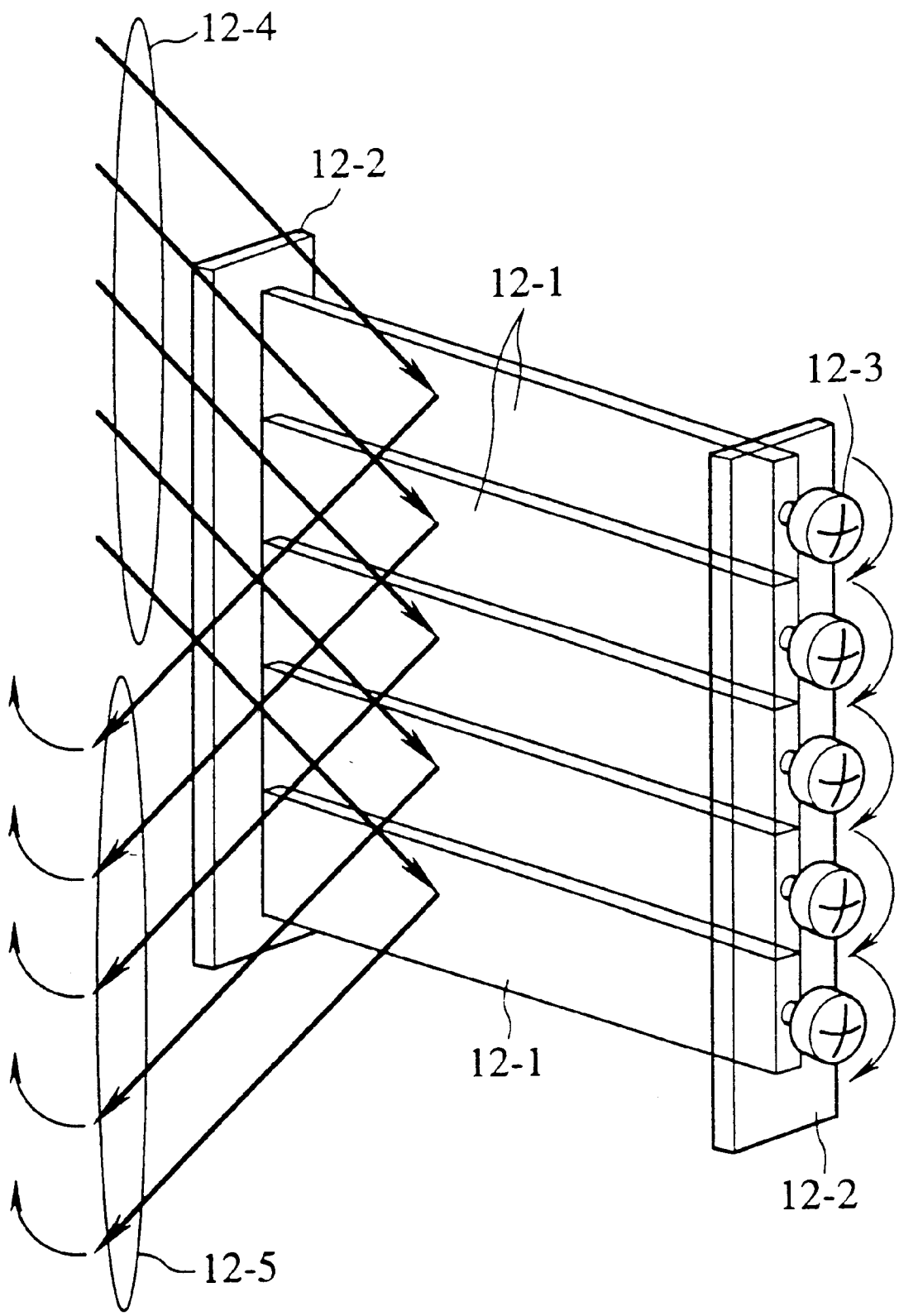
FIG. 12 is a schematic view showing a configuration of a rotation mirror array.

As other optical beam deflection device, there are such devices that the prism is mechanically rotated and the mirror is mechanically rotated. Configurations of the rotation prism array and the rotation mirror array are shown in FIGS. 11 and 12 respectively. In FIG. 11, 11-1 denotes a microprism column; 11-2, a frame for holding the microprism column 11-1; 11-3, a screw for rotating the microprism column 11-1; 11-4, a group of incident optical beams; and 11-5, a group of refracted optical beams. The propagation direction of the refracted optical beams can be controlled by adjusting rotation of respective microprism columns 11-1.

In the rotation mirror array shown in FIG. 12, 12-1 denotes a micro mirror plate; 12-2, a frame for holding the micro mirror plates 12-1; 12-3, a screw for rotating the micro mirror plates 12-1; 12-4, a group of incident optical beams; and 12-5, a group of output optical beams. By adjusting rotation of respective micro mirror plates 12-1, the propagation direction of the reflected optical beams can be controlled.

Figure 13A:
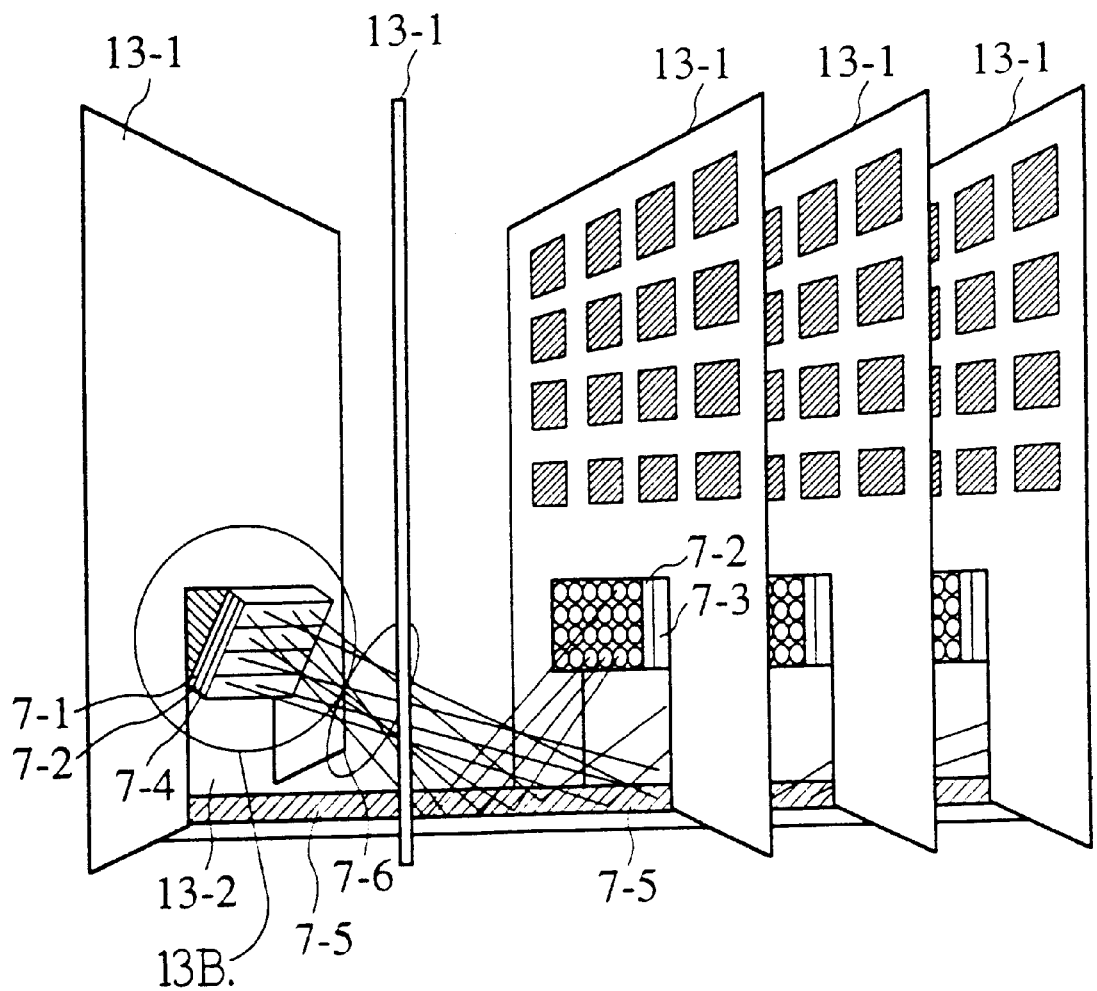
FIGS. 13A and 13B are perspective views showing a configuration of a board-to-board optical interconnection system according to a second embodiment of the present invention respectively.
Figure 13B:
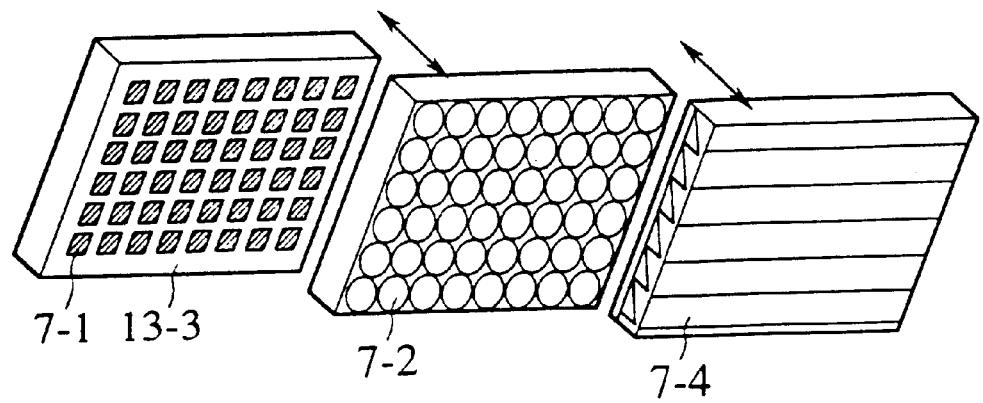

FIGS. 13A and 13B are views showing a configuration of a board-to-board optical interconnection system according to a second embodiment of the present invention respectively. FIG. 13A shows an overall board-to-board configuration, and FIG. 13B shows the VCSEL array 7-1, the micro lens array 7-2, and the light deflection control array device 7-4 attached to the lowermost edge portions of respective boards 13-1 respectively in an enlarged manner. The board-to-board optical interconnection system shown in FIG. 13A is different from the first embodiment shown in FIG. 7 in that vacant space 13-2 are provided to lowermost edge portions of respective boards 13-1, on which the VCSEL array 7-1, the micro lens array 7-2, the light deflection control array device 7-4, and the photodetector array 7-3 are mounted in the first embodiment shown in FIG. 7, and then the board-to-board optical interconnection can be achieved by letting the optical beams 7-6 pass through the vacant space 13-2.

In FIG. 13B, the VCSEL arrays 7-1 are aligned on a mount 13-3 by soldier bump like a two dimensional array with a 1 mm pitch, and the micro lens arrays 7-2 are mounted with a 1 mm pitch on the mount 13-3, and then the LC microprism array 7-4 is mounted thereon. Since the optical beams do not interfere with each other, high density optical interconnection can be implemented.

Figure 14A:
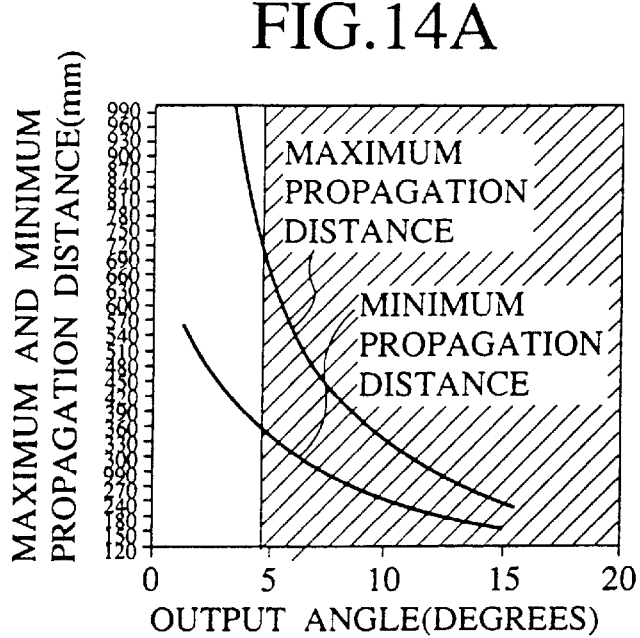
FIGS. 14A to 14C are characteristic views showing relationships between an output angle and various parameters respectively.
Figure 14B:
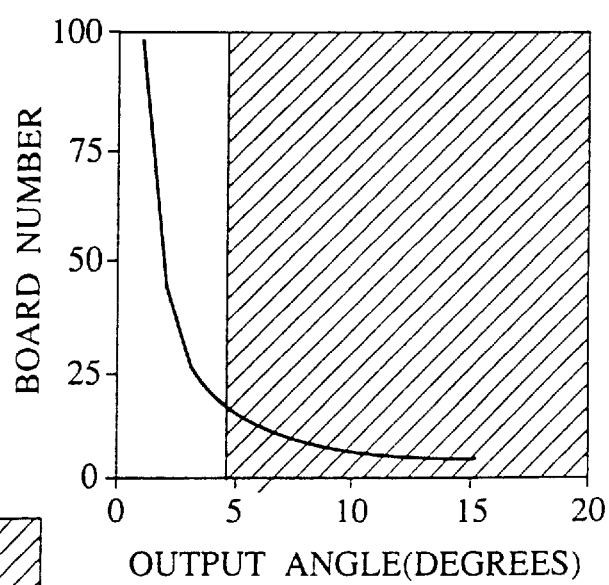
Figure 14C:
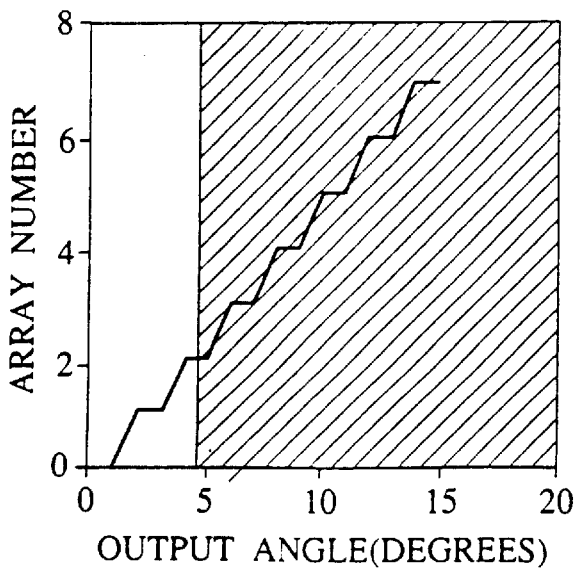

As an example of typical optical interconnections, the results of performance evaluation are shown in FIGS. 14A, 14B, and 14C under the conditions that a distance between the mirror and the board end is set to 30 mm, a range of a tunable deflection angle of the light deflection control array device is selected within 5 degrees (which corresponds to the case where an apex angle of the LC microprism array is selected to 20°), and a pitch of the array is set to 1 mm. FIG. 14A is a view illustrating relationships between an output angle and maximum and minimum propagation distances. FIG. 14B is a view illustrating a relationship between the output angle and the number of boards which can be interconnected. FIG. 14C is a view illustrating a relationship between the output angle and the number of array stage. A board-to-board distance is set to 30 mm in the second embodiment. In general a diameter of the optical beam spreads gradually as the propagation distance is increased. Though depending on a diameter of the VCSEL, the maximum propagation distance of the optical beam array with a 1 mm pitch is approximately 50 cm if one sheet type lens array is used and the maximum propagation distance is also approximately 80 cm if two sheet type lens arrays are used. In FIGS. 14A to 14C, shaded areas correspond to regions which are restricted by beam spread.

From FIGS. 14A to 14C, it would be evident that, if the optical beam array passing through two sheet type lens system is used, 15 sheet board-to-board optical interconnection can be achieved wherein the number of array is 2 and a board distance can be set from 38 cm to 85 cm (the board distance is assumed to 30 mm in the second embodiment). Actually various requirements for the board-to-board optical interconnection have to be fulfilled. Therefore, the output angle must be adjusted to meet such requirements. Individual optical beams can be coupled to the desired photodetectors by adjusting tunable resistances which are connected to the LC microprism array. Position and inclination of the board are displaced or deviated when the board is inserted and extracted, but a displaced dimension is within 100 $\mu$m at most. Hence, if the optical beam with a 1 mm diameter is used, a displaced amount is within 10%, so that no problem is caused.

Although the case where the LC microprism array is used has been discussed in the above, similar advantages can be achieved if each of the micro mirror array, the LC deflection device, the rotation mirror array, and the rotation prism array is employed.

FIG. 15 is a view showing a configuration of a board-to-board optical interconnection system according to a third embodiment of the present invention. A difference between the board-to-board optical interconnection system shown in FIG. 15 and the first embodiment shown in FIG. 7 resides in that a fixed-angle prism array 15-1 is provided on the LC micro prism array 7-4 in the first embodiment shown in FIG. 7. Remaining configuration and the operation of the board-to-board optical interconnection system shown in FIG. 15 are similar to those of the first embodiment shown in FIG. 7.

The fixed-angle prism array 15-1 is so designed that apex angles are refracted correspondingly to the optical interconnection of individual optical beams.

With the above configuration, such a drawback can be overcome that a tunable angle of the LC micro prism array 7-4 whose deflection direction is tunable is small. In other words, the optical interconnection is mainly established by the fixed-angle prism array 15-1 and alignment displacement, etc. are precisely corrected by the LC micro prism array 7-4 serving as the tunable light deflection control array device, whereby a precise alignment can be accomplished. In addition, since the LC micro prism array 7-4 is used merely to correct the beam direction, its apex angel can be set low such as several degree. Hence, the LC layer can be made shallow to thus enhance a response rate up to several tens ms.

In the above explanation, the case where the LC microprism is used has been discussed, but similar advantages can be achieved if each of the micro mirror array, the LC deflection device, the rotation mirror array, and the rotation prism array is employed.

Furthermore, the hologram device, the prism array device, the mirror array device, etc. may be used selectively as the fixed-angle deflection control device. In addition, the LC prism array, the micro mirror array, the LC deflection device, the rotation mirror array, the rotation prism array, etc. may be used selectively as the tunable light deflection control array device. A combination of the fixed-angle deflection control device and the tunable light deflection control array device may of course be used.

Figure 16A:
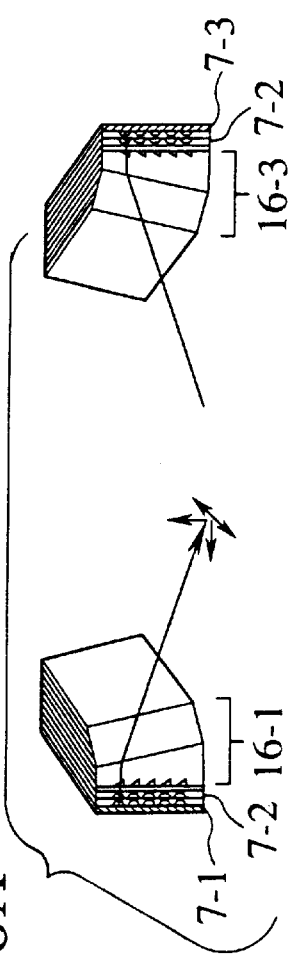
FIG. 16 is a perspective view showing a configuration of a board-to-board optical interconnection system according to a fourth embodiment of the present invention.
Figure 16:
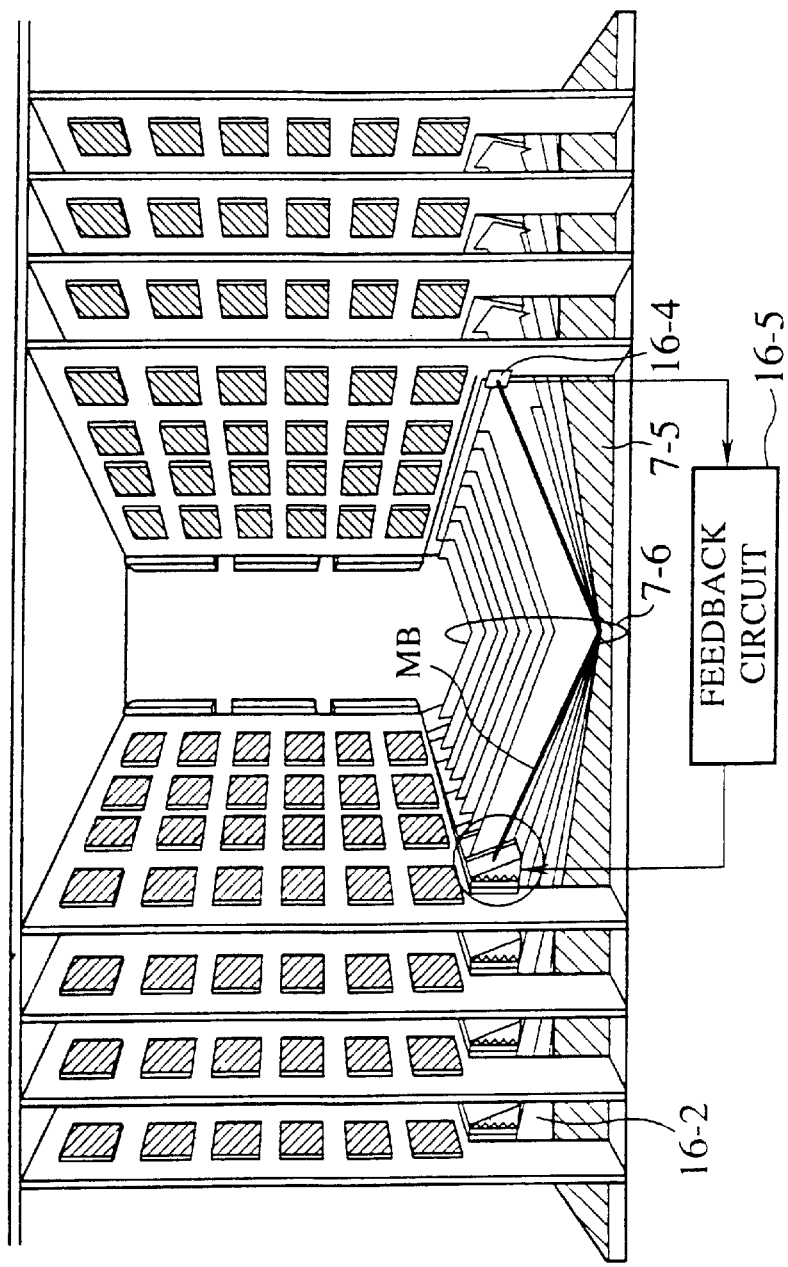
Figure 17:
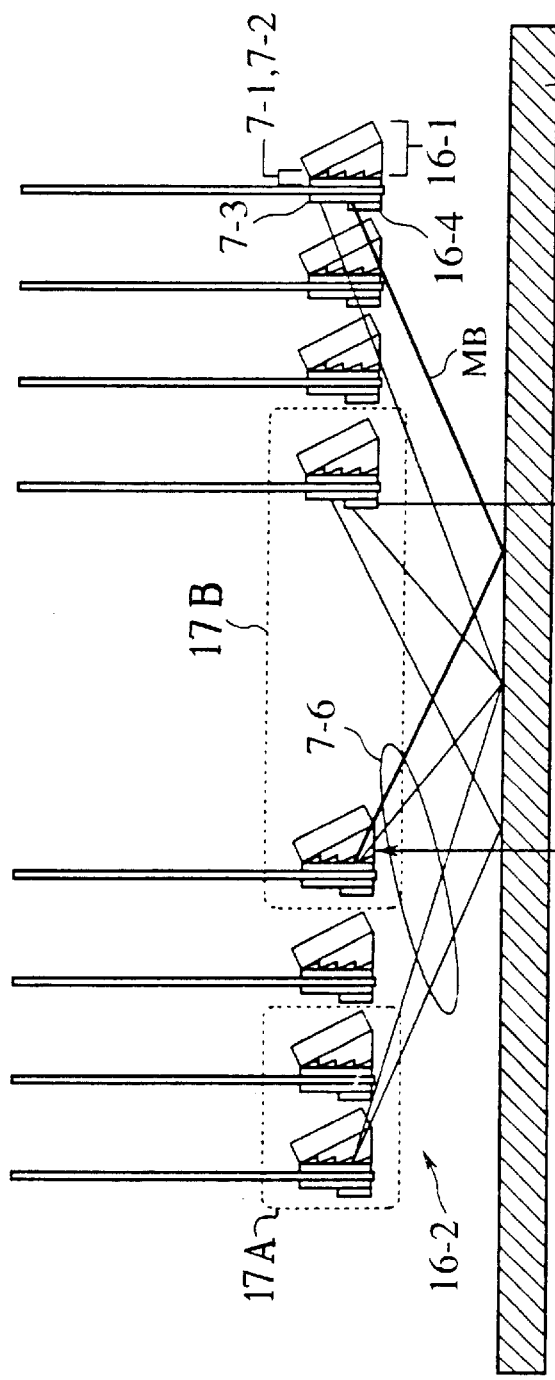
FIG. 17 is a side sectional view showing the configuration of the board-to-board optical interconnection system according to the fourth embodiment of the present invention.
Figure 17B:
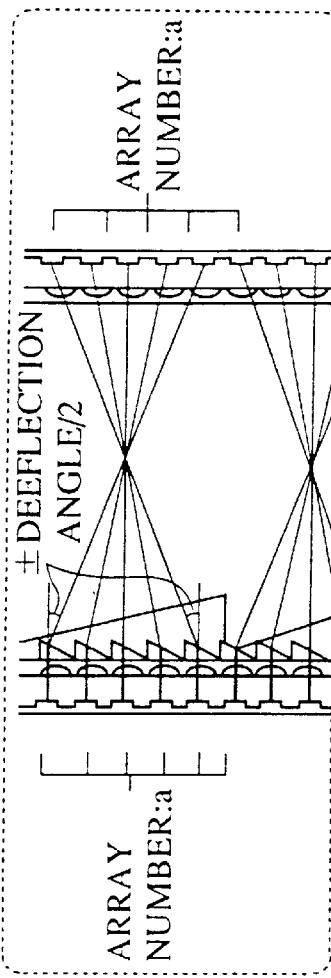
Figure 17A:
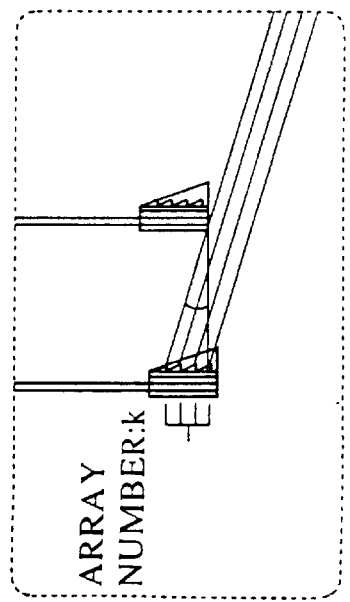

FIG. 16 is a perspective view showing a configuration of a board-to-board optical interconnection system according to a fourth embodiment of the present invention. FIG. 17 is a sectional view showing the configuration of the board-to-board optical interconnection system in FIG. 16. In the first embodiment shown in FIG. 7, since the VCSEL array 7-1, the lens array 7-2, and the LC microprism array 7-4 have to be assembled such that they are inclined with respect to the board 13-1, a special mount is required so that various troubles are caused upon mounting the special mount on the board. On the contrary, the board-to-board optical interconnection system shown in FIGS. 16 and 17 is constituted such that the VCSEL array 7-1, the lens array 7-2, and the LC microprism array 7-4 can be mounted on the board in parallel with the board, whereby various troubles can be overcome. Besides, in order to eliminate total location displacement of the optical beam group, a device for feeding back location information is provided.

In FIGS. 16 and 17, 7-1 denotes a VCSEL; 7-2, a lens array; 16-1, crossed pairs of LC micro prism arrays in which two LC micro prism arrays are stuck together orthogonally to each other and respective prism arrays are tapered; 16-2, a vacant space provided on the lowermost portion of the board to pass through the optical beam; 7-6, a group of optical beams; 7-5, a planar mirror; 7-3, a photodetector array; 16-3, a tapered glass; 16-4, an x-y position sensor; and 16-5, a feedback circuit.

In the board-to-board optical interconnection system constituted as above, the VCSEL 7-1, the lens array 7-2, and the crossed pairs of LC micro prism arrays 16-1 can be assembled in parallel with the board. Instead of this, a tapered glass substrate is employed on a back surface of the LC microprism array, so that the optical beam can be refracted obliquely and downward and emitted.

Next, a function of correcting the total position displacement of the optical beam group will be explained hereunder. A dedicated monitor beam MB used to correct location displacement is emitted from the VCSEL 7-1. This monitor beam MB is then reflected by the planar mirror 7-5 to reach the x-y position sensor 1-4. The x-y position sensor 16-4 then detects a displacement amount between a position to which the monitor beam MB actually propagates and a desired position to which the monitor beam MB has to propagate and a direction between both positions and then sends such information to the feedback circuit 16-5. The feedback circuit 16-5 then controls the crossed pairs of two LC micro prism arrays 16-1 to reduce the displacement amount to zero. Details of the x-y position sensor 16-4 will be explained later.

In the fourth embodiment of the present invention, the LC microprism array has been employed in the optical interconnection. However, one of the micromirror array, the LC deflection device, the rotation mirror array, and the rotation prism array may be used as the tunable light deflection control array device. Still further, one of the hologram device, the prism array device, and the mirror array device may be used as the fixed-angle deflection control device. In addition, one of the LC prism array, the micro mirror array, the LC deflection device, the rotation mirror array, and the rotation prism array may be used as the tunable light deflection control array device. A combination of the fixed-angle deflection control device and the tunable light deflection control array device may of course be used.

Figure 18:
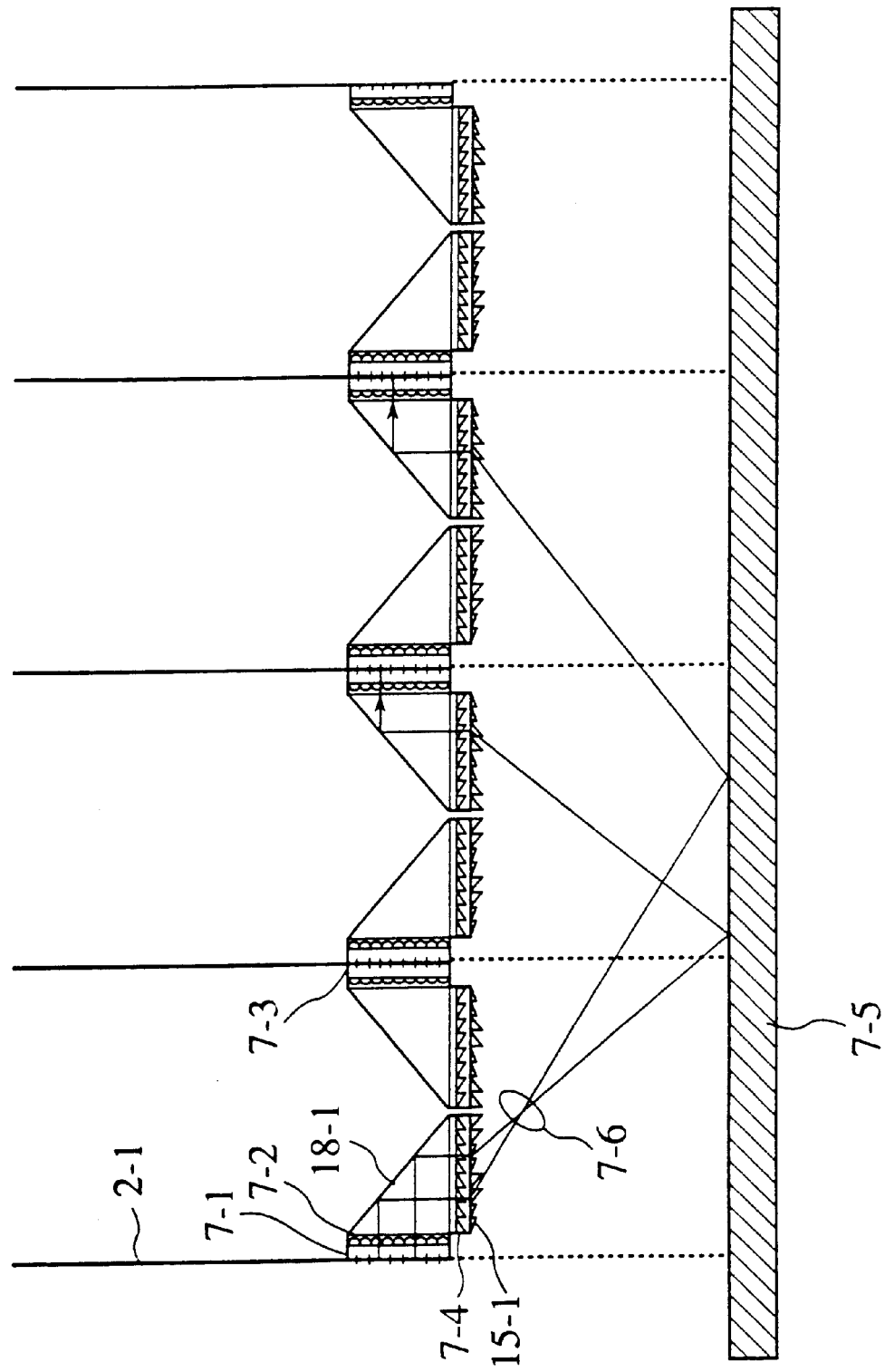
FIG. 18 is a side sectional view showing a configuration of a board-to-board optical interconnection system according to a fifth embodiment of the present invention.

FIG. 18 is a view showing a configuration of a board-to-board optical interconnection system according to a fifth embodiment of the present invention. In the board-to-board optical interconnection system according to the fifth embodiment, a prism mirror 18-1 is provided to assemble the VCSEL and the lens array, which have been explained in the first embodiment shown in FIG. 7, in parallel with the board, and also an LC microprism array 7-4 for the purpose of correction and a fixed-angle prism array 15-1 are provided on a lower surface of the prism mirror 18-1.

More particularly, in FIG. 18, 2-1 denotes a board; 7-1, a VCSEL; 7-2, a lens array; 18-1, a prism mirror; 7-4, an LC microprism array; 15-1, a fixed-angle prism array; 7-6, an optical beam; 7-3, a photodetector array; and 7-5, a planar mirror.

In the board-to-board optical interconnection system of the fifth embodiment, the optical beam is emitted from the VCSEL 7-1 which is mounted in parallel with the board 2-1, then is transmitted perpendicular to the board to pass through the lens array 7-2, and then is turned by the prism mirror 18-1 by 90 degree to propagate downward. The deflection direction of the optical beam can be controlled by the LC microprism array 7-4 which is provided on the lower surface of the prism mirror 18-1. In addition, the optical beam can be deflected by the fixed-angle prism array 15-1, which is provided on the lower surface of the microprism array 7-4, to reach the desired photodetector array 7-3.

Apex angles of the fixed-angle prism arrays 15-1 are set in advance according to respective positions. However, since the optical beams sometimes reach slightly different positions from the target positions because of the location displacement in assembling, the error in the apex angle of the prism in working, etc., the LC microprism array 7-4 is provided to correct such position error. Accordingly, because it is not required for the LC microprism array 7-4 to deflect the optical beam considerably, a prism substrate with small apex angle (several degree) may be used. Hence, a response rate of the LC microprism array 7-4 can be accelerated, as mentioned above.

In the fifth embodiment of the present invention, the fixed-angle prism array has been used mainly in the optical interconnection and the LC microprism array has been used auxiliarily. However, the micro mirror array, the LC deflection device, the rotation mirror array, and the rotation prism array may be used selectively as the tunable light deflection control array device. Still further, one of the prism array, the hologram device, and the prism array device may be used as the fixed-angle deflection control device. In addition, one of the LC prism array, the micro mirror array, the LC deflection device, the rotation mirror array, and the rotation prism array may be used as the tunable light deflection control array device. Of course, a combination of the fixed-angle deflection control device and the tunable light deflection control array device may be used.

Figure 19A:
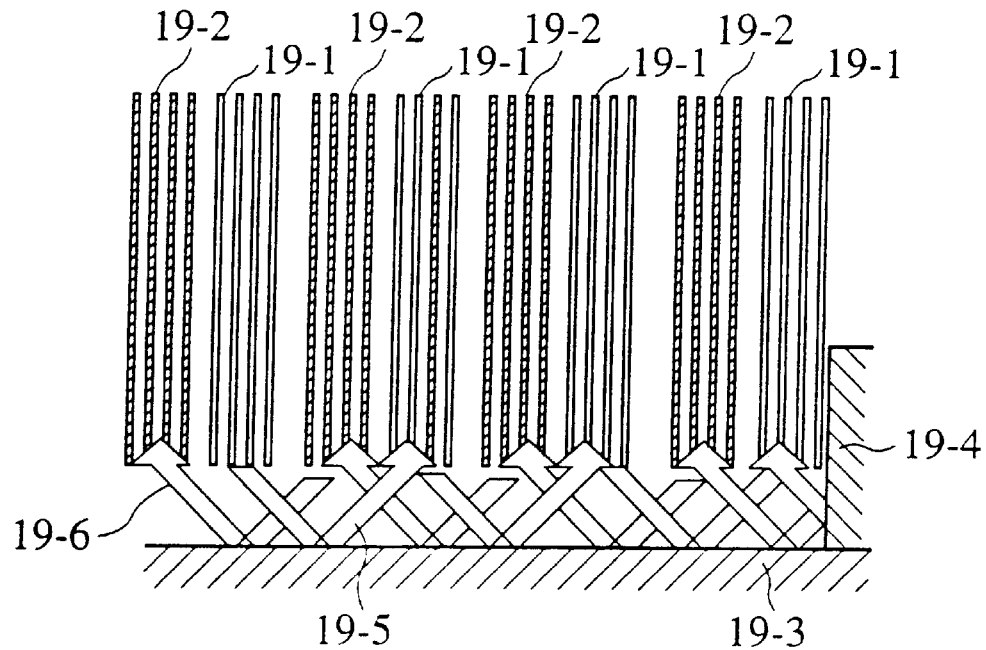
FIGS. 19A and 19B are schematic side views showing a configuration of a board-to-board optical interconnection system according to a sixth embodiment of the present invention respectively.

FIG. 19A is a view showing a configuration of a board-to-board optical interconnection system according to a sixth embodiment of the present invention. In the board-to-board optical interconnection system shown in FIG. 19A, a second mirror 19-4 is provided on the outside of the outermost board of the board group along the propagation direction of the optical beam, and then the optical beam is reflected by the second mirror 19-4 to input into respective photodetector arrays of the second board group.

In FIG. 19A, 19-1 denotes a first board group; 19-2, a second board group; 19-3, a first mirror placed horizontally; 19-4, a second mirror placed substantially perpendicular to the first mirror 19-3; 19-5, an optical beam group to connect the first board group 19-1; and 19-6, an optical beam group reflected by the second mirror 19-4 to connect the second board group 19-2.

Figure 19B:
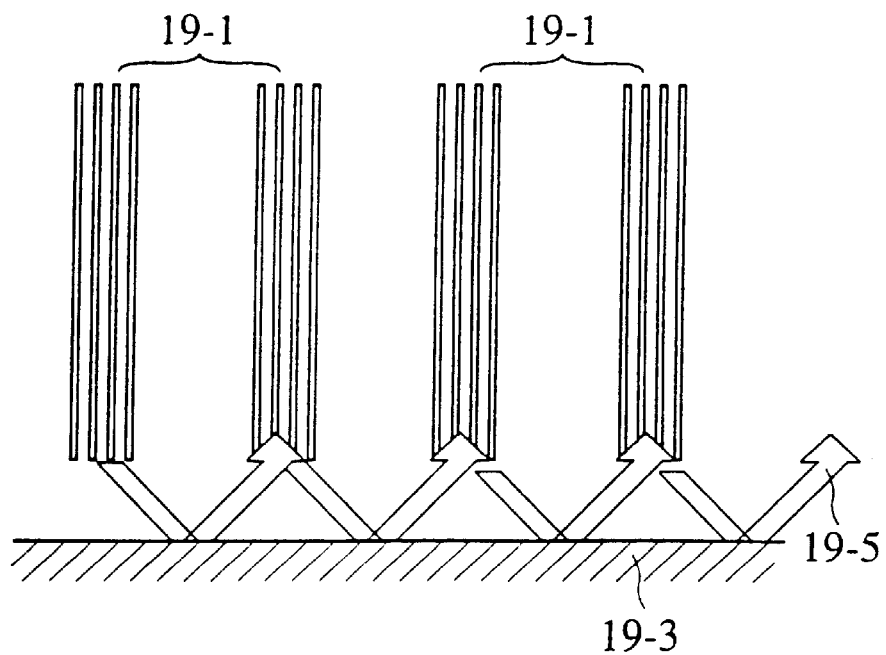

In the board-to-board optical interconnection system shown in FIG. 7, as shown in FIG. 19B, the optical beam propagates rightward while being reflected between the first mirror 19-3 and the first board group 19-1, but a package density is small since wide space remains between the board group.

Therefore, in the board-to-board optical interconnection system according to the sixth embodiment, as shown in FIG. 19A, since the second mirror 19-4 is provided spatially properly on the outside of the rightmost board of the board group along the propagation direction of the optical beam, the optical beam proceeds while being reflected by the first board group 19-1 and the first mirror 19-3, then is reflected by the second mirror 19-4, and then returns to proceed in the opposite direction while being reflected by the second board group 19-2 interposed between the first board group 19-1 and the first mirror 19-3. In this manner, the optical beam interconnection can be utilized when the optical beam propagates in the reverse direction. With the above configuration, a package density of the board can be made twice.

If a third mirror is similarly provided on the outside of the leftmost board of the board group, the optical beam group can be reflected once again to thereby treble the package density of the board. Moreover, the second and third mirrors are not always placed vertically and they may be placed inclined inasmuch as the reflected optical beam can get to the desired board. If the mirrors are inclined, an inclination angle of the mirror may be adjusted in place of position adjustment.

Figure 20:
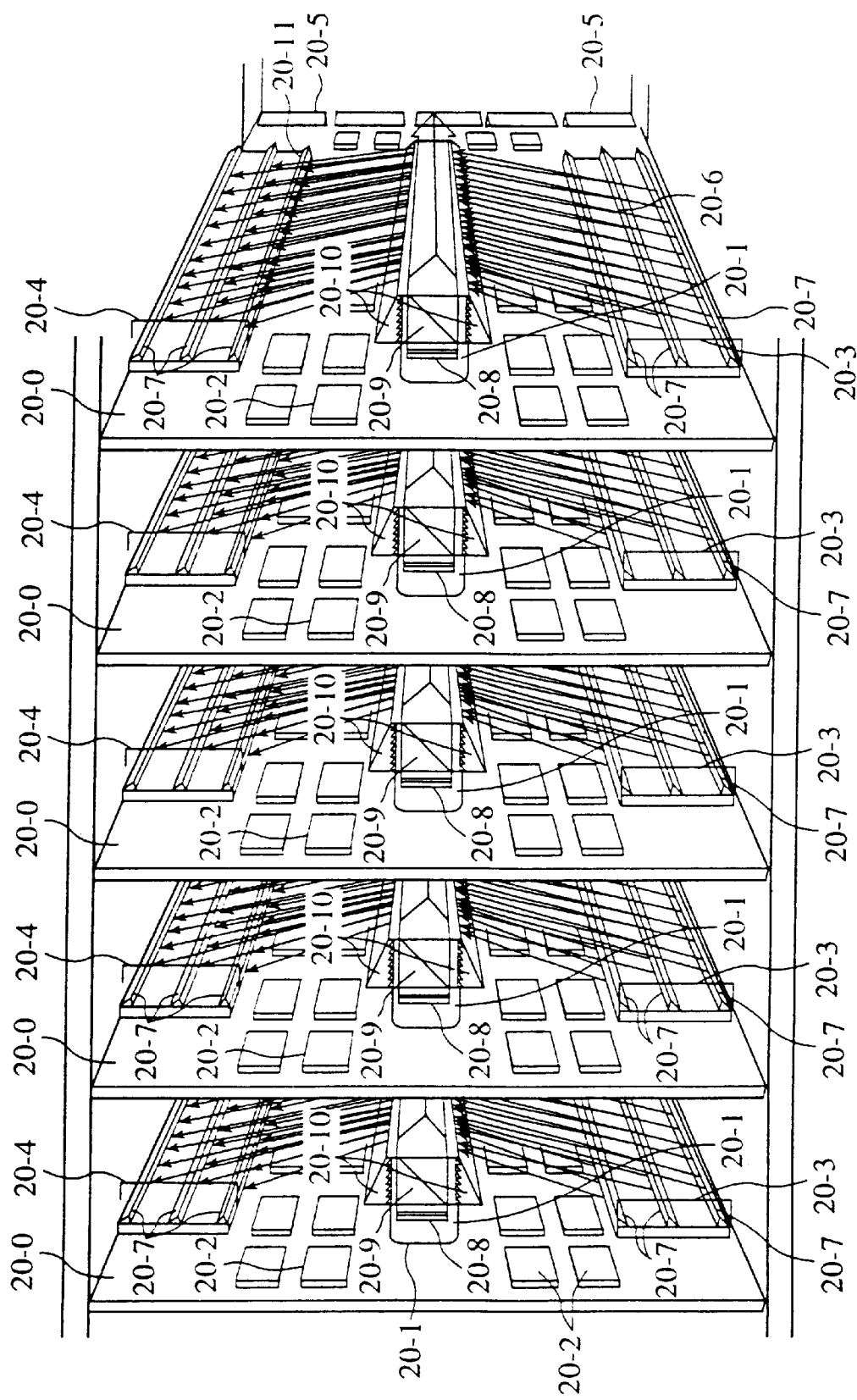
FIG. 20 is a perspective view showing a configuration of a board-to-board optical interconnection system according to a seventh embodiment of the present invention.
Figure 21:
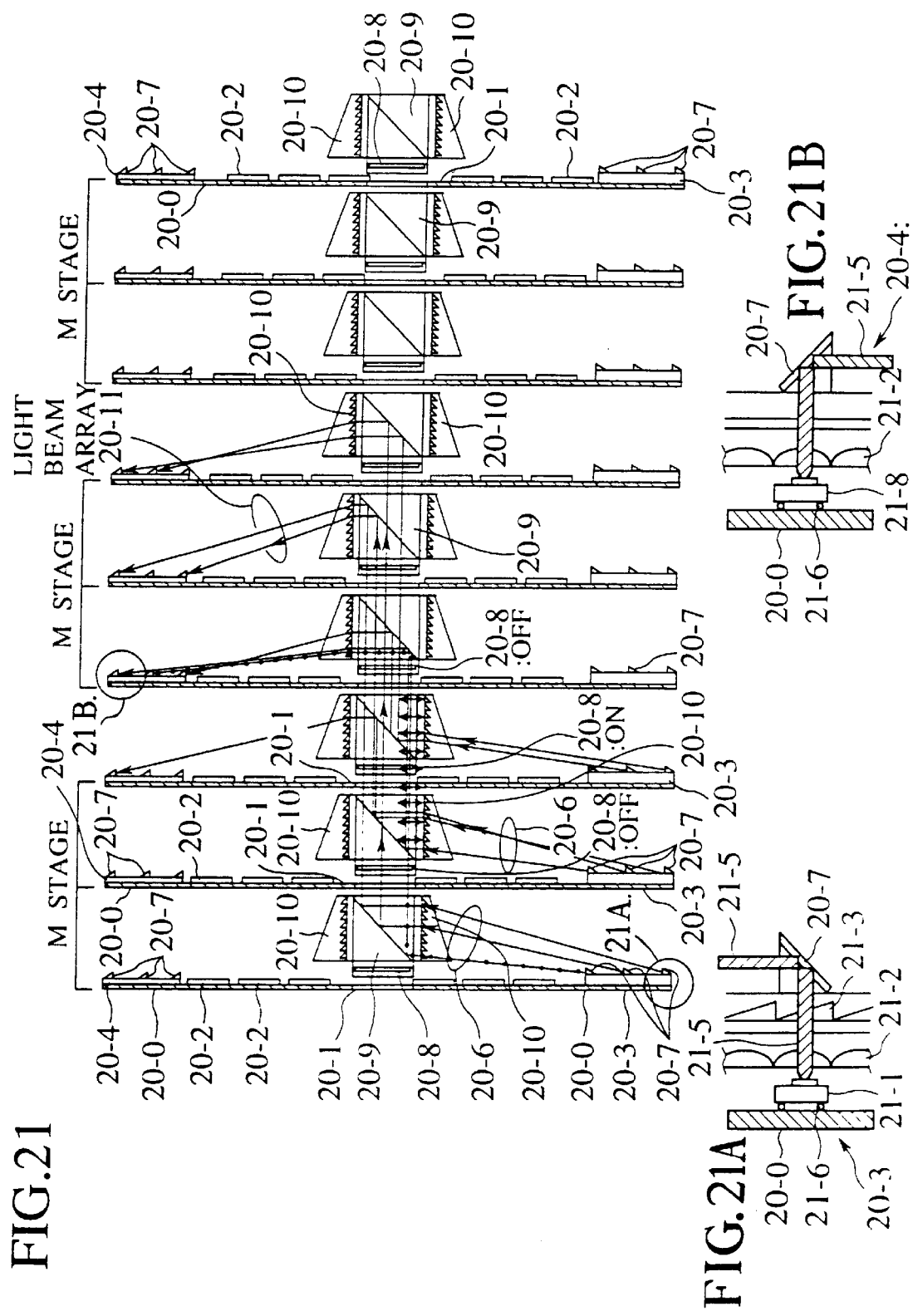
FIG. 21 is a side sectional view showing the configuration of the board-to-board optical interconnection system according to the seventh embodiment of the present invention.

FIG. 20 is a perspective view showing a configuration of a board-to-board optical interconnection system according to a seventh embodiment of the present invention. FIG. 21 is a side sectional view showing the configuration of the board-to-board optical interconnection system in FIG. 20. In the board-to-board optical interconnection system shown in FIGS. 20 and 21, roughly speaking, a plurality of boards 20-0 on which a great number of electronic parts such as very high speed, super high density and large capacity LSIs, e.g., switch LSIs 20-2, are mounted are assembled in substantially parallel like a book shelf and then optical signals are transmitted and received between the plurality of boards 20-0. Window portions 20-1 serving as opening areas are formed in substantially central areas of respective boards 20-0 to transmit the optical beams to plural boards respectively therethrough and the optical beams can be transmitted to respective boards through these window portions. In addition, transmitter arrays 20-3 for transmitting the optical beam arrays are provided to the lowermost portions of respective boards. Receiver arrays 20-4 for receiving the optical beams are provided on the uppermost portions of respective boards.

Then, respective references in FIGS. 20 and 21 will be explained hereunder. 20-0 denotes a board; 20-1, a window portion formed in the central area of the board; 20-2, a switch LSI mounted on the board 20-0; 20-3, a transmitter array having a transmitter array with a lens array and a second light deflection control array device as a unit; 20-4, a receiver array used as a photodetector array with the lens array; 20-5, an electric connector; 20-6, an optical beam array output from the transmitter array 20-3; and 20-7, a prism mirror for turning the optical beam at a right angle. Then, 20-8 denotes a twisted nematic (TN) LC array device used as a polarization controller; 20-9, a polarization beam splitter (abbreviated as PBS hereinafter); 20-10, an LC microprism array used as first light deflection control array devices which sandwiches the polarization beam splitter 20-9 vertically; and 20-11, an optical beam array output from the PBS 20-9 upwardly.

FIG. 21 shows detailed configurations of the transmitter array 20-3 and the receiver array 20-4 as a partially enlarged sectional view. In this enlarged sectional view, 21-1 denotes a VCSEL array used as a light source; 21-2, a lens array; 21-3, an LC microprism array used as a second light deflection array device; 20-7, a prism mirror; 21-5, an optical beam; 21-8, a photodetector array; 21-6, a solder bump for mounting the VCSEL array 21-2 and the photodetector array 21-8; and 20-0, a board. In FIG. 21, a mark ● represents a polarization perpendicular to a surface of the sheet, and a mark ⇆ represents a polarization parallel with the surface of the sheet.

In the seventh embodiment of the present invention, the light deflection control array device for deflecting the optical beam is composed of the LC microprism array as shown in FIG. 8, for example, like the first embodiment. Also, the micro mirror array shown in FIG. 9, the LC deflection device shown in FIG. 10, the rotation prism array shown in FIG. 11, and the mechanical rotation mirror shown in FIG. 12 may be used like the first embodiment.

As other light deflection control array device, there is an LC hologram device which writes diffraction gratings into an ordinary LC display and deflects the optical beams by virtue of diffraction of the optical beam. As for the details of such array device, see a literature, H. Yamazaki and M. Yamaguchi; "4×4 Free-Space Optical Switching Using Real-Time Binary Phase-Only Holograms Generated by a Liquid-Crystal Display", Optics Lett., vol. 16 (1991), pp. 1415–1417. Though depending upon a pitch of the diffraction grating, the optical beam can be deflected within several degrees.

Although a deflection angle has been able to be set arbitrarily in the above light deflection control array device, the light deflection device selected from a group of the prism array, the hologram array, and the mirror array whose profiles are fixed may be used in the event that the optical interconnections are previously arranged. In addition, similar advantages can be expected if the fixed-angle light deflection device and the tunable type light deflection control array device, as mentioned above, are combined together arbitrarily.

Subsequently, an operation of the board-to-board optical interconnection system as constituted above and shown in FIGS. 20 and 21 will be explained hereunder.

The optical beam 21-5 is emitted from the VCSEL array 21-1 of the transmitter array 20-3 positioned on the lowermost portion of the board 20-0, then deflected by the LC microprism array 21-3 used as the second light deflection array device, and then turned by the prism mirror 20-7 by a right angle to select the position of the LC prism (the microprism formed of the transparent substrate 8-2-2 shown in FIG. 8) in the lower LC microprism array 20-10 used as the first light deflection control array device. The optic axis of the optical beam 20-6 can be adjusted by the LC prism so as to input perpendicularly to the PBS 20-9. The optical beam 20-6 is then turned by the PBS 20-9 by a right angle to proceed the neighboring board 20-0.

If the beam passing area of the TN LC array device 20-8 on the neighboring board 20-0 is in ON state, polarization of the optical beam is not subjected to change to propagate straight. If the beam passing area of the TN LC array device 20-8 is in OFF state, a polarization of the optical beam is rotated by 90° and the optical beam is further turned by the PBS 20-9 by a right angle to propagate upwardly. The optical beam is then deflected by the upper LC microprism array 20-10 serving as the first light deflection control array device to collide with the prism mirror 20-7 on the desired detector array 21-8 of the receiver array 20-4. The optical beam is then turned by the prism mirror 20 by a right angle to reach the desired detector.

Respective TN LC cells constituting the polarization controller 20-8 and respective LC prisms constituting the first light polarization control array device are allocated to respective optical beams emitted from M sheets of the board group without overlap. Accordingly, a plurality of the TN LC cell and the LC prism cell corresponding to the number of the boards in the board group are required. Assume that the vertical array number of the LC microprism array 20-10 is L, the array number of the VCSEL array 21-1 and the detector array 21-8 of the board 20-0 in the vertical axis direction is k, and the number of the boards is M, a following relationship can be obtained.

$$L = k \times M \tag{1}$$

Where the number of the transmitter array and the detector array, both can be mounted on the board, are calculated under the assumption that a length of the board 20-0 is 30 cm, a size of the polarization beam splitter 20-9 is 20 mm square, an apex angle of the LC microprism array 20-10 is 20°, 30°, 40°, and a deflection angle is 5°, 7.5°, 10°.

Figure 22:
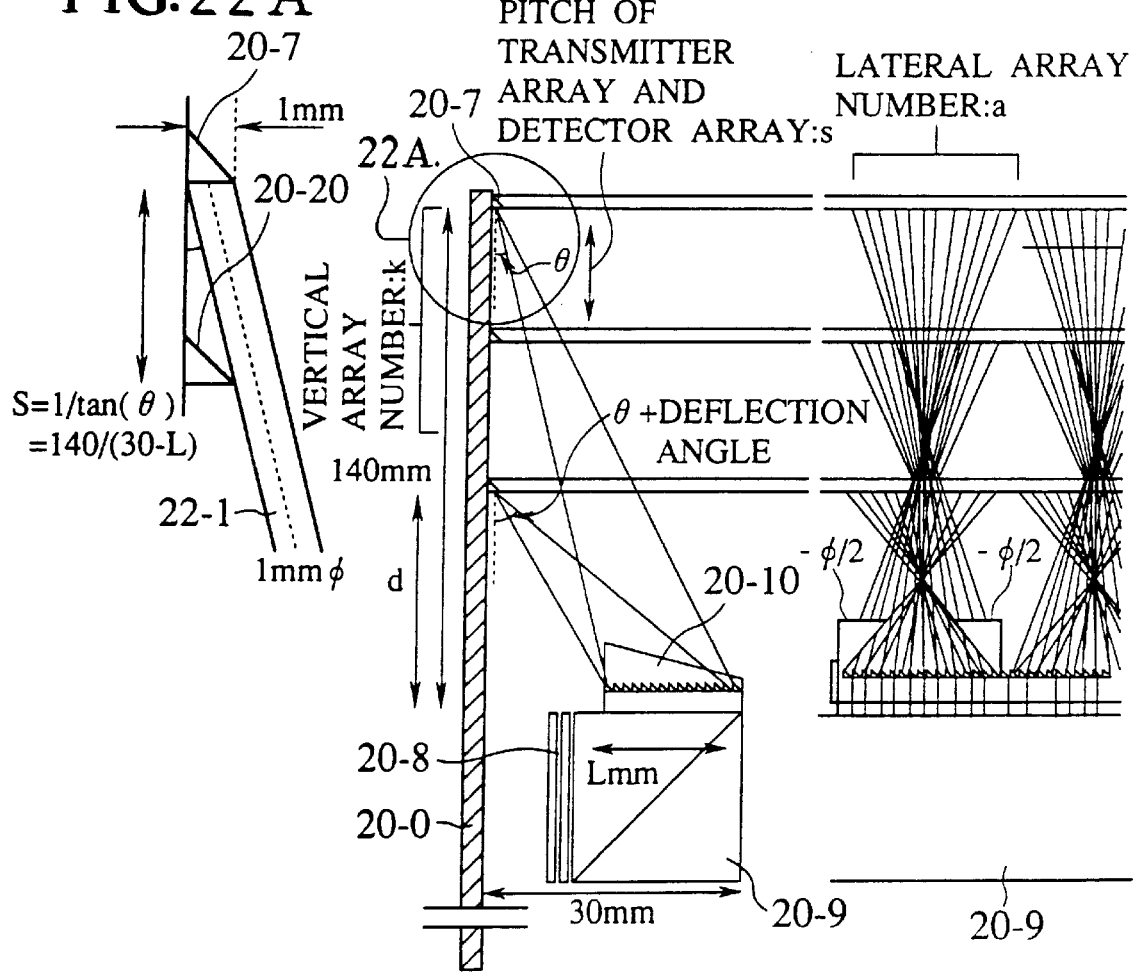
FIG. 22 is a view showing relationships between a deflection angle and the array numbers of transmitter array and detector array.

As shown in FIG. 22, it is assumed that the PBS 20-9 with 20 mm square is placed in the center of the board 20-0, and the LC microprism array 20-10 serving as the first light deflection control array device includes L arrays with 1 mm pitch and is stuck on the PBS 20-9 to coincide its top end with the end of the PBS 20-9. It is also assumed that the prism mirror mounted on the laser array and the detector array has a size of 1 mm square.

An incident angle of the optical beam is assumed to θ when the optical beam emitted from the LC microprism array 20-10 is input at a shallowest angle. At that time, maximum incident angle is given by (θ+φ) (where φ is a deflection angle). The angle θ can be calculated by $$\theta = \tan^{-1}\{(30-L)/140\} \tag{2}$$

According to a minimum incident angle, a pitch of the detector is determined as follows. In other words, as shown on the left side of FIG. 22 in an enlarged fashion, a distance between the detectors can be made minimum when the beam 22-1 with a diameter of 1 mm φ is input into the center of the prism mirror 20-7 to graze past a top edge of the neighboring prism mirror 20-7. Hence, the distance s between the detectors can be expressed by $$s = 1/\tan(\theta) = 140/(30-L) \quad (3)$$

In addition, if the deflection angle of the LC prism is assumed to $\phi$, a distance d between the LC prism and the nearest detector array can be written by $$d = 30/\tan(\theta + \phi) \quad (4)$$
$$= 30/[\tan\{\tan^{-1}(30-L)/140\} + 30]$$

The array number k of the detector array can be calculated by $$k = INT\{(140-d)/s+1)\} \quad (5)$$

Also, the array number of the detector array a along the depth direction can be derived as $$a = INT\{d \times \tan(\phi/2)\} \quad (6)$$

Figure 23:
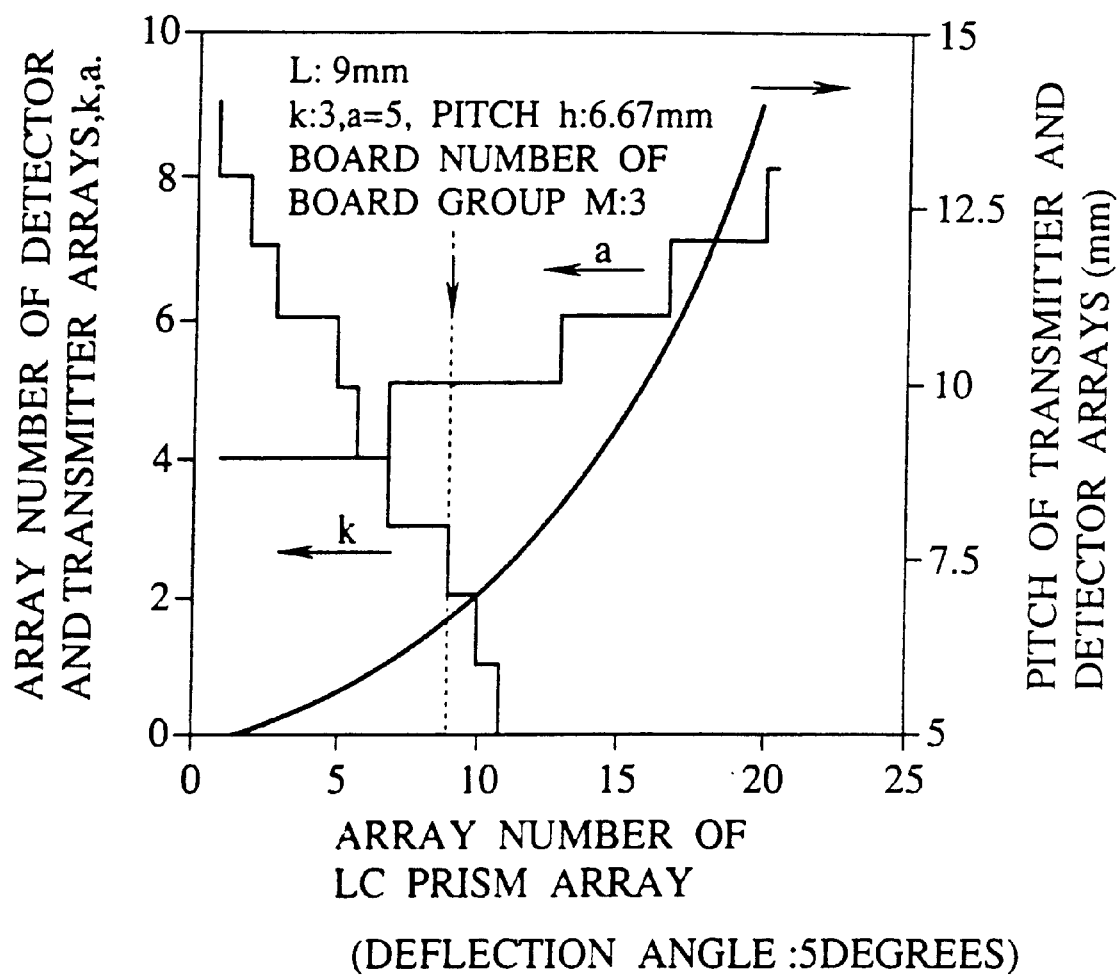
FIGS. 23 to 26 are views showing relationships between the deflection angle and the array number respectively.
Figure 24:
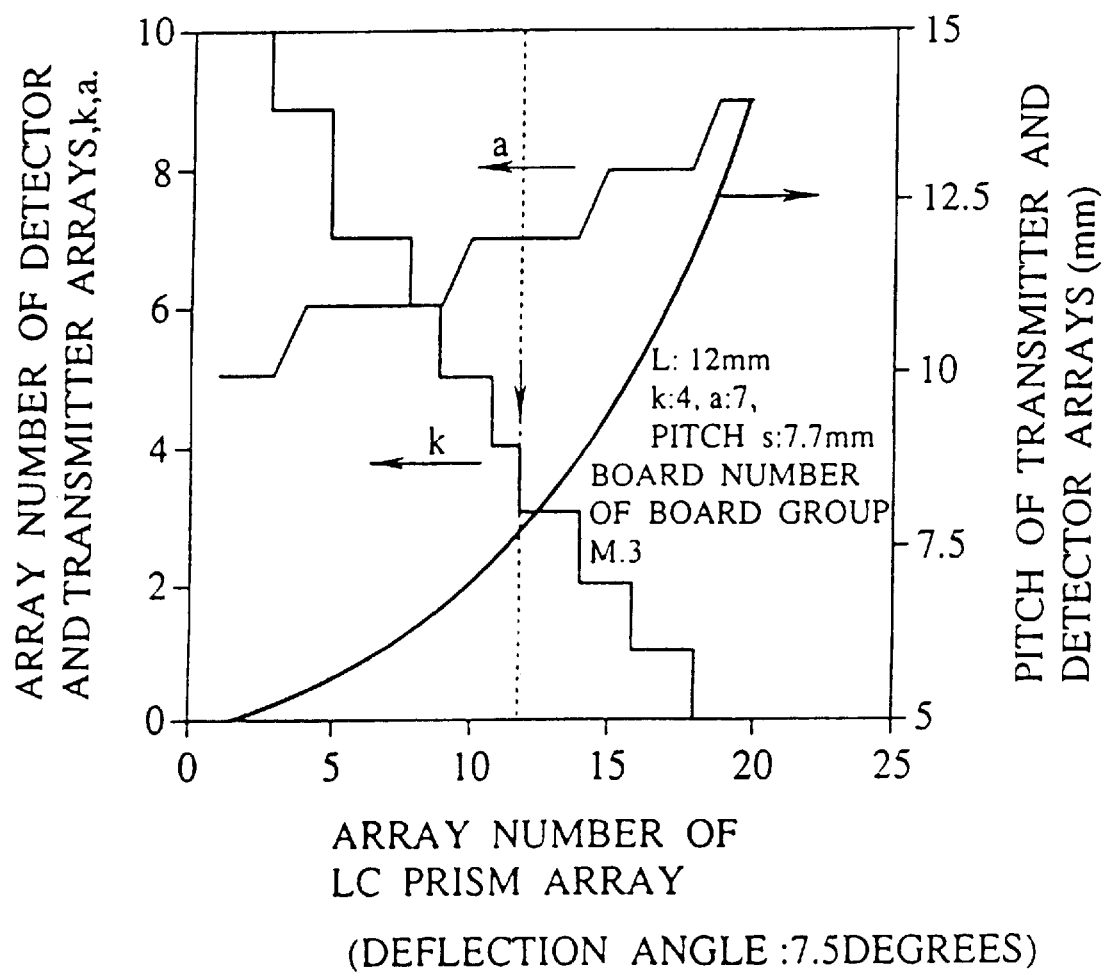
Figure 25:
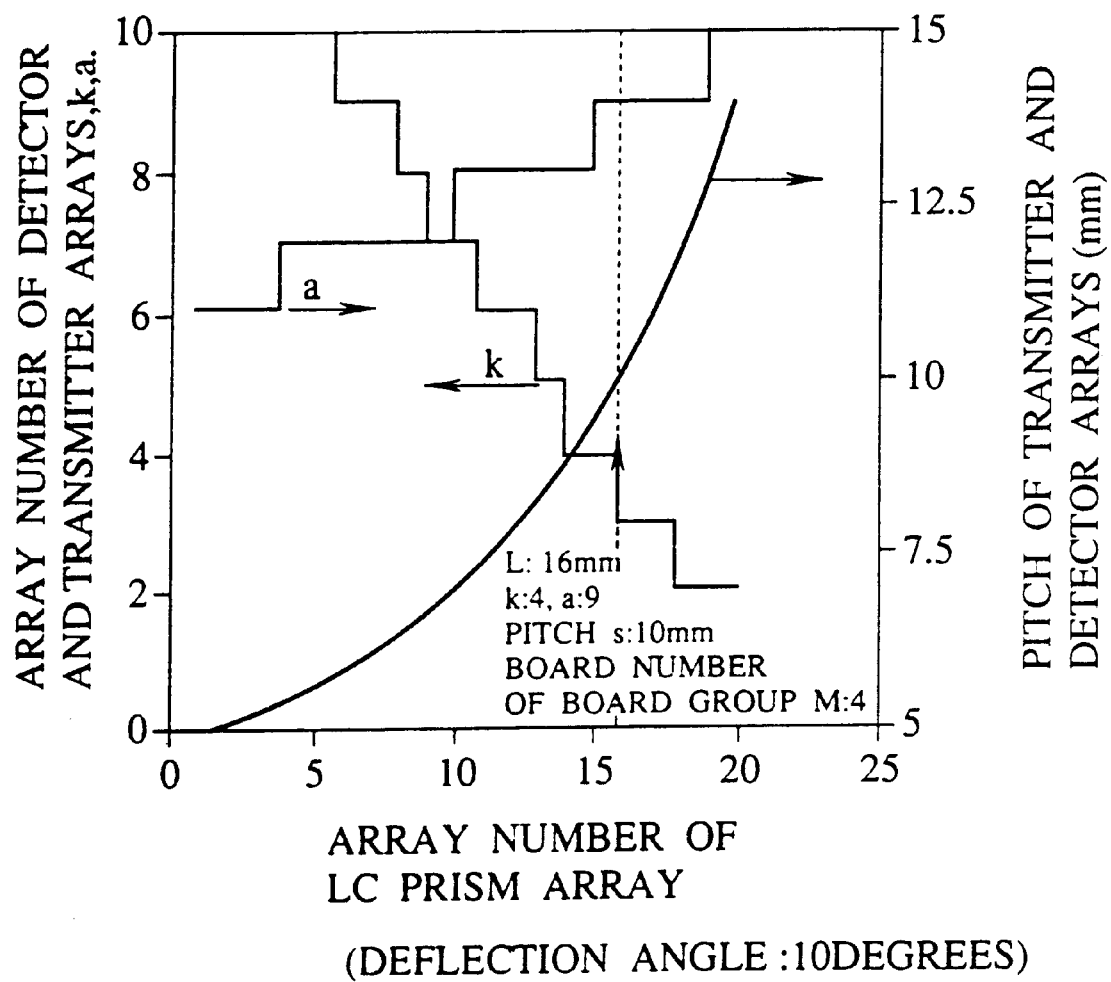
Figure 26:
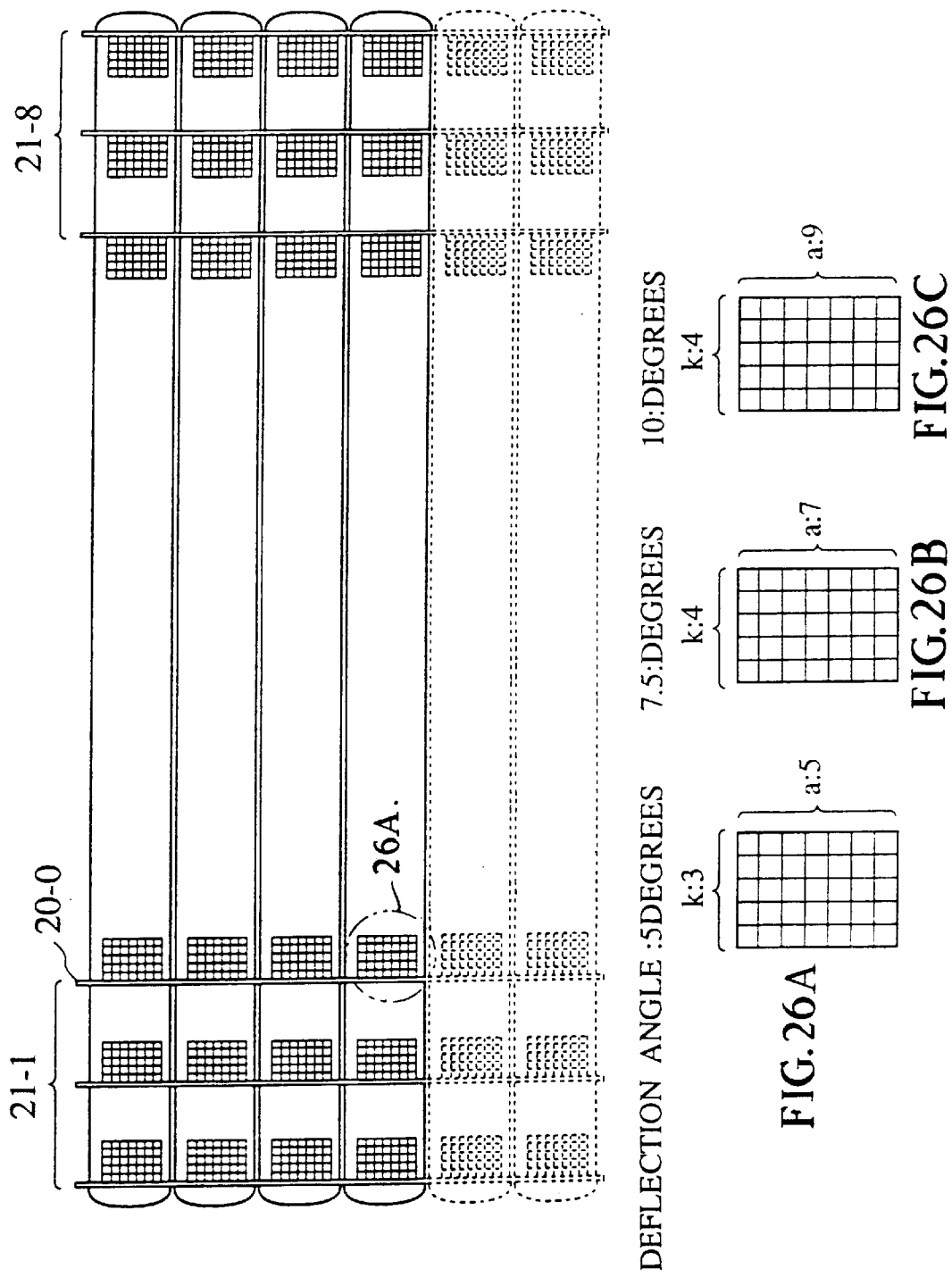

Using the deflection angle of 5°, 7.5°, 10° as a parameter respectively, relationships between the length and the array numbers k, a of the LC microprism array and the array distance are shown in FIGS. 23 to 25. Further, the total results of FIGS. 23 to 25 are shown in FIG. 26. For instance, in the case where the deflection angle of the LC prism is 5°, the array number of the LC microprism array and the array numbers k, a of the detector array can be given as 9 and 3, 5 respectively as optimal values, and at that time the array pitch is 6.7 mm. The sheet number M of the board group can be given as 3. Then, in the case where the deflection angle of the LC prism is 7.5° and the sheet number M of the board group is 3, the array number of the LC microprism array and the array numbers k, a of the detector array can be given as 12 and 4, 7 respectively as optimal values, and at that time the array pitch is 7.7 mm. Then, in the case where the deflection angle of the LC prism is 10°, the array number of the LC microprism array and the array numbers k, a of the detector array can be given as 16 and 4, 9 respectively as optimal values, and at that time the array pitch is 10 mm. The sheet number M of the board group can be given as 4.

Then, with regard to throughput of the switch, a total throughput can be given as 4.5 Tbit/s under the assumption of 2.5 Gbit/s per channel since three sheets of boards on which 15×40×3 switches are arranged constitute a board group when the deflection angle is selected to 5 degrees.

The above calculation has been made under the assumption that an initial deflection direction of the LC prism can be set arbitrarily. By tapering the back surface of the LC microprism acting as the light deflection control array device, an initial value of deflection can be set arbitrarily. In the experiment, a quartz glass having a taper of 13° has been attached to the LC prism. The optical interconnection can be established from the desired transmitter array to the desired detector array by providing such tapered glass substrate.

Figure 27:
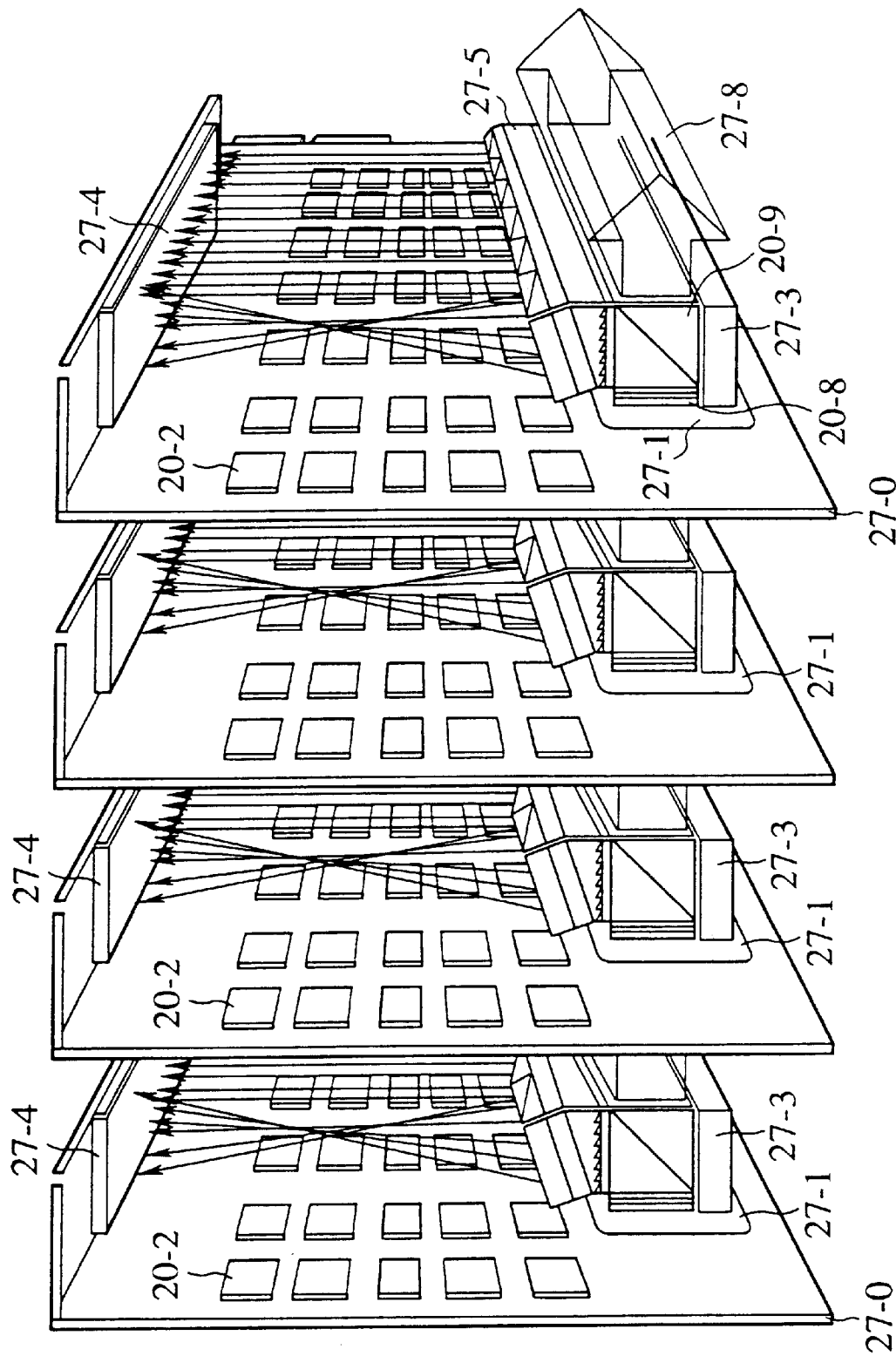
FIG. 27 is a perspective view showing a configuration of a board-to-board optical interconnection system according to an eighth embodiment of the present invention.

In turn, a board-to-board optical interconnection system according to an eighth embodiment of the present invention will be explained with reference to FIGS. 27, 28A and 28B hereunder. FIG. 27 is a perspective view showing a configuration of the board-to-board optical interconnection system of the eighth embodiment. FIGS. 28A and 28B are a side sectional view and a front view showing respectively the configuration of the board-to-board optical interconnection system of the eighth embodiment. The board-to-board optical interconnection system of the eighth embodiment is constructed such that the transmitter array and the photodetector array are mounted vertically to the board. Therefore, in contrast to the seventh embodiment shown in FIGS. 20 and 21 wherein the transmitter array and the photodetector array are mounted parallel to the board, a higher package density can be achieved.

In FIGS. 27 and 28, 27-0 denotes a board; 20-2, a switch LSI; 27-3, a transmitter array made of a light source array with a lens array; 27-4, a receiver array used as a detector array with a lens array; 27-5, an LC microprism array used as a first light deflection control array device; 20-9, a PBS; 20-8, a TN LC array device used as a polarization control array device; 27-8, an optical beam array; 21-1, a VCSEL array used as a transmitter array; 21-2, a lens array; and 21-8, a photodetector array. In FIGS. 28A and 28B, the mark ● represents a polarization perpendicular to the surface of the sheet, and the mark ⇆ represents a polarization parallel with the surface of the sheet.

The VCSEL array 21-1 and the lens array 21-2, which constitute the transmitter array 27-3, are mounted vertically on the lower portion of the board 27-0 and the PBS 20-9 is placed over the transmitter array 27-3. A collimated beam array emitted from the VCSEL array 21-1 is turned by the PBS 20-9 to propagate rightward. When polarization is rotated by the TN LC array device 20-8 by 90°, the optical beam proceeds upwardly. Like the seventh embodiment shown in FIGS. 20 and 21, the LC microprism array 27-5 controls the propagation direction of the optical beam. This eighth embodiment of the present invention is superior to the seventh embodiment shown in FIGS. 20 and 21 in that a pitch of the photodetector array 21-3 can be set to 1 mm since the photodetector array 21-3 is mounted vertically on the board and that an area to which the optical beam is allocated can be increased since a propagation distance of the optical beam emitted from the PBS 20-9 over the board can be extended approximately two times.

For instance, suppose that the optical beam propagates from the PBS 20-9 in parallel with the board over a distance of 250 mm on the board of usual 30 cm square. Because the optical beam can be deflected at an angle of ±2.5° along two axes if the crossed pair of LC prism arrays with an apex angle of 20° is employed, the optical beam can be swung arbitrarily in a 10 mm×10 mm region. Because the crossed pair of LC prism arrays with an apex angle of 30° can deflect the optical beam within an angle range of ±3.75° along two axes, the optical beam can be swung arbitrarily in a 16mm× 16mm region. Further, because the crossed pair of LC prism arrays with an apex angle of 40° can deflect the optical beam within an angle range of ±5° along two axes, the optical beam can be swung arbitrarily in a 21 mm×21 mm region. However, an unused region of the VCSEL array 21-1 remains even if the cells are mounted at a pitch of 1 mm in the 10 mm×10 mm region. Hence, the number and the location of the VCSEL array 21-1 to be mounted are varied according to the sheet number M of the board group. Relationships between the sheet number M of the board group (abscissa) and the array numbers a, k (ordinate) have been derived. Although the value of the array number a is set constant, the sheet number M and the array number k have a following relationship.

$$M \times k = \text{beam swing distance (mm)} \quad (7)$$

Figure 29:
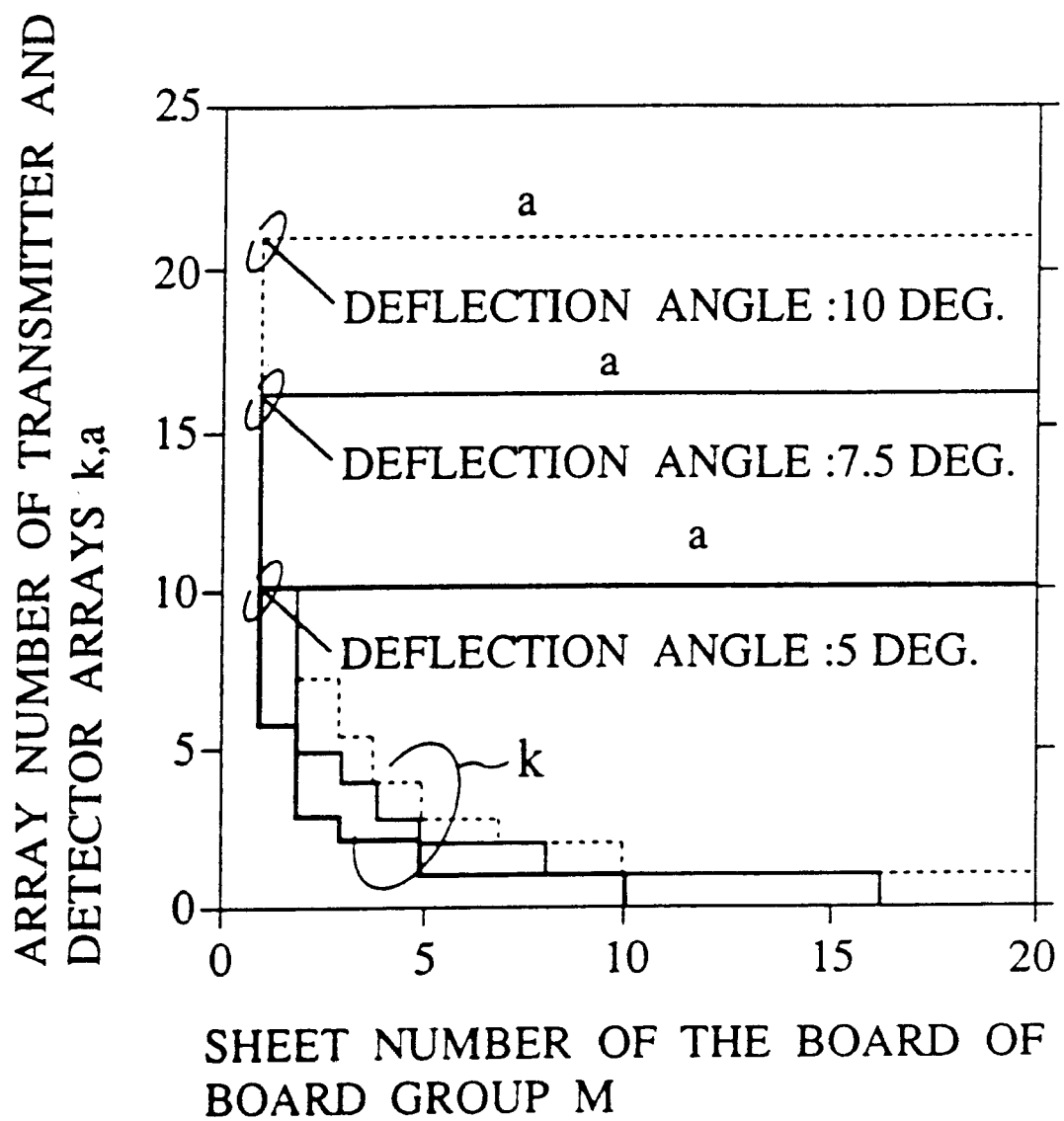
FIG. 29 is a view showing relationships between the array numbers and the sheet number of board.

Using the deflection angle of the LC prism array as a parameter, relationships between the array numbers a, k and the sheet number M of the board are illustrated in FIG. 29.

For example, if the sheet number M of the board is 5, five 10×2 surface emitting arrays must be fabricated individually while shifting their locations from #1 to #5. Five 10×2 transmitter arrays are arranged on the left side while five 10×2 photodetector arrays are arranged on the right side.

Arbitrary optical interconnection can be established between them. If a length of about 20 cm of a 30 cm side of the board is assigned to the optical interconnection, twenty sets of the 10×2 arbitrary interconnection per sheet of the board can be achieved, which constitutes the board group if the sheet number M=5. Assume that 2.5 Gbit/s is assigned to each channel, total throughput becomes 5 Tbit/s.

Figure 30:
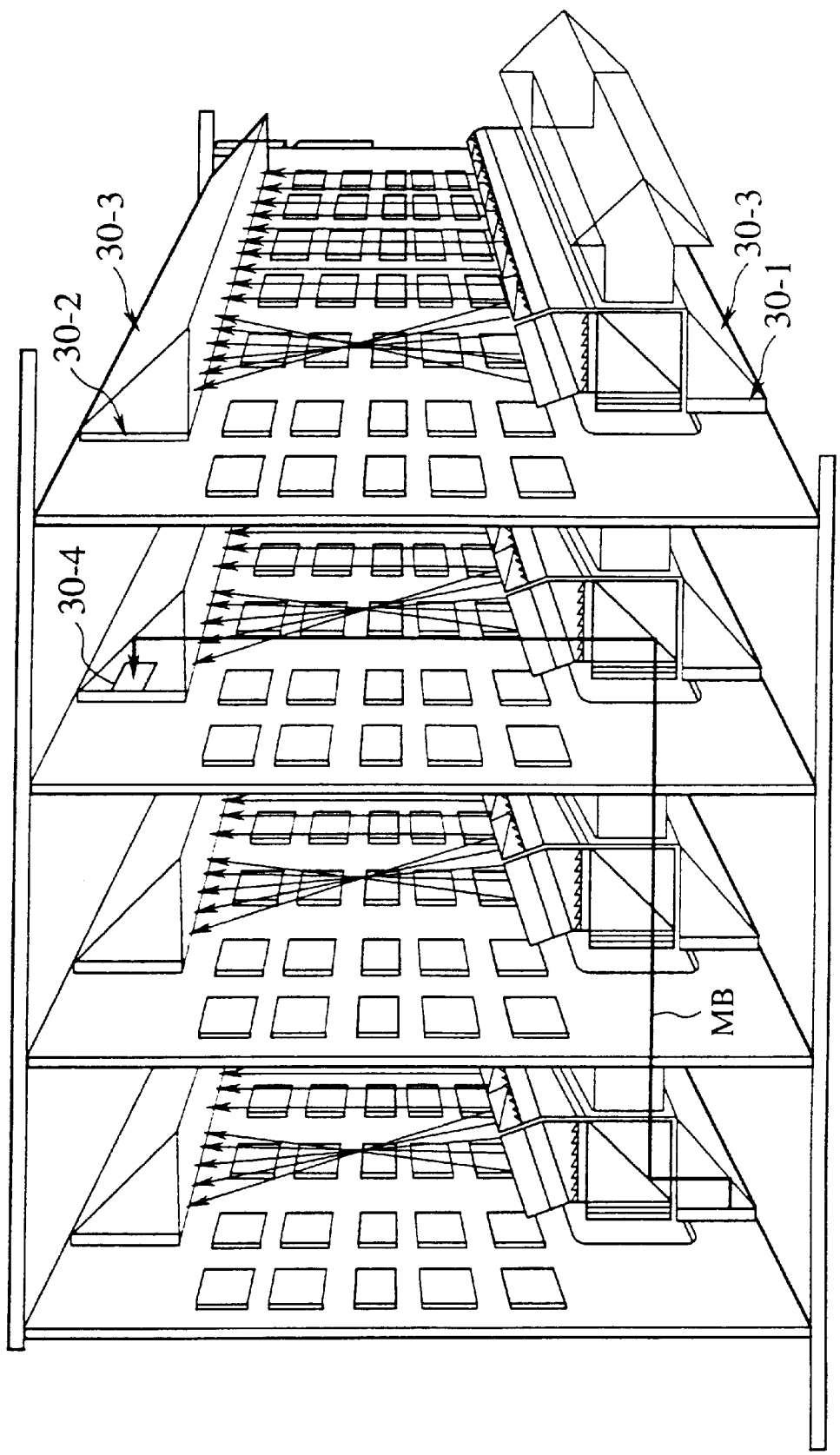
FIG. 30 is a perspective view showing a configuration of a board-to-board optical interconnection system according to a ninth embodiment of the present invention.
Figure 31:
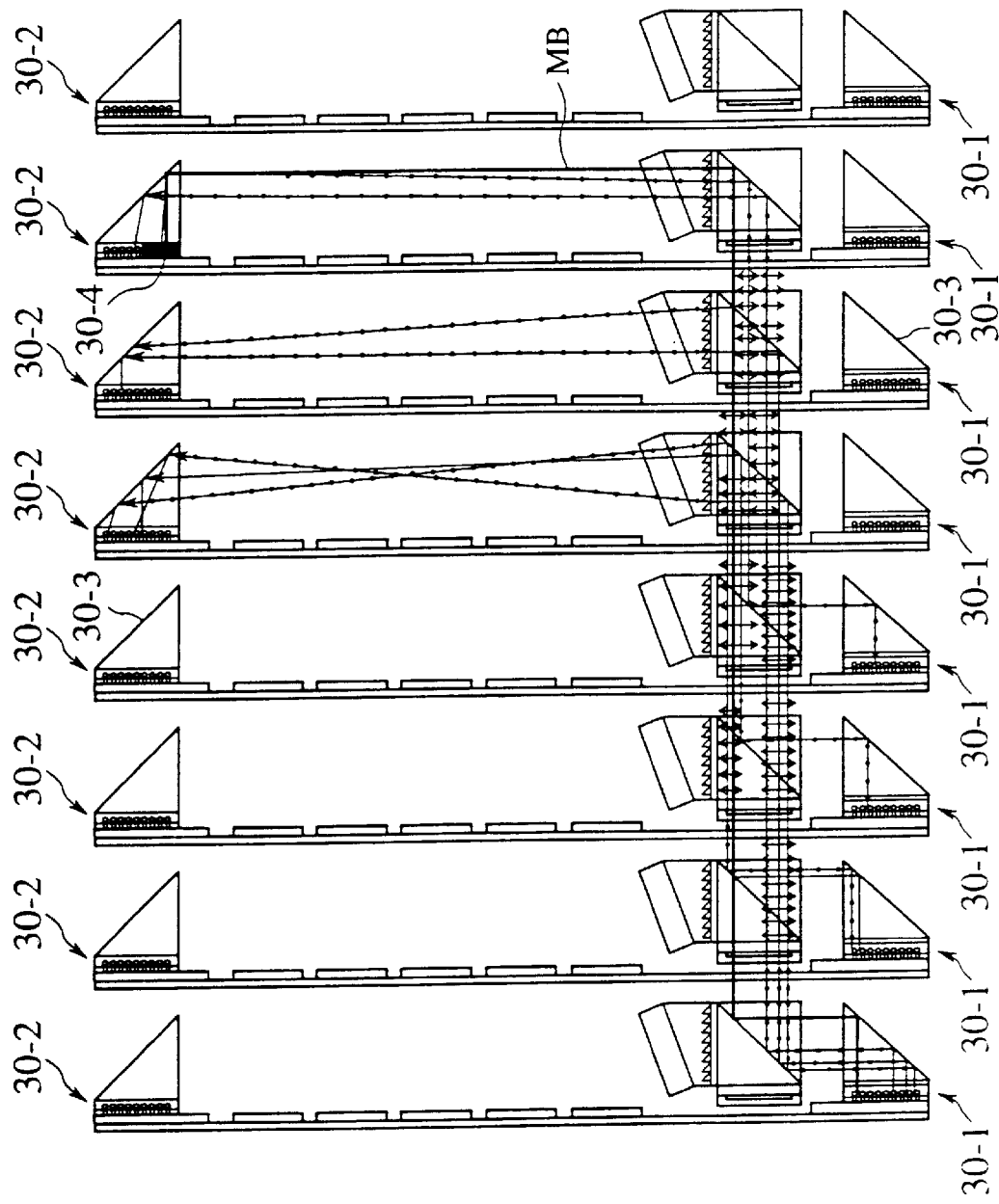
FIG. 31 is a side sectional view showing the configuration of the board-to-board optical interconnection system according to the ninth embodiment of the present invention.
Figure 32:
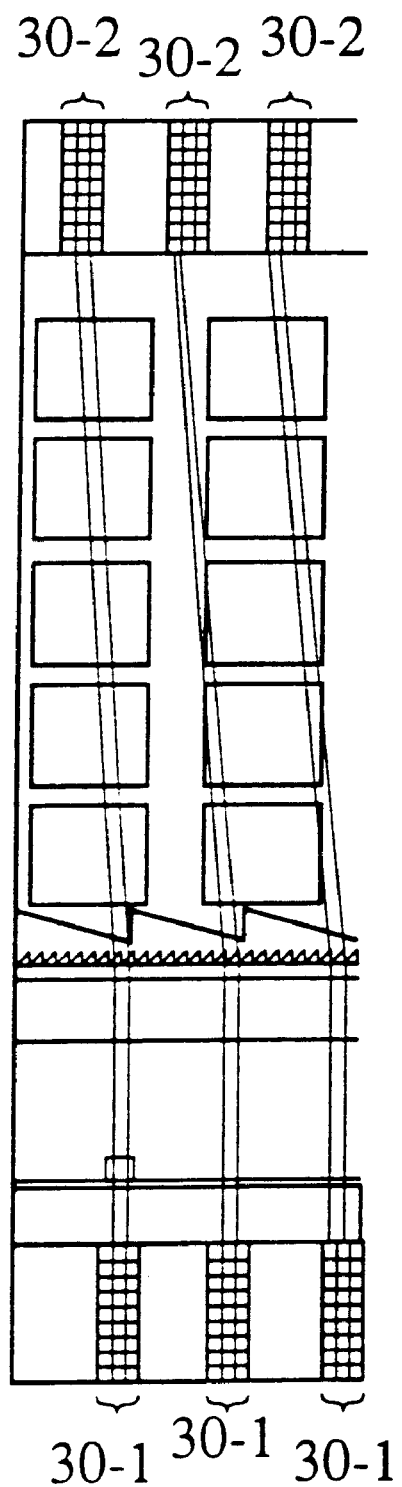
FIG. 32 is a front view showing the configuration of the board-to-board optical interconnection system according to the ninth embodiment of the present invention.

Next, a board-to-board optical interconnection system according to a ninth embodiment of the present invention will be explained with reference to FIGS. 30 to 32 hereunder. 30-1 denotes a transmitter array; 30-2, a photodetector array; 30-3, a prism mirror; and 30-4, an x-y position sensor. A feedback circuit, though not shown, is provided to receive information from the x-y position sensor 30-4. FIG. 30 is a perspective view showing a configuration of the board-to-board optical interconnection system according to the ninth embodiment. FIG. 31 is a side sectional view showing the configuration of the board-to-board optical interconnection system in FIG. 30. FIG. 32 is a front view showing the configuration of the board-to-board optical interconnection system in FIG. 30. In the board-to-board optical interconnection system according to the ninth embodiment, the transmitter array and the photodetector array are mounted on the board not vertically but parallel with the board in contrast to the board-to-board optical interconnection system explained with reference to FIGS. 27, 28A, 28B, and the prism mirror is mounted on the transmitter array and the photodetector array to turn the optical beam at a right angle. According to this configuration, mounting of the transmitter array and the photodetector array on the board can be very facilitated. Other than the above configuration, the board-to-board optical interconnection system shown in FIGS. 30 to 32 becomes similar in configuration to the board-to-board optical interconnection system shown in FIGS. 27, 28A, 28B.

In the ninth embodiment, a function of correcting the location displacement of the overall optical beam group is similar to that of the fourth embodiment. In other words, a dedicated monitor beam MB is output from the transmitter array 30-1 to correct the location displacement. This monitor beam MB then reaches the x-y position sensor 30-4 via the prism mirror 30-3, the PBS 20-9, etc. The x-y position sensor 30-4 then detects a displacement amount between a position to which the monitor beam MB actually propagates and a desired position to which the monitor beam MB has to propagate and a direction between both positions, and then sends such information to the feedback circuit. The feedback circuit then controls the transmitter array 30-1 to reduce the displacement amount to zero.

Although the ATM switch boards in the switching system have been explained above, the present invention is not restricted to the switch boards. But the present invention may be applied similarly to board-to-board interconnection in the computer, etc.

In the above embodiments, the explanation has been made with the use of the LC microprism array as the light deflection control array device, but the present invention is not limited to this case. For example, similar advantages can be achieved if an LC prism array in which two LC prism arrays are stuck orthogonally via a λ/2 plate, an LC deflection control array device in which an LC layer is sandwiched by array split electrodes having windows therein, an electrostatic control micro mirror array in which directions are controlled by virtue of electrostatic forces individually, a spatial light modulator using an LC display in which a diffraction grating can be written, a rotation mirror array whose direction can be controlled mechanically, and a rotation prism array whose direction can be controlled mechanically are employed.

In the above embodiments, although the light deflection control array device in which deflection of the optical beam can be controlled in the arbitrary direction has been used, a light deflection device selected from the group of the fixed-angle prism array, the mirror array, and the hologram array may be employed if the optical interconnection has been decided beforehand.

Further, the tunable light deflection control device in which the above light deflection angle can be set arbitrarily and the fixed-angle light deflection control device in which the light deflection angle is fixed may be combined together. In this approach, a large light deflection angle can be set in the fixed-angle light deflection control device while the tunable light deflection control device can control a small light deflection angle. Therefore, if the former is used as a main deflection device and the latter is used as a fine controlling deflection device, freer optical interconnection can be established.

As mentioned previously, according to the board-to-board optical interconnection system according to the present invention, the optical beam array emitted from the transmitter array with the lens array which is attached to the lower end portion of the board is received by the light deflection control array device, then the propagation direction of the optical beam array is variably controlled every optical beam to be input into the mirror with a gradient, and then the optical beam array reflected by the mirror is received by the photodetector with the lens array. Therefore, unlike the prior art, it is not requested to control precisely the wavelength of the light source, and the board-to-board free-space optical interconnection can attained by virtue of low cost and precise beam alignment to pass through the optical beam from the desired board to the photodetector mounted on another desired board.

According to the present invention, since the light deflection control array device is composed of a combination of the fixed-angle control array device in which the deflection direction is determined previously and the tunable control array device in which the deflection direction is tunable, it is not requested for the optical beam to be considerably deflected in the tunable control array device, so that the prism substrate with a small apex angle can be employed to thus accelerate a response rate.

Further, according to the present invention, the second and/or third mirrors are placed on the outside of one and/or the other outermost board of the first board group, then the optical beam is reflected by the mirror to input into the first mirror once again, and then the optical beam is incident into the photodetector array with the lens array of the second and/or third board groups mounted between the boards of the first board group like the book shelf. Therefore, the package density of the board can be increased.

Furthermore, according to the present invention, the optical beam emitted from the transmitter array is input into the polarization beam splitter, and then turned by a right angle to input the opening portion of the neighboring board. Then, polarization of the optical beam is controlled by the polarization control array device provided on the opening portion to thereby rotate a polarization by 90°, then the optical beam is turned by the polarization beam splitter by a right angle to input into the first light deflection control array device which then controls the propagation direction of the optical beam to input into the desired photodetector. On the other hand, the optical beam whose polarization is not rotated by the polarization control array device by 90° passes through the polarization beam splitter along the propagation direction to input into the opening portion of the neighboring board, and is then controlled similarly. Therefore, unlike the optical interconnection using the D fibers in the prior art, the optical interconnection of the present can be established with small loss, small crosstalk, at low cost, and without the intermediate amplifier. In addition, in contrast to the optical interconnection using the fixed-angle hologram as the backplane, the optical interconnection of the present can be obtained at low cost and optical beam alignment can be achieved in precise.

Still further, according to the present invention, in the optical interconnection in which the transmitter array and the photodetector array are mounted vertically with the board, higher package density can be realized, the propagation distance of the optical beam over the board can be prolonged much more, and the optical beam swing area can be increased much more, rather than the optical interconnection in which the transmitter array and the photodetector array are mounted parallel with the board. In addition, in the event that the optical interconnection patterns are set in advance, similar advantages can be attained if the light deflection array device selected selectively from a group of the fixed-angle prism array, the hologram array, the mirror array is used. Furthermore, similar advantages can be attained if two above groups of the light deflection control device array and the light deflection device array are combined together.

Next, a unit-to-unit optical interconnection system according to a tenth embodiment of the present invention will be explained hereunder.

Figure 33:
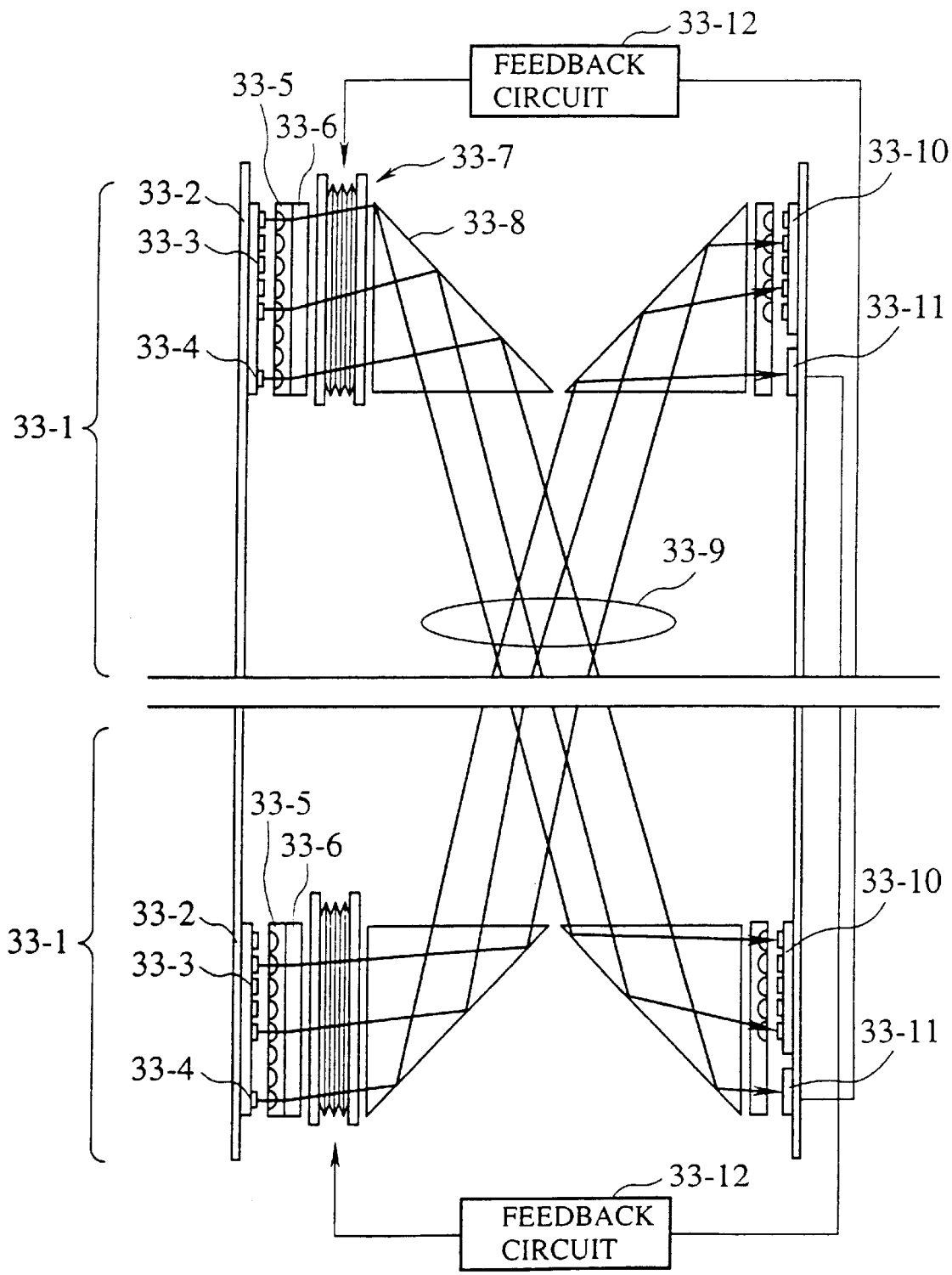
FIG. 33 is a detailed sectional view showing a configuration of a unit-to-unit optical interconnection system according to a tenth embodiment of the present invention.

FIG. 33 is a detailed sectional view showing a configuration of an optical interconnection system according to a tenth embodiment of the present invention in which the units are connected by the optical beam propagated in a free-space. 33-1 denotes a unit(shelf); 33-2, aboard; 33-3, a main signal VCSEL array; 33-4, a monitor beam VCSEL array; 33-5, a lens array; 33-6, an LC microprism array used as a deflection array device for optical interconnection; 33-7, a variable apex angle prism used as a beam array batch deflection control device; 33-8, a prism mirror; 33-9, an optical beam array; 33-10, a photodetector array; 33-11, an x-y position sensor; and 33-12, a feedback circuit which controls the variable apex angle prism to receive the optical beam always at the same position when the feedback circuit receives an output from the x-y position sensor 33-11. In order to propagate the optical beam over a long distance between the units 33-1 such as several tens cm to 100 cm, a pitch between the optical beam arrays 33-9 is set relatively rough such as 1 mm to 2 mm. The feedback circuit 33-12 always receives location information of the monitor beam detected by the x-y position sensor 33-11, and then controls the variable apex angle prism 33-7 such that the main optical beam signal always inputs into the desired photodetector array even if bowing of the board, location displacement of the board, and location displacement between the units are caused because of any disturbance.

Figure 34:
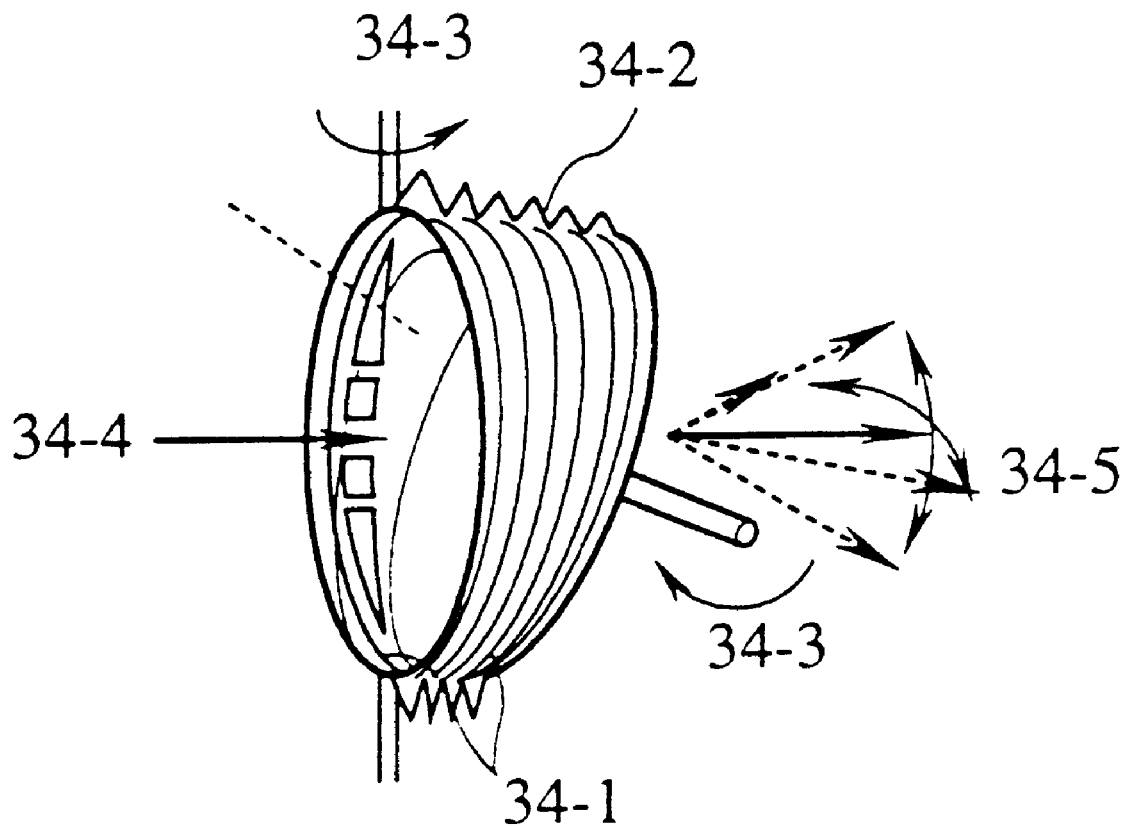
FIG. 34 is a view showing a configuration of a variable apex angle prism.

FIG. 34 is a view showing a configuration of a variable apex angle prism. The variable apex angle prism has been developed for the purpose of correcting optically unintentional movement of the hands in taking a picture by a video camera, a binocular, etc. 34-1 denotes a glass plate; 34-2, a flexible bellows; 34-3, a rotating actuator; 34-4, an input beam; and 34-5, an output beam. Two sheets of the glass plate 34-1 are attached on both ends of the flexible bellows 34-2, and then a liquid which has the same refractive index as the glass plate 34-1 is filled in the space constituted by these materials. Two sheets of the glass plates 34-1 are constituted such that their directions are varied by two rotating actuators 34-3. By applying the voltage of −1V to +1V as the control voltage, an angle of the flexible bellows 34-2 can be varied linearly from −2.0° to +2.0°.

Figure 35A:
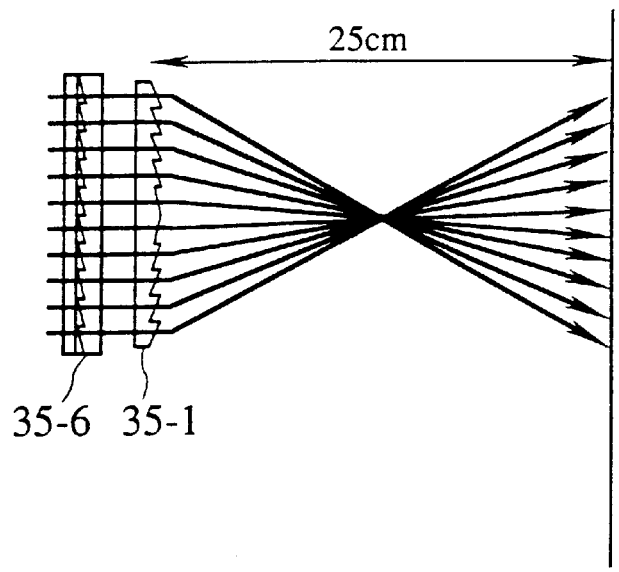
FIGS. 35A and 35B are views showing an example of a combination of a fixed-angle deflection device and a tunable optical deflection control array device.
Figure 35B:
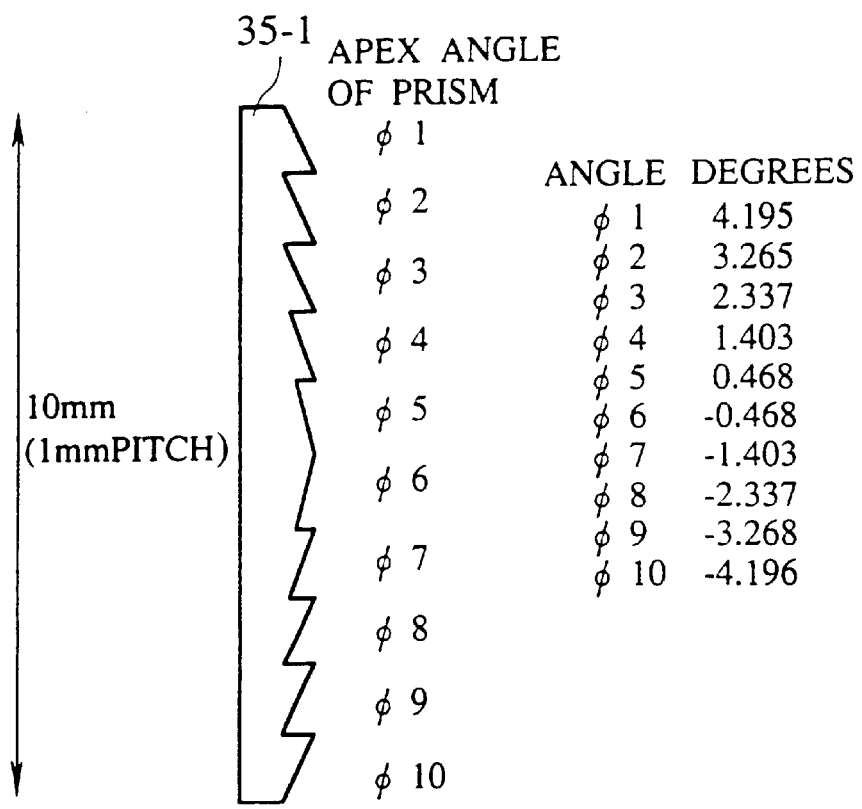

Moreover, amongst the deflection direction tunable device such as the LC microprism array 33-6, some devices have an insufficient maximum deflection angle. In this case, it is advantageous to employ a combination of the fixed-angle deflection device having the predetermined deflection angle and the above light deflection control array device. As a representative of the fixed-angle deflection device, there can be thought about a hologram device. Especially, a computer hologram is very useful since its deflection direction can be set freely by the computer. Also the prism array has such an advantage that it can be fabricated by polymethylmethacrylate, etc. at low cost. As an example, a polymethylmethacrylate prism array as the fixed-angle deflection device and the LC microprism array as the tunable light deflection control array device is shown in combination in FIG. 35A. 35-1 denotes the polymethylmethacrylate prism array. Respective prisms are arranged at a pitch of 1 mm in the polymethylmethacrylate prism array 35-1. Apex angles of respective prism are so designed that the light can be transmitted perfectly between a distance of 25 cm by cross interconnection. FIG. 35B is a view showing an example of the apex angles of respective. Main optical interconnection is established via the polymethylmethacrylate prism array 35-1 and the LC microprism array 33-6 is used to correction the optical interconnection.

Figure 36A:
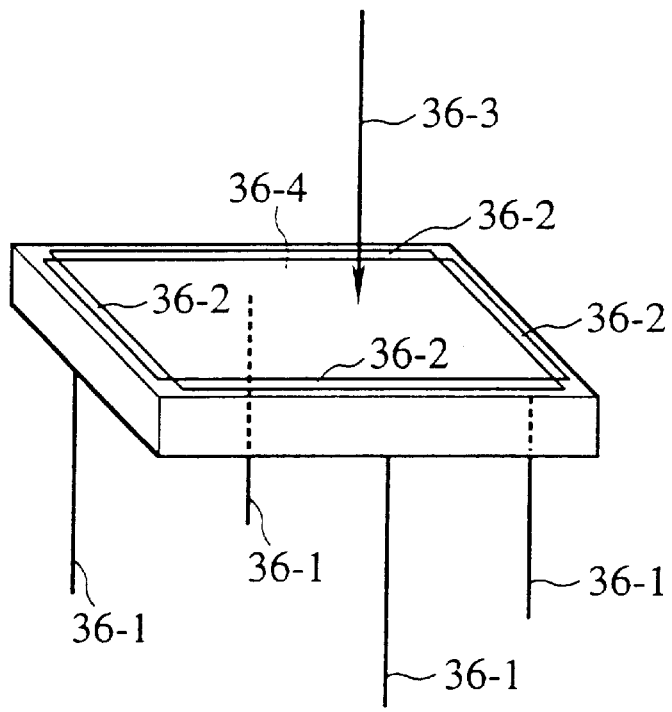
FIGS. 36A and 36B are a schematic perspective view and a sectional view showing an x-y position sensor respectively.
Figure 36B:
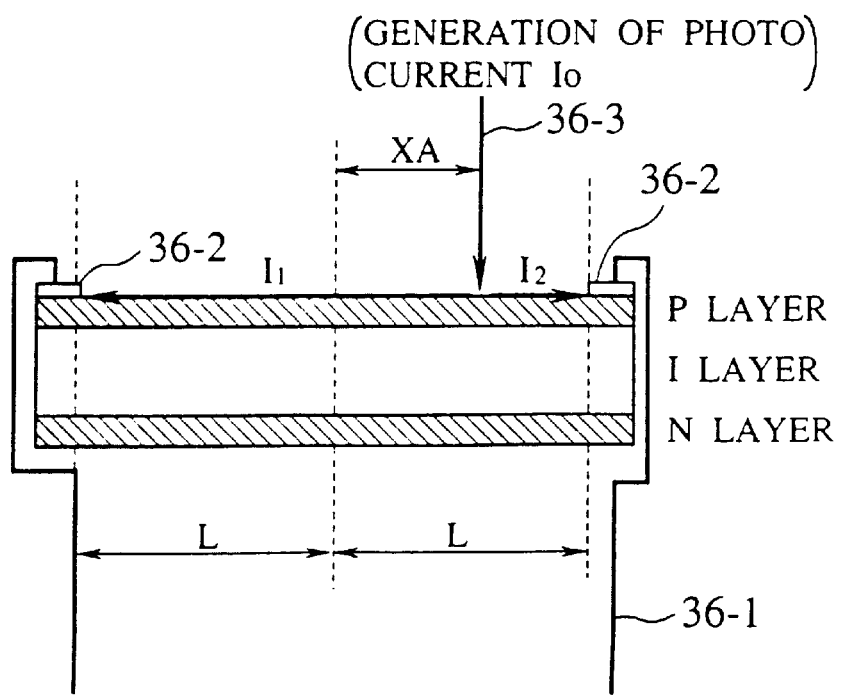

Next, a mechanism for always maintaining the optical interconnection even if optical beam alignment is deviated by virtue of disturbance will be explained hereunder. FIGS. 36A and 36B are a schematic perspective view and a sectional view showing an x-y position sensor 33-11 respectively. 36-1 denotes an output electrode; 36-2, an electrode provided on each side of a light receiving surface; 36-3, an incident optical beam; and 36-4, an Si photodiode. A principle of this mechanism will be explained hereunder. If the optical beam is input into a front surface of the x-y position sensor 33-11, charges which are equivalent to optical energy are generated. As shown in FIG. 36B, photo currents are divided in inverse proportion to a distance between electrodes provided on the ends of the device and the optical beam and then output. That is, output currents $I_1$ and $I_2$ shown in FIG. 36B are represented by $$I_1 = I_0 \cdot (L - X_A)/2L \tag{8}$$

$$I_2 = I_0 \cdot (L + X_A)/2L \tag{9}$$

The position of the incident optical beam 36-3 can be detected by monitoring two currents in the following.

$$X_A/L = (I_2 - I_1)/(I_1 + I_2) \tag{10}$$

In this manner, the position to which the incident optical beam 36-3 is irradiated can be expressed by a current output ratio. Accordingly, if the position of the monitor beam on the Si photodiode 36-4 is stored in the x-y position sensor 33-11 when the VCSEL array and the photodetector array are suitably optical-interconnected in an initial state and then the deflection control device is operated by feedback to restore the monitor beam to the initial position on the Si photodiode 36-4 when the optical interconnection is interrupted by virtue of disturbance, the VCSEL array in a certain unit and the photodetector array in another unit are always connected via the optical beam.

Subsequently, an operation of the unit-to-unit optical interconnection system shown in FIG. 33 will be explained hereunder. The optical beams output from the main signal VCSEL array 33-3 are deflected by the LC microprism array 33-6 via the lens array 33-5. The optical beams deflected by the LC microprism array 33-6 are then deflected collectively by the variable apex angle prism 33-7. The optical beams deflected by the variable apex angle prism 33-7 are then turned by the prism mirror 33-8 by about 90°. Then, the optical beams whose direction is finely adjusted by the LC microprism array 33-6 and is turned by the prism mirror 33-8 by about 90° are controlled to be input into the prism mirror 33-8 of the desired unit 33-1. The optical beams which are input into the desired unit 33-1 are turned by the prism mirror 33-8 by about 90° to input into the photodetector array 33-10 via the lens array 33-5.

In the tenth embodiment of the present invention, the LC microprism array has been used as the tunable light deflection control array device, but the micro mirror array, the LC deflection device, the rotation mirror array, and the rotation prism array may be used selectively. Still further, if the fixed-angle light deflection device is employed, the hologram device, and the prism array device may be used in addition to the above polymethylmethacrylate prism array. In addition, a combination of the fixed-angle deflection control device and the tunable light deflection control array device may be used.

Figure 37:
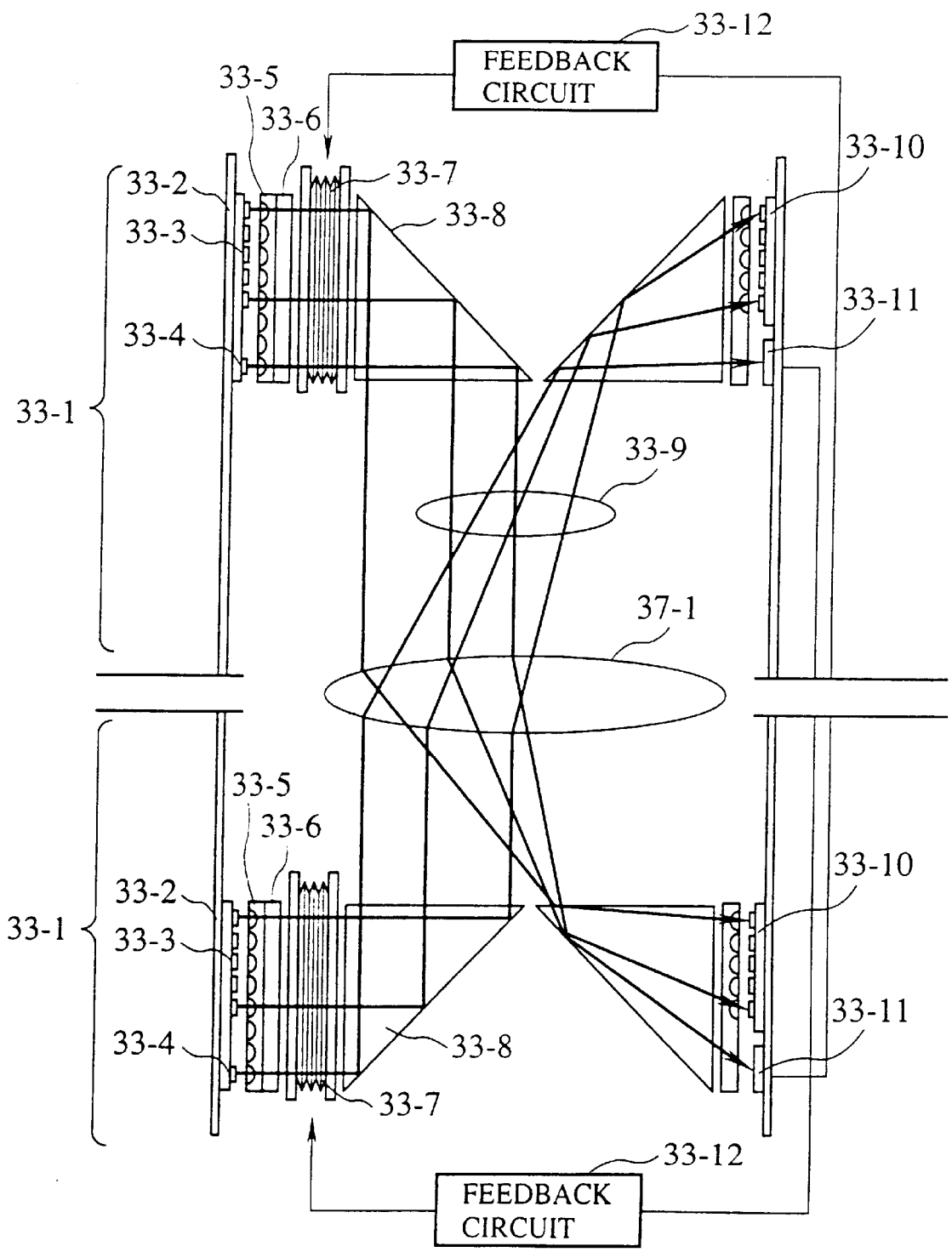
FIG. 37 is a detailed sectional view showing a configuration of a unit-to-unit optical interconnection system according to an eleventh embodiment of the present invention.

FIG. 37 is a detailed sectional view showing a configuration of a unit-to-unit optical interconnection system according to an eleventh embodiment of the present invention. Although the units have been connected by the optical beams in the tenth embodiment, the optical interconnection can be established to form images of the light source on the photodetector array by the macro lens in the eleventh embodiment. 37-1 is a macro lens which forms the imaged transmitted from the main signal VCSEL array 33-3 on the photodetector array 33-10. Remaining configuration of the eleventh embodiment is similar to the tenth embodiment. Since an image forming system is employed in the eleventh embodiment, pitches of the main signal VCSEL array 33-3 and the photodetector array 33-10 are set relatively finely, e.g., several tens $\mu$m to several hundreds $\mu$m.

Also, in the eleventh embodiment of the present invention, the LC microprism array has been used as the tunable light deflection control array device, but the micro mirror array, the LC deflection device, the rotation mirror array, and the rotation prism array may be used selectively. Further, if the fixed-angle light deflection device is employed, the hologram device, and the prism array device may be used as well as the above polymethylmethacrylate prism array. In addition, a combination of the fixed-angle deflection control device and the tunable light deflection control array device may be used.

Figure 38:
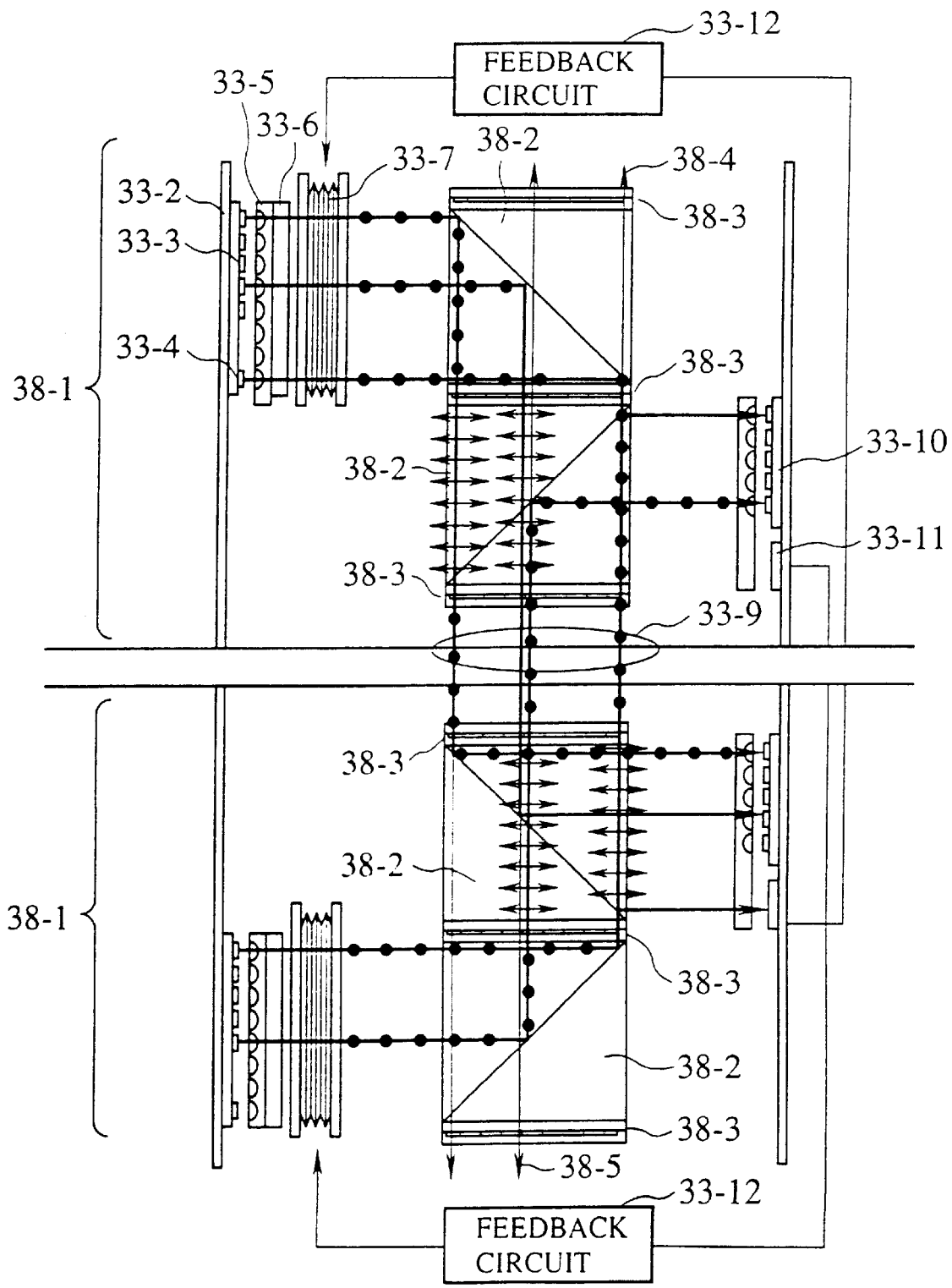
FIG. 38 is a detailed sectional view showing a configuration of a unit-to-unit optical interconnection system according to a twelfth embodiment of the present invention.

FIG. 38 is a detailed sectional view showing a configuration of a unit-to-unit optical interconnection system according to a twelfth embodiment of the present invention. Although the units are connected by turning the optical beam by the prism mirror by a substantially right angle in the tenth embodiment, the optical interconnection can be established between the main signal VCSEL array and the photodetector array by using paired polarization beam splitter and polarization control array device in the twelfth embodiment. 38-2 denotes a polarization beam splitter; 38-3, a twisted nematic LC; 38-4, an optical beam which proceeds upwardly; and 38-5, an optical beam which proceeds downward. Other configuration of the twelfth embodiment is similar to the first embodiment. In FIG. 38, though only two stages are depicted, actually the unit-to-unit optical interconnection system of the twelfth embodiment is constructed in a multistage fashion and thus the optical interconnection can be established between the arbitrary units.

The optical beams output from the main signal VCSEL array 33-3 are passed via the lens array 33-5 and then deflected by the LC microprism array 33-6. The optical beams deflected by the LC microprism array 33-6 are then deflected collectively by the variable apex angle prism 33-7. The optical beams deflected by the variable apex angle prism 33-7 are then turned by the polarization beam splitter 38-2 by 90°. The optical beams turned by the polarization beam splitter 38-2 by 90° are passed through the twisted nematic LC 38-3, but the polarization direction of the optical beams is rotated by 90° when the optical beams are passed through the twisted nematic LC 38-3 in the target unit. Hence, the optical beams are then turned by the polarization beam splitter 38-2 in the target unit by 90° and thus the optical beam propagates the photodetector array 33-10 in the target unit. On the contrary, if the optical beams are passed through the twisted nematic LC 38-3 in the non-target unit, its polarization direction is not varied. Thus, the optical beams propagates straight as they are through the polarization beam splitter 38-2 in the non-target unit. In this fashion, the target unit can be designated. In the target unit, the optical beams are turned by the polarization beam splitter 38-2 by 90° and then input into the photodetector array 33-10 via the lens array 33-5. An operation of a feedback circuit 33-12 is the same as the first embodiment.

In the twelfth embodiment of the present invention, the LC microprism array has been used as the tunable light deflection control array device, but the micro mirror array, the LC deflection device, the rotation mirror array, and the rotation prism array may be used selectively. Further, if the fixed-angle light deflection device is employed, the hologram device, and the prism array device may be used as well as the above polymethylmethacrylate prism array. In addition, a combination of the fixed-angle deflection control device and the tunable light deflection control array device may be used.

As discussed earlier, free-space optical interconnection system has been employed as the board-to-board interconnection between different units in the unit-to-unit optical interconnection system according to the present invention. In more detail, three items can be listed as follows.

First, an approach for establishing the free-space optical interconnection system between the boards in a certain unit and a different unit arbitrarily can be provided by introducing the light deflection control array device which is capable of controlling the propagation direction of the optical beam. The optical interconnection system can include a feedback control system which can restore the original optical interconnection even if the optical beam alignment is shifted by virtue of any external force. Second, the optical interconnection system can be realized by inserting the macro lens between the units to thus form images of the transmitter array on the input side on the photodetector array on the output side. In this case, the units can be connected by the images instead of the optical beams. Also, in this case, the optical interconnection can always be maintained by providing the batch deflection control device. Third, by providing the polarization control array device and the polarization beam splitter on the propagation direction of the optical beam to rotate polarization of the optical beam by 90° or not, the propagation direction of the optical beam can be controlled to propagate straight or to turn, to thereby be connected to the desired unit. In this case, the optical interconnection can always be maintained by providing the batch deflection control device.

As discussed foregoing, such an advantage can be achieved that a great deal of information can be connected between the units if the unit-to-unit free-space optical interconnection is applied.

It should be understood that many modifications and adaptations of the invention will become apparent to those skilled in the art and it is intended to encompass such obvious modifications and changes in the scope of the claims appended hereto.

What is claimed is:

1. An optical interconnection system comprising:
   a plurality of boards on each of which electronic circuits are mounted and in each of which an opening portion is formed;
   supporting members for supporting the plurality of boards like a book shelf;
   transmitter arrays provided on respective one end portions of the plurality of boards, for outputting an optical beam array;
   polarization control array devices provided in opening portions of the plurality of boards, for controlling polarization direction of respective optical beams in the optical beam array passing through the opening portions;
   polarization beam splitters provided close to the polarization control array devices, for receiving the optical beam array output from the transmitter arrays to turn by a right angle so as to direct to the opening portions of the board in a succeeding stage, and for directing the optical beam array, which is input from the board in a preceding stage via the polarization control array devices, straight to the opening portions of the board in a succeeding stage or for turning the optical beam array by a right angle in a first direction, in response to control of the polarization control array devices;
   first light deflection control array devices provided closed to one sides corresponding to the first direction of the polarization beam splitters, for controlling individually propagation directions of respective optical beams which are turned by the polarization beam splitters by a right angle; and
   detector arrays provided on the one sides of the plurality of boards, for receiving respective optical beams whose propagation directions are controlled by the first light deflection control array devices.

2. An optical interconnection system according to claim 1, wherein the transmitter arrays and the detector arrays are provided vertically with the board.

3. An optical interconnection system according to claim 1, wherein the transmitter arrays and the detector arrays are provided parallel with the board, and further comprising:
   first prism mirrors for turning the optical beam array output from the transmitter arrays by a right angle to direct to the polarization beam splitters; and
   second prism mirrors for turning the optical beam array, which is output from the polarization beam splitters in the first direction, by a right angle to input into the detector arrays.

4. An optical interconnection system according to claim 2, wherein the transmitter arrays include second light deflection control array devices which control individually propagation directions of respective optical beams in the optical beam array output.

5. An optical interconnection system according to claim 3, wherein the transmitter arrays include second light deflection control array devices which control individually propagation directions of respective optical beams in the optical beam array output.

6. An optical interconnection system according to claim 4, wherein the transmitter arrays include fixed-angle light deflection devices which deflect fixedly and individually propagation directions of respective optical beams in the optical beam array output.

7. An optical interconnection system according to claim 5, wherein the transmitter arrays include fixed-angle light deflection devices which deflect fixedly and individually propagation directions of respective optical beams in the optical beam array output.

8. An optical interconnection system according to claim 4, wherein the transmitter arrays include beam array batch deflection control devices which deflect collectively the optical beam array output.

9. An optical interconnection system according to claim 5, wherein the transmitter arrays include beam array batch deflection control devices which deflect collectively the optical beam array output.

10. An optical interconnection system according to claim 4, wherein the first light deflection control array devices and the second light deflection control array devices are composed respectively of a liquid crystal microprism array in which a liquid crystal is sandwiched by a planar substrate and a microprism array plate having transparent electrodes and alignment layer thereon.

11. An optical interconnection system according to claim 5, wherein the first light deflection control array devices and the second light deflection control array devices are composed respectively of a liquid crystal microprism array in which a liquid crystal is sandwiched by a planar substrate and a microprism array plate having transparent electrodes and alignment layer thereon.

12. An optical interconnection system according to claim 4, wherein the first light deflection control array devices and the second light deflection control array devices are composed respectively of a liquid crystal prism array in which two sheets of liquid crystal prism arrays are stuck orthogonally.

13. An optical interconnection system according to claim 5, wherein the first light deflection control array devices and the second light deflection control array devices are composed respectively of a liquid crystal prism array in which two sheets of liquid crystal prism arrays are stuck orthogonally.

14. An optical interconnection system according to claim 4, wherein the first light deflection control array devices and the second light deflection control array devices are composed respectively of a liquid crystal deflection control array device in which a liquid crystal layer is sandwiched by array split electrodes having a window therein.

15. An optical interconnection system according to claim 5, wherein the first light deflection control array devices and the second light deflection control array devices are composed respectively of a liquid crystal deflection control array device in which a liquid crystal layer is sandwiched by array split electrodes having a window therein.

16. An optical interconnection system according to claim 4, wherein the first light deflection control array devices and the second light deflection control array devices are composed respectively of an electrostatic control micro mirror array in which beam propagation directions can be controlled by an electrostatic force.

17. An optical interconnection system according to claim 5, wherein the first light deflection control array devices and the second light deflection control array devices are composed respectively of an electrostatic control micro mirror array in which beam propagation directions can be controlled by an electrostatic force.

18. An optical interconnection system according to claim 4, wherein the first light deflection control array devices and the second light deflection control array devices are composed respectively of a hologram in which a diffraction grating can be written.

19. An optical interconnection system according to claim 5, wherein the first light deflection control array devices and the second light deflection control array devices are composed respectively of a hologram in which a diffraction grating can be written.

20. An optical interconnection system according to claim 4, wherein the first light deflection control array devices and the second light deflection control array devices are composed respectively of a rotation mirror array in which beam propagation directions can be controlled mechanically.

21. An optical interconnection system according to claim 5, wherein the first light deflection control array devices and the second light deflection control array devices are composed respectively of a rotation mirror array in which beam propagation directions can be controlled mechanically.

22. An optical interconnection system according to claim 4, wherein the first light deflection control array devices and the second light deflection control array devices are composed respectively of a rotation prism array in which beam propagation directions can be controlled mechanically.

23. An optical interconnection system according to claim 5, wherein the first light deflection control array devices and the second light deflection control array devices are composed respectively of a rotation prism array in which beam propagation directions can be controlled mechanically.

24. An optical interconnection system according to claim 6, wherein the fixed-angle deflection device is formed of a hologram, a prism array, or a mirror array.

25. An optical interconnection system according to claim 7, wherein the fixed-angle deflection device is formed of a hologram, a prism array, or a mirror array.

26. An optical interconnection system according to claim 8, wherein the beam array batch deflection control device is formed of a variable apex angle prism.

27. An optical interconnection system according to claim 9, wherein the beam array batch deflection control device is formed of a variable apex angle prism.

28. An optical interconnection system according to claim 8, wherein the beam array batch deflection control device is formed of a liquid crystal prism array in which two liquid crystal prism arrays are orthogonally stuck.

29. An optical interconnection system according to claim 9, wherein the beam array batch deflection control device is formed of a liquid crystal prism array in which two liquid crystal prism arrays are orthogonally stuck.

30. An optical interconnection system according to claim 1, wherein the polarization control array devices are formed of a twisted nematic liquid crystal which is sandwiched by array-shaped transparent electrodes.

31. An optical interconnection system according to claim 1, wherein the transmitter arrays include VCSEL arrays for emitting the optical beam array respectively.

32. An optical interconnection system according to claim 8, further comprising:
a monitor beam VCSEL included in the transmitter arrays, for emitting a monitor beam;
a position sensor included in the receiver arrays, for receiving the monitor beam via the polarization control array devices, the polarization beam splitters, and the first light deflection control array devices to detect its position; and
a feedback circuit for controlling the beam array batch deflection control devices in response to the position of the monitor beam detected by the position sensor.

33. An optical interconnection system according to claim 9, further comprising:
a monitor beam VCSEL included in the transmitter arrays, for emitting a monitor beam;
a position sensor included in the receiver arrays, for receiving the monitor beam via the polarization control array devices, the polarization beam splitters, and the first light deflection control array devices to detect its position; and
a feedback circuit for controlling the beam array batch deflection control devices in response to the position of the monitor beam detected by the position sensor.

34. An optical interconnection system applied to a cabinet in which a plurality of boards on each of which electronic circuits are mounted are assembled like a book shelf by supporting members to constitute units and then plural units are stuck in a direction parallel with the boards, the optical interconnection system comprising:
transmitter arrays provided on boards in at least preselected stages in respective units, for outputting an optical beam array;
light deflection control array devices for controlling individually propagation directions of respective optical beams of the optical beam array emitted from the transmitter arrays;
output prism mirrors for turning the optical beam array emitted from the light deflection control array devices by a right angle;
input prism mirrors provided on respective boards in succeeding stage to the boards on which the transmitter arrays are provided, for turning the optical beam array, which is emitted from the output prism mirrors in other units, by a right angle to direct to corresponding boards; and
detector arrays composed of a plurality of detectors to receive the optical beam array emitted from the input prism mirrors; and
wherein the light deflection control array devices control individually propagation directions of the optical beams of the optical beam array to input the optical beam into desired detectors of the board in succeeding stage in desired units.

35. An optical interconnection system according to claim 34, further comprising macro lenses for receiving the optical beam array emitted from the output prism mirrors and forming images of the transmitter arrays on the detector arrays.

36. An optical interconnection system according to claim 35, further comprising fixed-angle light deflection devices which deflect fixedly and individually propagation directions of respective optical beams in the optical beam array emitted from the transmitter arrays.

37. An optical interconnection system according to claim 36, wherein the fixed-angle deflection device is formed of a hologram, a prism array, or a mirror array.

38. An optical interconnection system according to claim 35, further comprising beam array batch deflection control devices which deflect collectively the optical beam array emitted from the transmitter arrays.

39. An optical interconnection system according to claim 38, wherein the beam array batch deflection control device is formed of a variable apex angle prism.

40. An optical interconnection system according to claim 38, wherein the beam array batch deflection control device is formed of a liquid crystal prism array in which two liquid crystal prism arrays are orthogonally stuck.

41. An optical interconnection system according to claim 38, further comprising:
- a monitor beam VCSEL included in the transmitter arrays, for emitting a monitor beam;
- a position sensor included in the receiver arrays, for receiving the monitor beam via the light deflection control array devices, the beam array batch deflection control device, the output prism mirror, the macro lens, and the input prism mirror to detect its position; and
- a feedback circuit for controlling the beam array batch deflection control devices in response to the position of the monitor beam detected by the position sensor.

42. An optical interconnection system according to claim 35, wherein the light deflection control array devices are composed of a liquid crystal microprism array in which a liquid crystal is sandwiched by a planar substrate and a microprism array plate having transparent electrodes and alignment layer thereon.

43. An optical interconnection system according to claim 35, wherein the light deflection control array devices are composed of a liquid crystal prism array in which two sheets of liquid crystal prism arrays are stuck orthogonally.

44. An optical interconnection system according to claim 35, wherein the light deflection control array devices are composed of a liquid crystal deflection control array device in which a liquid crystal layer is sandwiched by array split electrodes having a window therein.

45. An optical interconnection system according to claim 35, wherein the light deflection control array devices are composed of a hologram in which a diffraction grating can be written.

46. An optical interconnection system according to claim 35, wherein the light deflection control array devices are composed of an electrostatic control micro mirror array in which beam propagation directions can be controlled by an electrostatic force.

47. An optical interconnection system according to claim 35, wherein the light deflection control array devices are composed of a rotation mirror array in which beam propagation directions can be controlled mechanically.

48. An optical interconnection system according to claim 35, wherein the light deflection control array devices are composed of a rotation prism array in which beam propagation directions can be controlled mechanically.

49. An optical interconnection system according to claim 34, further comprising fixed-angle light deflection devices which deflect fixedly and individually propagation directions of respective optical beams in the optical beam array emitted from the transmitter arrays.

50. An optical interconnection system according to claim 49, wherein the fixed-angle deflection device is formed of a hologram, a prism array, or a mirror array.

51. An optical interconnection system according to claim 34, further comprising beam array batch deflection control devices which deflect collectively the optical beam array emitted from the transmitter arrays.

52. An optical interconnection system according to claim 51, wherein the beam array batch deflection control device is formed of a variable apex angle prism.

53. An optical interconnection system according to claim 51, wherein the beam array batch deflection control device is formed of a liquid crystal prism array in which two liquid crystal prism arrays are orthogonally stuck.

54. An optical interconnection system according to claim 51, further comprising:

- a monitor beam VCSEL included in the transmitter arrays, for emitting a monitor beam;
- a position sensor included in the receiver arrays, for receiving the monitor beam via the light deflection control array devices, the beam array batch deflection control device, the output prism mirror, and the input prism mirror to detect its position; and
- a feedback circuit for controlling the beam array batch deflection control devices in response to the position of the monitor beam detected by the position sensor.

55. An optical interconnection system according to claim 34, wherein the light deflection control array devices are composed of a rotation prism array in which beam propagation directions can be controlled mechanically.

56. An optical interconnection system according to claim 34, wherein the light deflection control array devices are composed of a liquid crystal microprism array in which a liquid crystal is sandwiched by a planar substrate and a microprism array plate having transparent electrodes and alignment layer thereon.

57. An optical interconnection system according to claim 34, wherein the light deflection control array devices are composed of a liquid crystal prism array in which two sheets of liquid crystal prism arrays are stuck orthogonally.

58. An optical interconnection system according to claim 34, wherein the light deflection control array devices are composed of a liquid crystal deflection control array device in which a liquid crystal layer is sandwiched by array split electrodes having a window therein.

59. An optical interconnection system according to claim 34, wherein the light deflection control array devices are composed of a hologram in which a diffraction grating can be written.

60. An optical interconnection system according to claim 34, wherein the light deflection control array devices are composed of a rotation mirror array in which beam propagation directions can be controlled mechanically.

61. An optical interconnection system according to claim 34, wherein the light deflection control array devices are composed of an electrostatic control micro mirror array in which beam propagation directions can be controlled by an electrostatic force.

62. An optical interconnection system applied to a cabinet in which a plurality of boards on each of which electronic circuits are mounted are assembled like a book shelf by supporting members to constitute units and then plural units are stuck in a direction parallel with the boards, the optical interconnection system comprising:

- transmitter arrays provided on boards in at least preselected stages in respective units, for outputting an optical beam array;
- light deflection control array devices for controlling individually propagation directions of respective optical beams of the optical beam array emitted from the transmitter arrays;
- polarization control array devices provided to correspond to respective boards in at least preselected stages, for controlling polarization directions of respective optical beams in the optical beam array emitted from remaining units;
- polarization beam splitters provided close to the polarization control array devices, for receiving the optical beam array emitted from corresponding light deflection control array devices and then turning by a right angle to direct to remaining units, and directing the optical beam array, which is input from the other units via the polarization control array devices, straight to the other units or turning the optical beam array by a right angle to the boards in succeeding stage in response to control of the polarization control array devices; and detector arrays composed of a plurality of detectors provided on the boards in succeeding stages to receive the optical beam array emitted from corresponding polarization beam splitters.

63. An optical interconnection system according to claim 62, further comprising fixed-angle light deflection devices which deflect fixedly and individually propagation directions of respective optical beams in the optical beam array emitted from the transmitter arrays.

64. An optical interconnection system according to claim 63, wherein the fixed-angle deflection device is formed of a hologram, a prism array, or a mirror array.

65. An optical interconnection system according to claim 62, further comprising beam array batch deflection control devices which deflect collectively the optical beam array emitted from the transmitter arrays.

66. An optical interconnection system according to claim 65, wherein the beam array batch deflection control device is formed of a variable apex angle prism.

67. An optical interconnection system according to claim 65, wherein the beam array batch deflection control device is formed of a liquid crystal prism array in which two liquid crystal prism arrays are orthogonally stuck.

68. An optical interconnection system according to claim 65, further comprising:

a monitor beam VCSEL included in the transmitter arrays, for emitting a monitor beam;

a position sensor included in the receiver arrays, for receiving the monitor beam via the light deflection control array devices, the beam array batch deflection control device, the polarization control array devices, and the polarization beam splitters to detect its position; and a feedback circuit for controlling the beam array batch deflection control devices in response to the position of the monitor beam detected by the position sensor.

69. An optical interconnection system according to claim 62, wherein the light deflection control array devices are composed of a liquid crystal microprism array in which a liquid crystal is sandwiched by a planar substrate and a microprism array plate having transparent electrodes and alignment films thereon.

70. An optical interconnection system according to claim 62, wherein the light deflection control array devices are composed of a liquid crystal prism array in which two sheets of liquid crystal prism arrays are stuck orthogonally.

71. An optical interconnection system according to claim 62, wherein the light deflection control array devices are composed of a liquid crystal deflection control array device in which a liquid crystal layer is sandwiched by array split electrodes having a window therein.

72. An optical interconnection system according to claim 62, wherein the light deflection control array devices are composed of an electrostatic control micro mirror array in which beam propagation directions can be controlled by an electrostatic force.

73. An optical interconnection system according to claim 62, wherein the light deflection control array devices are composed of a hologram in which a diffraction grating can be written.

74. An optical interconnection system according to claim 62, wherein the light deflection control array devices are composed of a rotation mirror array in which beam propagation directions can be controlled mechanically.

75. An optical interconnection system according to claim 62, wherein the light deflection control array devices are composed of a rotation prism array in which beam propagation directions can be controlled mechanically.

76. An optical interconnection system according to claim 62, wherein the polarization control array devices are formed of a twisted nematic liquid crystal which is sandwiched by array-shaped transparent electrodes.

77. An optical interconnection system comprising:

a plurality of boards on each of which electronic circuits are mounted;

supporting members for supporting the plurality of boards like a book shelf;

a mirror arranged perpendicular to the plurality of boards at predetermined distance from respective ends of the plurality of boards;

transmitter arrays provided on respective end portions of the plurality of boards, for outputting an optical beam array;

light deflection control array devices for receiving the optical beam array from the transmitter arrays, controlling propagation directions of respective optical beams of the optical beam array individually and variably, and inputting the optical beam array into the mirror with a gradient; and detector arrays provided on respective end portions of the plurality of boards, for receiving the optical beam array reflected by the mirror.

78. An optical interconnection system according to claim 77, further comprising fixed-angle light deflection devices which deflect fixedly and individually propagation directions of respective optical beams in the optical beam array emitted from the transmitter arrays.

79. An optical interconnection system according to claim 77, further comprising beam array batch deflection control devices which deflect collectively the optical beam array emitted from the transmitter arrays.

80. An optical interconnection system according to claim 77, wherein the light deflection control array devices are composed of a liquid crystal microprism array in which a liquid crystal is sandwiched by a planar substrate and a microprism array plate having transparent electrodes and alignment layer thereon.

81. An optical interconnection system according to claim 77, wherein the light deflection control array devices are composed of a liquid crystal prism array in which two sheets of liquid crystal prism arrays are stuck orthogonally.

82. An optical interconnection system according to claim 77, wherein the light deflection control array devices are composed of a liquid crystal deflection control array device in which a liquid crystal layer is sandwiched by array split electrodes having a window therein.

83. An optical interconnection system according to claim 77, wherein the light deflection control array devices are composed of an electrostatic control micro mirror array in which beam propagation directions can be controlled by an electrostatic force.

84. An optical interconnection system according to claim 77, wherein the light deflection control array devices are composed of a hologram in which a diffraction grating can be written.

85. An optical interconnection system according to claim 77, wherein the light deflection control array devices are composed of a rotation mirror array in which beam propagation directions can be controlled mechanically.

86. An optical interconnection system according to claim 77, wherein the light deflection control array devices are composed of a rotation prism array in which beam propagation directions can be controlled mechanically.

87. An optical interconnection system according to claim 78, wherein the fixed-angle deflection device is formed of a hologram, a prism array, or a mirror array.

88. An optical interconnection system according to claim 79, wherein the beam array batch deflection control device is formed of a variable apex angle prism.

89. An optical interconnection system according to claim 79, wherein the beam array batch deflection control device is formed of a liquid crystal prism array in which two liquid crystal prism arrays are orthogonally stuck.

90. An optical interconnection system according to claim 79, further comprising:

a monitor beam VCSEL included in the transmitter arrays, for emitting a monitor beam;

a position sensor included in the receiver arrays, for receiving the monitor beam via the light deflection control array devices and the mirror to detect its position; and a feedback circuit for controlling the beam array batch deflection control devices in response to the position of the monitor beam detected by the position sensor.

91. An optical interconnection system according to claim 77, wherein second mirrors are placed on an outside of one outermost board of the first board group being boards assembled like a book shelf along an optical beam propagation direction at an angle non-parallel with first mirrors serving as the mirrors, and a spatial alignment of the second mirrors is determined such that the optical beams reaching the second mirrors are reflected to re-input into the first mirror and then the optical beams are input into the detector arrays mounted on second board groups inserted between the boards of the first board group like the book shelf.

92. An optical interconnection system according to claim 91, wherein third mirrors are placed on an outside of other outermost board opposite to one outermost board of the first and second board groups being boards assembled like a book shelf at an angle non-parallel with first mirrors, and a spatial alignment of the third mirrors is determined such that the optical beams reaching the third mirrors after reflected by the second mirrors are reflected to re-input into the first mirror and then the optical beams are input into the detector arrays mounted on third board group inserted between the boards of the first and second board groups like the book shelf.

* * * * *